US011362723B2

(12) United States Patent
Farag et al.

(10) Patent No.: US 11,362,723 B2
(45) Date of Patent: Jun. 14, 2022

(54) METHOD AND APPARATUS FOR BEAM MANAGEMENT

(71) Applicant: Samsung Electronics Co., Ltd., Suwon-si (KR)

(72) Inventors: Emad N. Farag, Flanders, NJ (US); Eko Onggosanusi, Coppell, TX (US); Md. Saifur Rahman, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/302,582

(22) Filed: May 6, 2021

(65) Prior Publication Data
US 2021/0359745 A1 Nov. 18, 2021

Related U.S. Application Data

(60) Provisional application No. 63/045,547, filed on Jun. 29, 2020, provisional application No. 63/025,717, filed on May 15, 2020.

(51) Int. Cl.
H04B 7/06 (2006.01)
H04L 1/00 (2006.01)
H04W 72/04 (2009.01)

(52) U.S. Cl.
CPC ......... H04B 7/0695 (2013.01); H04B 7/0626 (2013.01); H04L 1/0071 (2013.01); H04W 72/0413 (2013.01)

(58) Field of Classification Search
CPC ... H04B 7/0695; H04B 7/0626; H04L 1/0071; H04W 72/0413
See application file for complete search history.

(56) References Cited

U.S. PATENT DOCUMENTS 11,147,073 B2 * 10/2021 Liou ................. H04W 72/0493
2018/0343653 A1 11/2018 Guo
(Continued)

FOREIGN PATENT DOCUMENTS

WO 2019/152298 A1 8/2019
WO 2020/080915 A1 4/2020

OTHER PUBLICATIONS

International Search Report dated Aug. 30, 2021 in connection with International Patent Application No. PCT/KR2021/006029, 3 pages.
(Continued)

Primary Examiner — Jaison Joseph

(57) ABSTRACT

Methods and apparatuses for high speed beam management. A method of operating a user equipment (UE) includes receiving configuration information for transmission configuration indicator (TCI) states; receiving configuration information for group TCI indices, wherein a group TCI index, m, of the group TCI indices is associated with a group of TCI states; receiving configuration information on which TCI states within the group of TCI states to apply to at least one of downlink channels and uplink channels; and receiving the group TCI index. The method further includes decoding a channel conveying the group TCI index; determining, at least based on the decoded group TCI index, one or more TCI states to apply to the at least one of downlink channels and uplink channels; and at least one of (i) receiving the downlink channels and (ii) transmitting the uplink channels using the determined one or more TCI states.

20 Claims, 20 Drawing Sheets

(56) References Cited

U.S. PATENT DOCUMENTS

| | | |
|---|---|---|
| 2020/0106559 A1 | 4/2020 | Vilaipornsawai et al. |
| 2020/0106645 A1 | 4/2020 | Tsai et al. |
| 2021/0168030 A1* | 6/2021 | Li .................. H04W 24/02 |
| 2021/0306867 A1* | 9/2021 | Hamidi-Sepehr ... H04W 72/042 |
| 2021/0352706 A1 | 11/2021 | Kang et al. |

OTHER PUBLICATIONS

Written Opinion of the International Searching Authority dated Aug. 30, 2021 in connection with International Patent Application No. PCT/KR2021/006029, 4 pages.

"5G; NR; Physical channels and modulation (3GPP TS 38.211 version 16.5.0, Release 16)", ETSI TS 138 211 V16.5.0, Apr. 2021, 138 pgs.

"5G; NR; Multiplexing and channel coding (3GPP TS 38.212 version 16.5.0 Release 16)", ETSI TS 138 212 V16.5.0, Apr. 2021, 155 pages.

"5G; NR; Physical layer procedures for control (3GPP TS 38.213 version 16.5.0 Release 16)", ETSI TS 138 213 V16.5.0, Apr. 2021, 188 pages.

"5G; NR; Physical layer procedures for data (3GPP TS 38.214 version 16.5.0 Release 16)", ETSI TS 138 214 V16.5.0, Apr. 2021, 173 pages.

"5G; NR; Medium Access Control (MAC) protocol specification (3GPP TS 38.321 version 16.4.0 Release 16)", ETSI TS 138 321 V16.4.0, Apr. 2021, 159 pages.

"5G; NR; Radio Resource Control (RRC); Protocol specification (3GPP TS 38.331 version 16.4.1 Release 16)", ETSI TS 138 331 V16.4.1, Apr. 2021, 932 pages.

\* cited by examiner

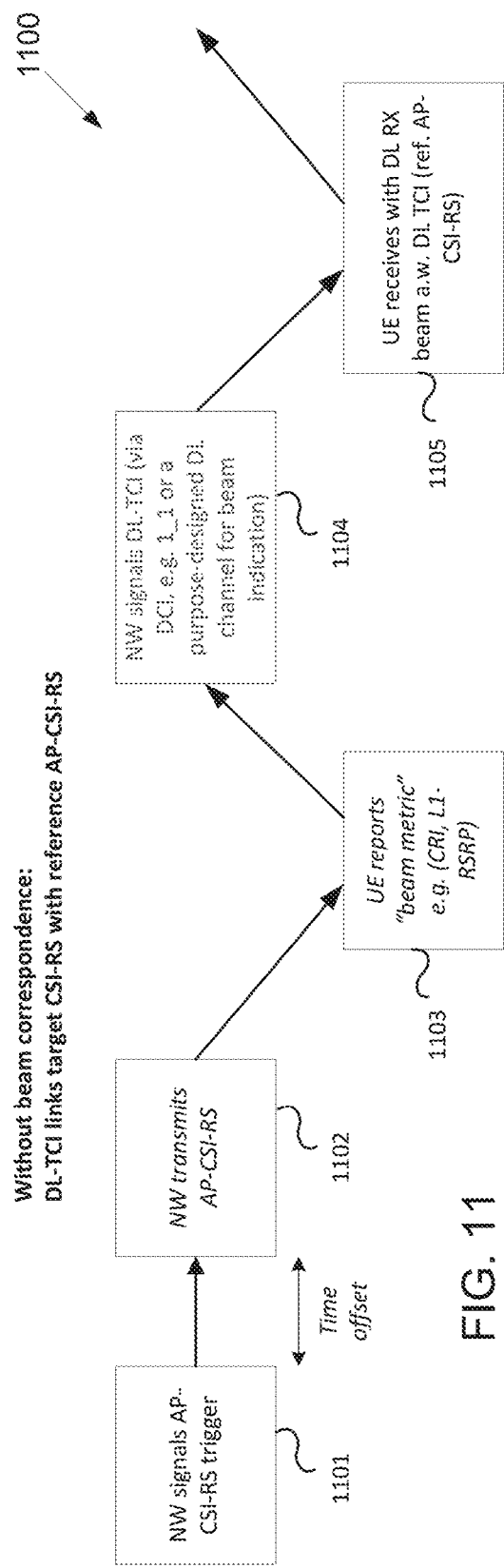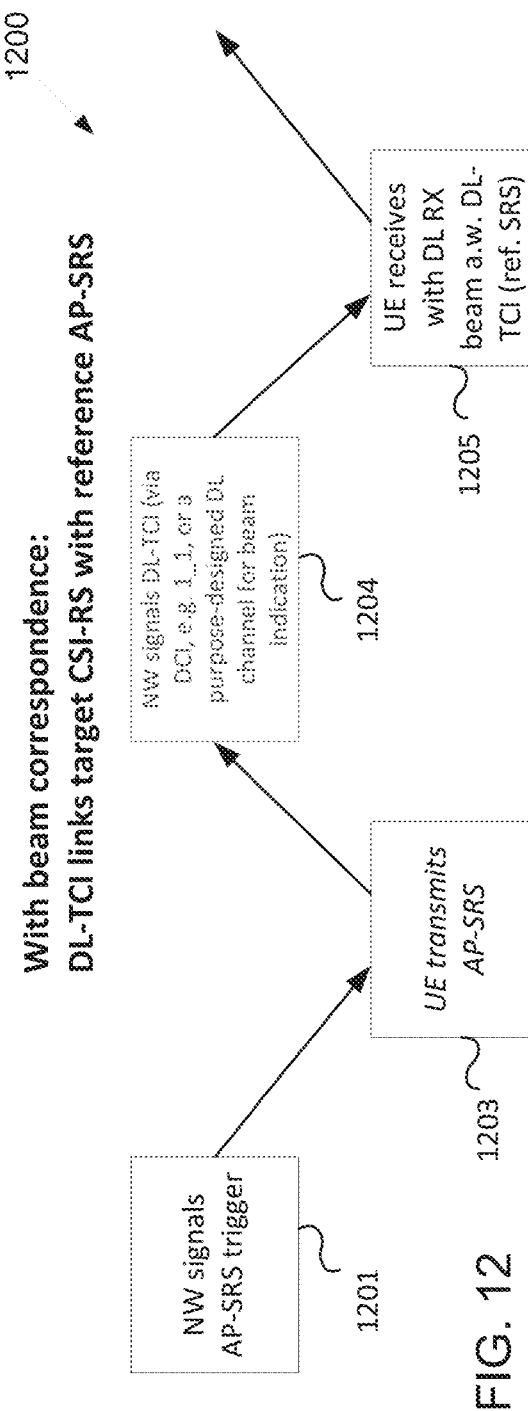
FIG. 11
FIG. 12

UE Group TCI

UE Group TCI Index(m): Indicated/signaled UE Group TCI Index common to all UEs of group
U: Number of UEs in group.
$k_u$: UE specific indicator for beam selection for UE u.

FIG. 25

UE Group TCI

UE Group TCI Index(m): Indicated/signaled UE Group TCI Index common to all UEs of group
U: Number of UEs in group.
$k_u$: UE specific indicator for beam selection for UE u.
K: Indicates the size of each bit field of the UE specific beam indicator $k_u$. Codepoints
configured by RRC signaling and/or MAC CE signaling

FIG. 26

METHOD AND APPARATUS FOR BEAM MANAGEMENT

CROSS-REFERENCE TO RELATED APPLICATIONS AND CLAIM OF PRIORITY

The present application claims priority to U.S. Provisional Patent Application No. 63/025,717, filed on May 15, 2020; and U.S. Provisional Patent Application No. 63/045,547, filed on Jun. 29, 2020. The content of the above-identified patent document is incorporated herein by reference.

TECHNICAL FIELD

The present disclosure relates generally to wireless communication systems and, more specifically, the present disclosure relates to high speed beam management.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to high speed beam management.

In one embodiment, a user equipment (UE) is provided. The UE includes a transceiver configured to receive configuration information for transmission configuration indicator (TCI) states, receive configuration information for group TCI indices, wherein a group TCI index, m, of the group TCI indices is associated with a group of TCI states $(T_0(m), T_1(m), \ldots, T_{U-1}(m))$, wherein $U \geq 1$, receive configuration information on which TCI states within the group of TCI states to apply to at least one of downlink channels and uplink channels, and receive the group TCI index. The UE further includes a processor operably connected to the transceiver. The processor is configured to decode a channel conveying the group TCI index and determine, at least based on the decoded group TCI index, one or more TCI states to apply to the at least one of downlink channels and uplink channels. The transceiver is further configured to at least one of (i) receive the downlink channels and (ii) transmit the uplink channels using the determined one or more TCI states.

In another embodiment, a base station (BS) is provided. The BS includes a transceiver configured to transmit configuration information for TCI states, transmit configuration information for group TCI indices, wherein a group TCI index, m, of the group TCI indices is associated with a group of TCI states $(T_0(m), T_1(m), \ldots, T_{U-1}(m))$, wherein $U \geq 1$, and transmit configuration information on which TCI states within the group of TCI states to apply to at least one of downlink channels and uplink channels of a UE. The BS further includes a processor operably connected to the transceiver. The processor is configured to determine one or more TCI states to apply to the at least one of downlink channels and uplink channels for the UE, determine the group TCI index, and encode and multiplex the group TCI index onto a channel conveying the group TCI index. The transceiver is further configured to transmit the channel conveying the group TCI index and at least one of (i) transmit the downlink channels and (ii) receive the uplink channels using the determined one or more TCI states.

In yet another embodiment, a method of operating a UE is provided. The method includes receiving configuration information for TCI states; receiving configuration information for group TCI indices, wherein a group TCI index, m, of the group TCI indices is associated with a group of TCI states $(T_0(m), T_1(m), \ldots, T_{U-1}(m))$, wherein $U \geq 1$; receiving configuration information on which TCI states within the group of TCI states to apply to at least one of downlink channels and uplink channels; and receiving the group TCI index. The method further includes decoding a channel conveying the group TCI index; determining, at least based on the decoded group TCI index, one or more TCI states to apply to the at least one of downlink channels and uplink channels; and at least one of (i) receiving the downlink channels and (ii) transmitting the uplink channels using the determined one or more TCI states.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code"

includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 11 illustrates a flowchart of method for a DL multi-beam operation according to embodiments of the present disclosure;

FIG. 12 illustrates another flowchart of method for a DL multi-beam operation according to embodiments of the present disclosure;

FIG. 25 illustrates an example structure of the UE group TCI according to embodiments of the present disclosure;

FIG. 26 illustrates another example structure of the UE group TCI according to embodiments of the present disclosure;

DETAILED DESCRIPTION

FIG. 1 through FIG. 34, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.5.0, "NR; Physical channels and modulation"; 3GPP TS 38.212 v16.5.0, "NR; Multiplexing and Channel coding"; 3GPP TS 38.213 v16.5.0, "NR; Physical Layer Procedures for Control"; 3GPP TS 38.214 v16.5.0, "NR; Physical Layer Procedures for Data"; 3GPP TS 38.321 v16.4.0, "NR; Medium Access Control (MAC) protocol specification"; and 3GPP TS 38.331 v16.4.1, "NR; Radio Resource Control (RRC) Protocol Specification."

Figure 1:
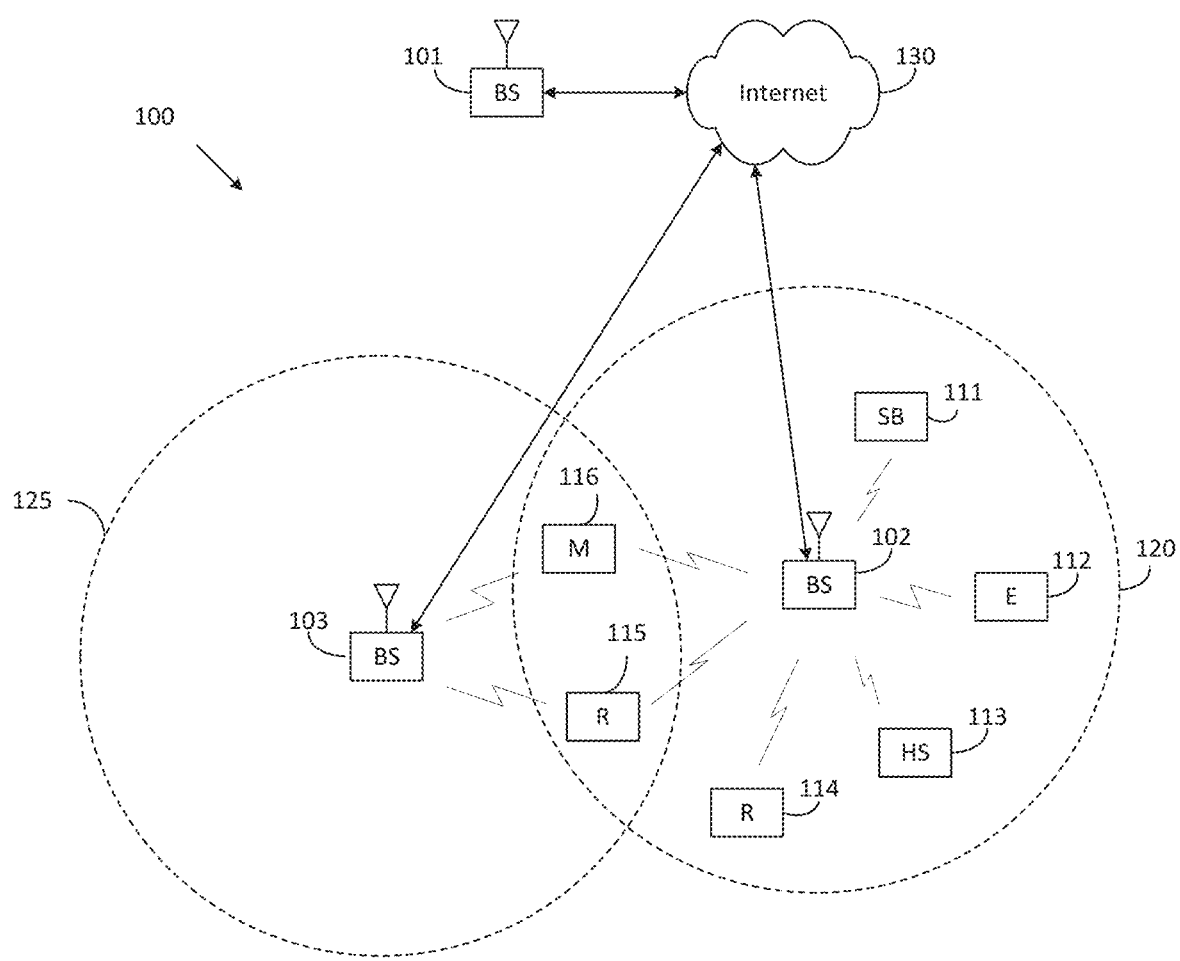
FIG. 1 illustrates an example wireless network according to embodiments of the present disclosure.
Figure 2:
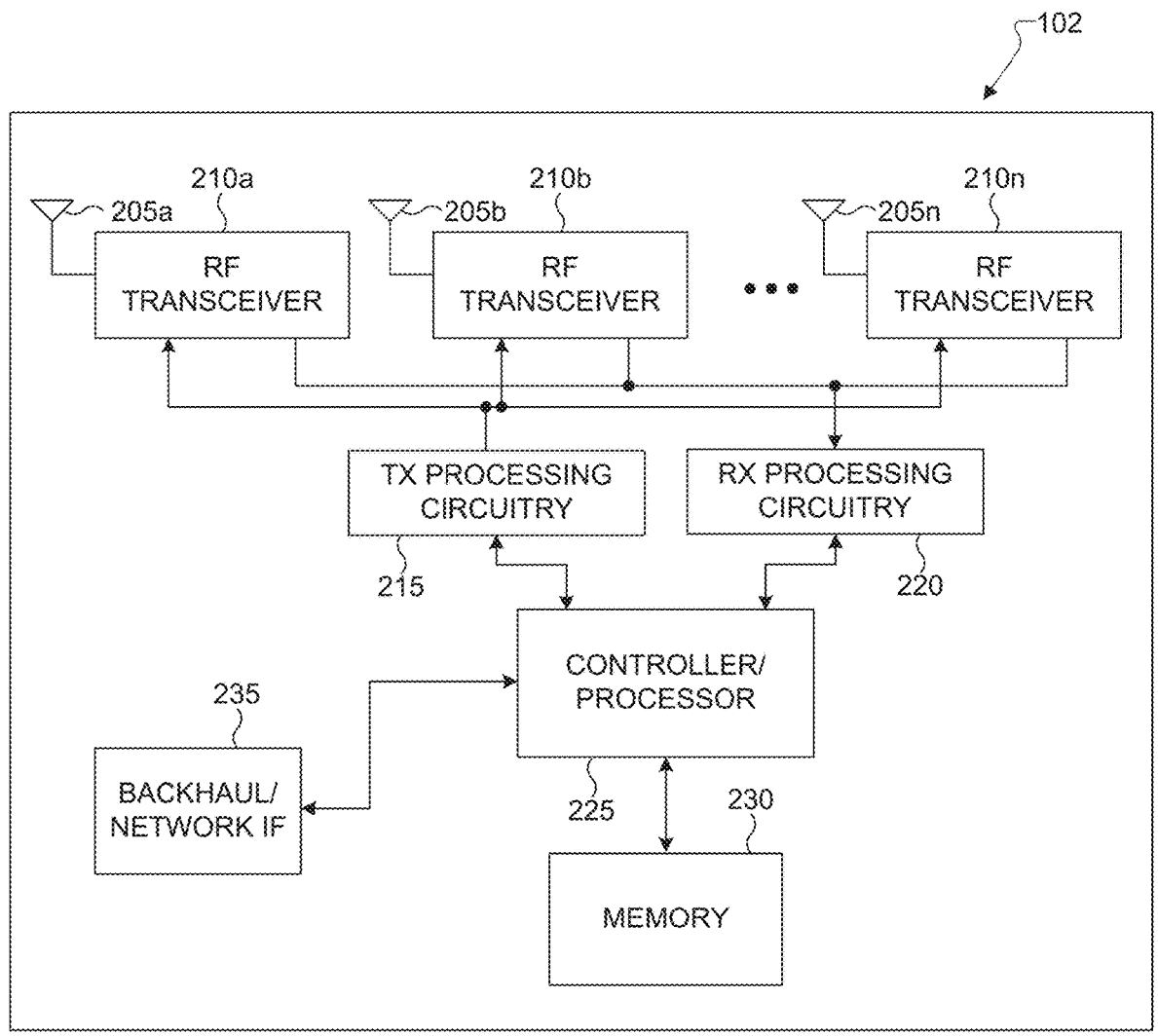
FIG. 2 illustrates an example gNB according to embodiments of the present disclosure.
Figure 3:
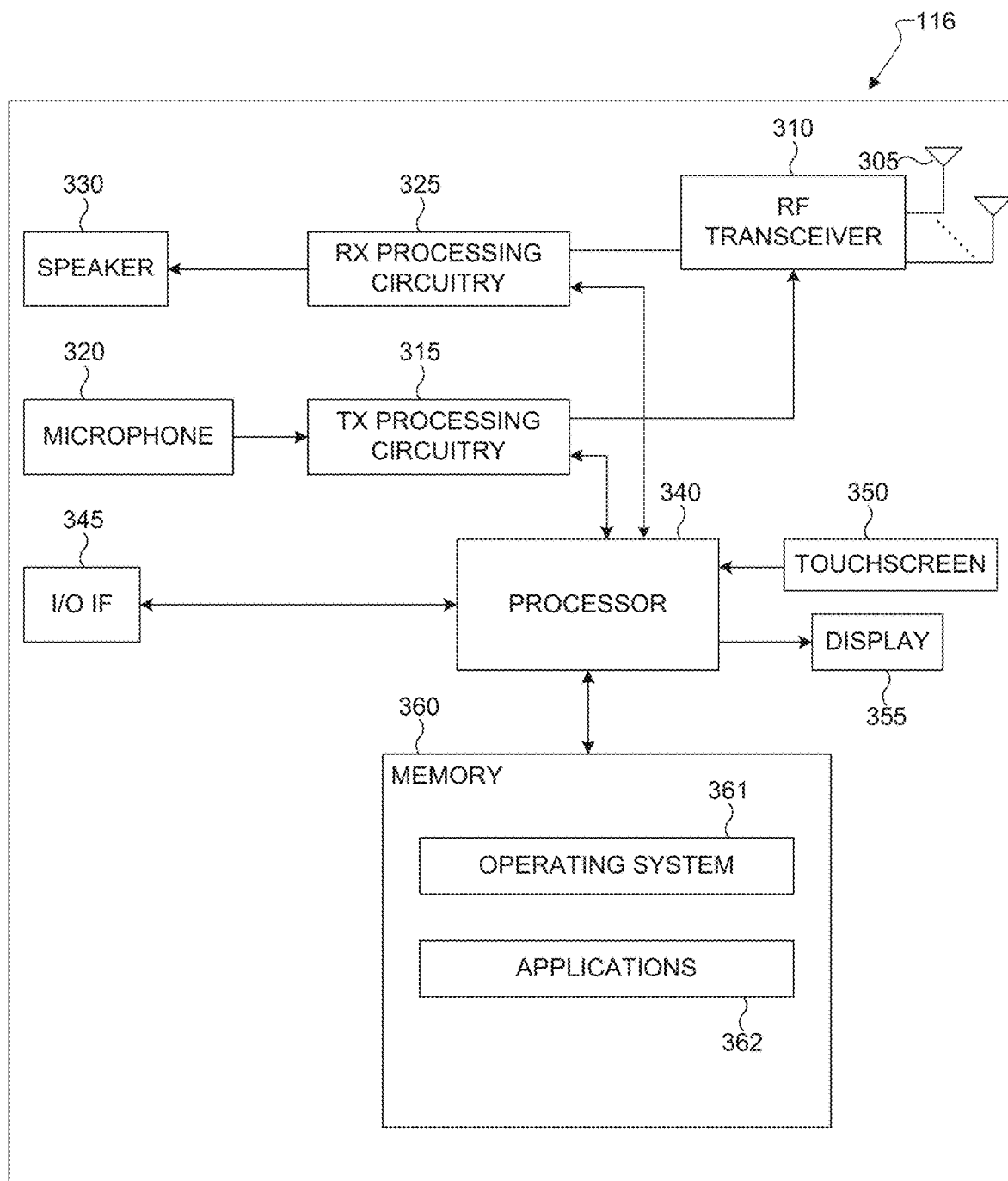
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for high speed beam management. In certain embodiments, and one or more of the gNBs 101-103 includes circuitry, programming, or a combination thereof, for high speed beam management.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 30 KHz or 15 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DM-RS is transmitted only in the BW of a respective PDCCH or PDSCH and a UE can use the DMRS to demodulate data or control information.

Figure 4:
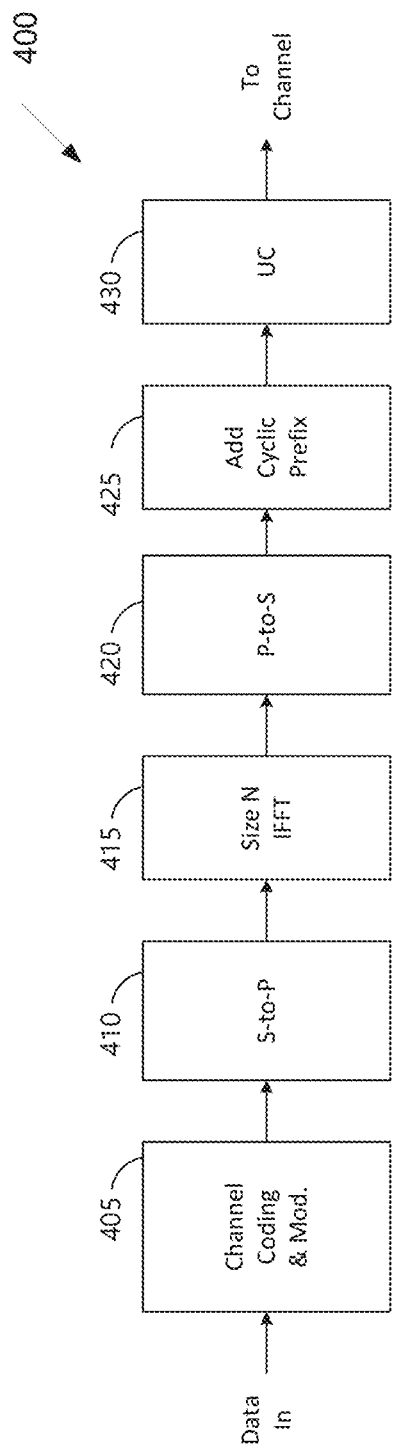
FIGS. 4 and 5 illustrate example wireless transmit and receive paths according to this disclosure.
Figure 5:
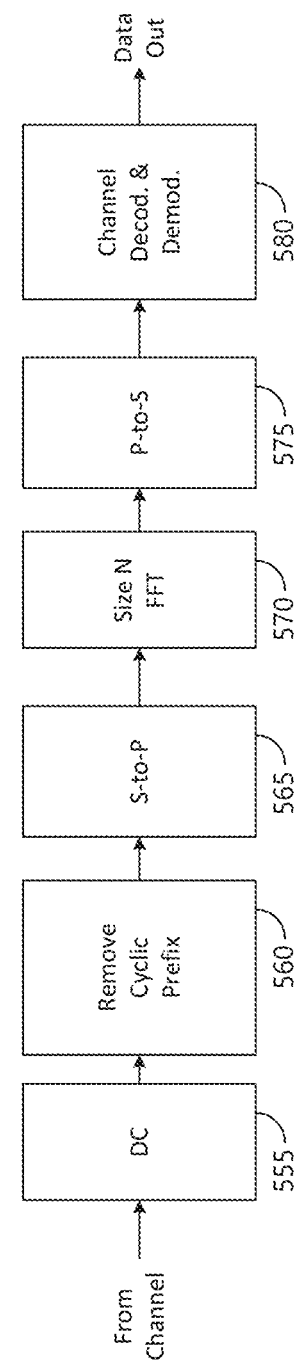

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the beam indication channel in a multi-beam system as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 400, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Figure 6A:
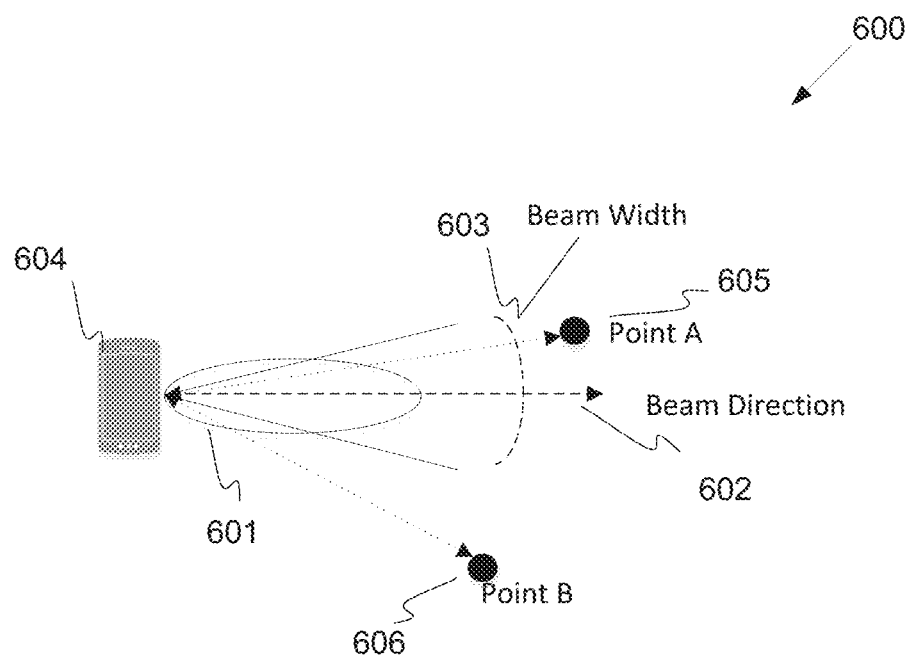
FIG. 6A illustrates an example of a beam in a wireless system according to embodiments of the present disclosure.

FIG. 6A illustrate an example of a beam in a wireless system 600 according to embodiments of the present disclosure. An embodiment of the beam shown in FIG. 6A is for illustration only.

As illustrated in FIG. 6A, in the wireless system 600, a beam 601, for a device 604, can be characterized by a beam direction 602 and a beam width 603. For example, a device 604 with a transmitter transmits RF energy in a beam direction and within a beam width. The device 604 with a receiver receives RF energy coming towards the device in a beam direction and within a beam width. As illustrated in FIG. 6A, a device at point A 605 can receive from and transmit to the device 604 as Point A is within a beam width of a beam traveling in a beam direction and coming from the device 604. A device at point B (606) cannot receive from and transmit to device (604) as Point B is outside a beam width and direction of a beam from device (604). While FIG. 6A, for illustrative purposes, shows a beam in 2-dimensions (2D), it should be apparent to those skilled in the art, that a beam can be in 3-dimensions (3D), where the beam direction and beam width are defined in space.

Figure 6B:
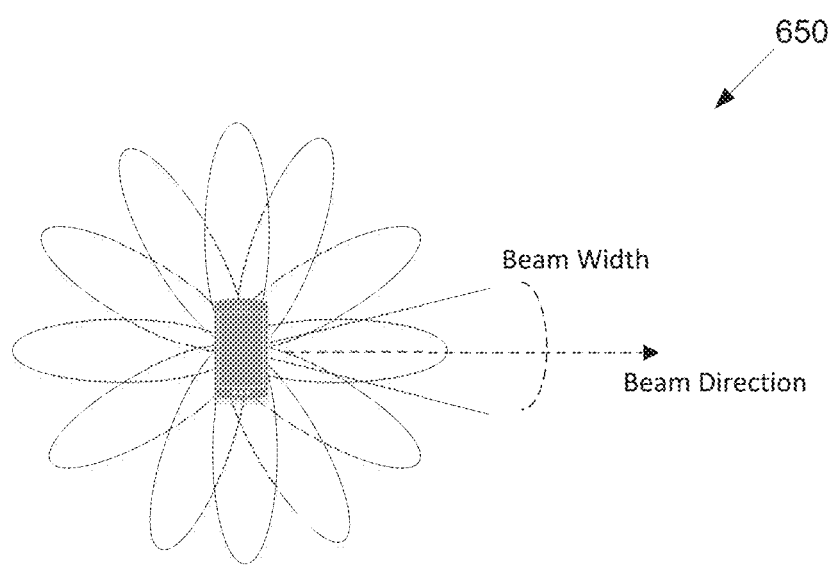
FIG. 6B illustrates an example multi-beam operation according to embodiments of the present disclosure.

FIG. 6B illustrate an example multi-beam operation 650 according to embodiments of the present disclosure. An embodiment of the multi-beam operation 650 shown in FIG. 6B is for illustration only.

In a wireless system, a device can transmit and/or receive on multiple beams. This is known as "multi-beam operation" and is illustrated in FIG. 6B. While FIG. 6B, for illustrative purposes, is in 2D, it may be apparent to those skilled in the art, that a beam can be 3D, where a beam can be transmitted to or received from any direction in space.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 7.

Figure 7:
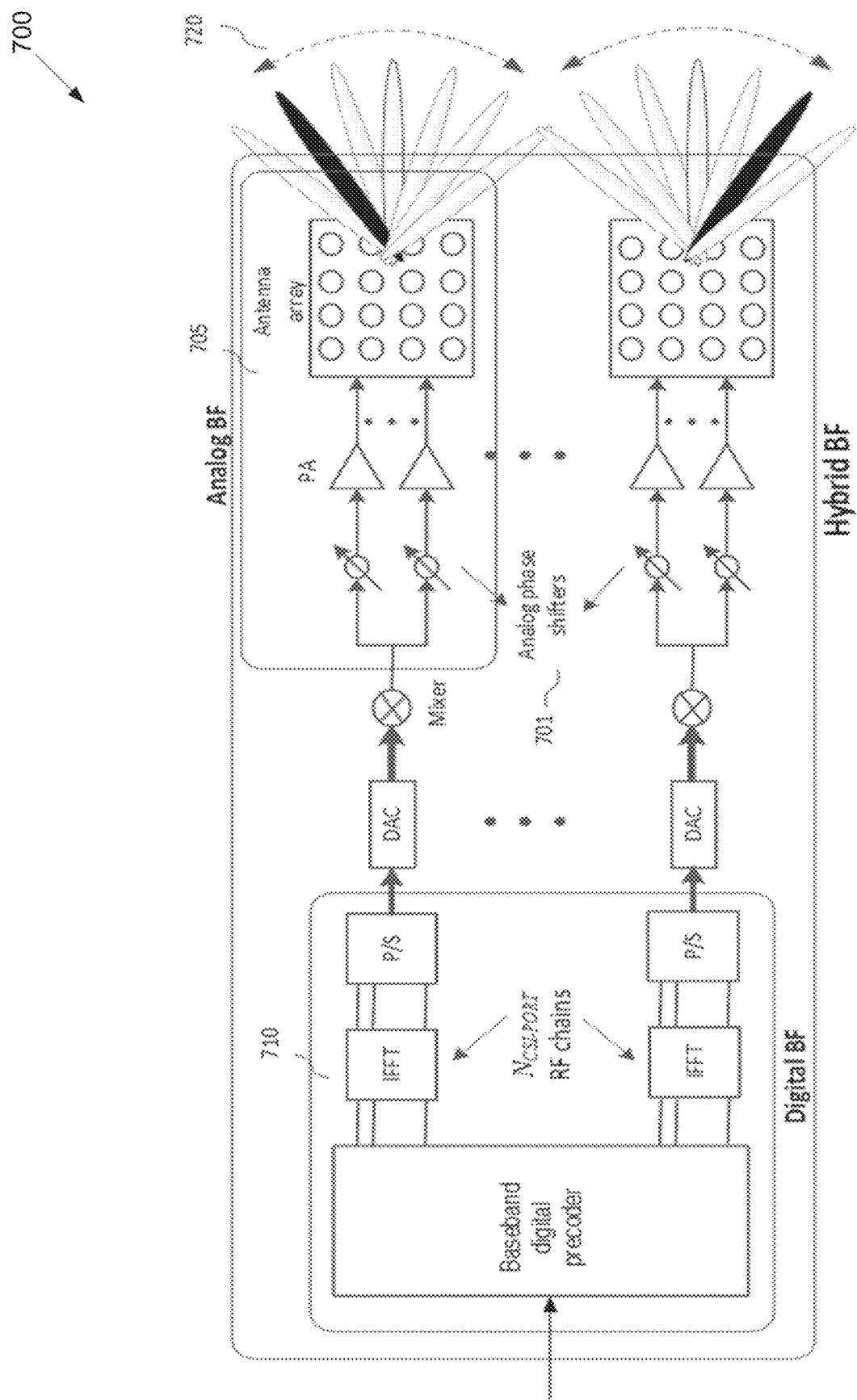
FIG. 7 illustrates an example antenna structure according to embodiments of the present disclosure.

FIG. 7 illustrates an example antenna structure 700 according to embodiments of the present disclosure. An embodiment of the antenna structure 700 shown in FIG. 7 is for illustration only. For example, the antenna structure 700 may be present in a wireless communication device, such as, for example, the UE 116 or the gNB 102 in FIG. 1.

In this case, one CSI-RS port is mapped onto a large number of antenna elements which can be controlled by a bank of analog phase shifters 701. One CSI-RS port can then correspond to one sub-array which produces a narrow analog beam through analog beamforming 705. This analog beam can be configured to sweep across a wider range of angles 720 by varying the phase shifter bank across symbols or subframes. The number of sub-arrays (equal to the number of RF chains) is the same as the number of CSI-RS ports $N_{CSI-PORT}$. A digital beamforming unit 710 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the described system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting," respectively), and receiving a DL or UL transmission via a selection of a corresponding receive (RX) beam.

The described system is also applicable to higher frequency bands such as >52.6 GHz. In this case, the system can employ only analog beams. Due to the O2 absorption loss around 60 GHz frequency (~10 dB additional loss @100 m distance), larger number of and sharper analog beams (hence larger number of radiators in the array) may be needed to compensate for the additional path loss.

To improve the efficiency of beam management, the following concepts have been previously provided: (i) L1 based beam common or joint indication of TCI state, for data and control channels and for downlink and uplink channel with beam correspondence at the UE. The L1 based beam indication can be included in a DL DCI, e.g., DCI Format 1_0 or DCI Format 1_1 or DCI Format 1_2, (e.g., DCI with downlink assignments or DCI without downlink assignment), an UL DCI, e.g., DCI Format 0_0 or DCI Format 0_1 or DCI Format 0_2, (e.g., DCI with UL grant or DCI without UL grant), or a dedicated DCI for TCI, (e.g., TCI DCI—if conveying DL and UL TCI, or DL TCI DCI—if conveying DL TCI, or UL DCI TCI if conveying UL TCI); (ii) a group UE TCI indication, wherein a DCI conveys a TCI to a group of UEs; and (iii) two stage TCI beam indication, wherein a TCI is conveyed through a first stage/part TCI indication and a second stage/part TCI indication.

One of the unique characteristics of high speed train (HST), in addition to the fact that users are moving at a high speed (e.g., 500 km/hr) is that users move along a fixed, known and repeatable trajectory. Considering the following example (TR 38.913 section 6.1.5): (i) remote radio head (RRH) or a TRP or a gNB or base station located at a distance of 5 meters from the railway track; (ii) train carriage with width 3.38 m and train carriage length of 20 m; (iii) assume that the users in one carriage (or part of a carriage) form a UE group, with a lead UE for the group located in or near the middle of the carriage (or part of the carriage); (iv) the train is assumed to be travelling at a speed of 125 m/s (i.e., 450 km/hr)

Figure 8:
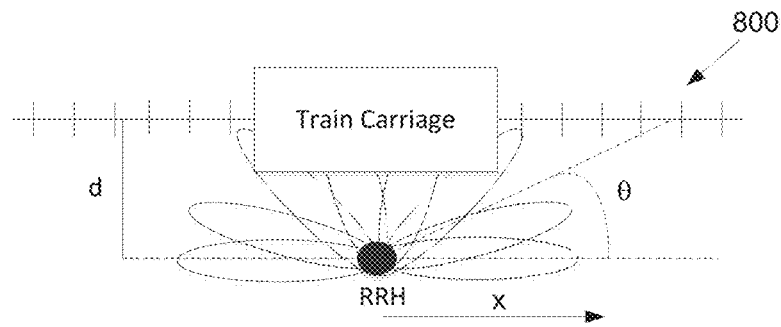
FIG. 8 illustrates an example RRH beam structure according to embodiments of the present disclosure.

FIG. 8 illustrates an example RRH beam structure 800 according to embodiments of the present disclosure. An embodiment of the RRH beam structure 800 shown in FIG. 8 is for illustration only.

In the present disclosure, it is assumed that the RRH (or TRP or gNB or base station) is pointing towards the railway track (as shown in FIG. 8) and is providing coverage of 180 degrees (along the railway track in both directions) with 64 beams. The angular separation between the beams in this example is approximately 3 degrees.

Figure 9A:
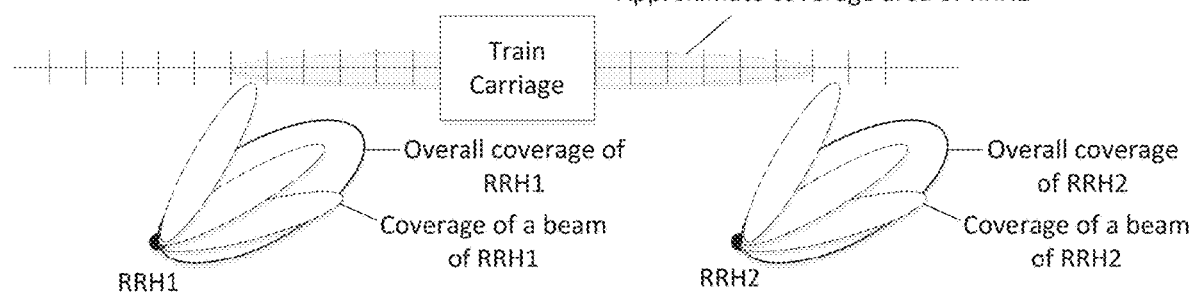
FIG. 9A illustrates an example RRH beam structure for a train pass according to embodiments of the present disclosure.

FIG. 9A illustrates an example RRH beam structure for a train pass 900 according to embodiments of the present disclosure. An embodiment of the RRH beam structure for a train pass 900 shown in FIG. 9A is for illustration only. In a variation, the RRH can be pointing to the track with an angle as illustrated in FIG. 9A.

Figure 9B:
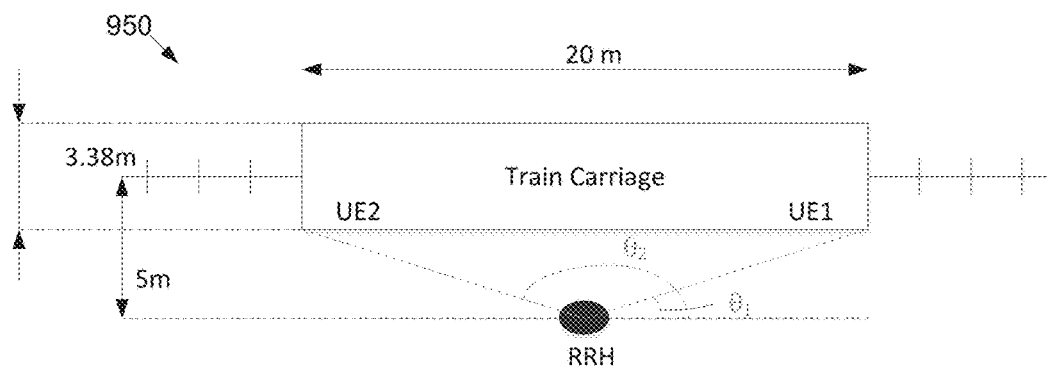
FIG. 9B illustrates an example RRH train pass according to embodiments of the present disclosure.

As explained and illustrated FIG. 9B, a single beam cannot be used for all users of the same carriage as the train passes by the RRH (or TRP or gNB or base station).

FIG. 9B illustrates an example RRH train pass 950 according to embodiments of the present disclosure. An embodiment of the RRH train pass 950 shown in FIG. 9B is for illustration only.

Now the time (the UE spends traversing one beam) is calculated. This depends on where the UE is along the railway track. Assume that the distance along the track from the RRH (or TRP or gNB or base station) is x, and that the distance along the direction perpendicular to the track is d. d is a constant (the user is only moving along the track), while x changes as the train moves along the track, where $$\frac{\Delta x}{\Delta t} = v,$$

with v being the speed of the train. It may be given by: $x = d \cot \theta$, for example, as illustrated in FIG. 8. Therefore, $$v = \frac{\Delta x}{\Delta t} = -d\csc^2\theta \frac{\Delta \theta}{\Delta t}.$$

The negative sign is to signify that as x increases, θ decreases, and vice versa. Therefore, the absolute value of the rate of change of angle θ is $$\left|\frac{\Delta \theta}{\Delta t}\right| = \frac{v}{d}\sin^2\theta.$$

As a user passes in front of the RRH (or TRP or gNB or base station), θ=90, and $$\frac{\Delta \theta}{\Delta t} = \frac{v}{d},$$

assuming that v=125 m/s, and d=5 m, i.e., the user is in the middle of the train, then $$\frac{d\theta}{dt} = 25 \text{rad/sec} = 1433 \text{ degrees/sec}.$$

If the beam width is 3 degrees, 2.1 ms (milli-seconds) is provided to traverse the beam.

As the user moves further away from the RRH (or TRP or gNB or base station) along the track, the time (e.g., for a user to cross one beam) increases as shown in TABLE 1.

TABLE 1

Time a user spends in a beam as a function of the distance of user x along the track. It is assumed that the user is at a distance d = 5 m perpendicular to the track from the RRH (or TRP or gNB or base station) and is moving at a speed v = 125 m/sec and that the beam width is 3 degrees.

| Distance along track from RRH (x) | $\left\|\frac{\Delta \theta}{\Delta t}\right\|$ in degrees per second | Approximate time to cross one beam (in ms) |
|---|---|---|
| 0 | 1433 | 2.1 |
| 5 | 716.2 | 4.2 |
| 10 | 286.5 | 10.5 |
| 50 | 14.18 | 211.5 |
| 100 | 3.57 | 839.9 |

As the train passes by the RRH (or TRP or gNB or base station) (see FIG. 9), a UE located at the lower right most corner of the train (e.g., UE1) has an azimuth angle $\theta_1$=18.3 degrees, while a UE located at the lower left most corner of the train (e.g., UE2) has an azimuth angle $\theta_2$=161.7 degrees. A UE in the center of carriage has an azimuth angle of 90 degrees. In this example, the UE takes approximately (161.7−18.3)/3=48 beams to cover the users of one carriage.

Figure 10:
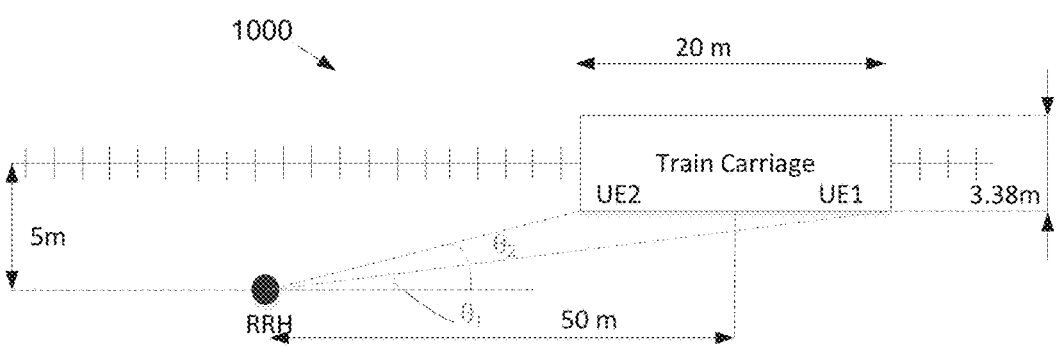
FIG. 10 illustrates an example RRH train moving according to embodiments of the present disclosure.

If the train moves further to the right by 50 meters, as shown in FIG. 10, a UE located at the lower right most corner of the train (e.g., UE1) has an azimuth angle $\theta_1$=3.16 degrees, while a UE located at the lower left most corner of the train (e.g., UE2 has an azimuth angle $\theta_2$=4.73 degrees. In this example, the UE takes approximately 1 beam to cover the users of one carriage.

TABLE 2 shows the azimuth angle for a user at the right most part of the train and the azimuth angle for a user at the left most part of the train and the approximate number of beams to cover a train carriage at different distances along the track from an RRH (or TRP or gNB or base station).

FIG. 10 illustrates an example RRH train moving 1000 according to embodiments of the present disclosure. An embodiment of the RRH train moving 1000 shown in FIG. 10 is for illustration only.

TABLE 2

Azimuth angle for user at the right of a train carriage, azimuth angle for a user at the left of a train carriage and number of beams to cover a train carriage. It is assumed that the user is at a distance d = 3.31 m perpendicular to the track from the RRH (or TRP or gNB or base station) and that the beam width is 3 degrees.

| Distance along track from RRH (x) | Azimuth angle for user at right of train carriage | Azimuth angle for user at left of train carriage | Number of beams cover train carriage |
|---|---|---|---|
| 0 | 18.31 | 161.69 | 48 |
| 5 | 12.44 | 146.50 | 45 |
| 10 | 9.40 | 90 | 27 |
| 20 | 6.30 | 18.31 | 5 |
| 50 | 3.16 | 4.73 | 1 |

From the results presented in TABLE 1, the beam update rate can be quite large when a train carriage is passing in front of the RRH (or TRP or gNB or base station). If there are many users on the train carriage that are in the active state, that are required to do beam reporting and receive beam indication update, this may overload the air interface with control information for beam management (e.g., beam measurement, beam reporting and beam indication). Hence, this necessitates a group-based beam indication using L1 control signaling to reduce overhead and latency (exploiting the fact the UE mobility is predictable, i.e., regardless of number of beams needed for seamless connectivity at different distances of the carriage from the RRH (or TRP or gNB or base station), those beams can be determined/indicated a priori via a single or small number of beam indications). Furthermore, users remain at a same relative position within a train compared to the time at which a beam change.

However, as demonstrated in FIG. 9, a single beam cannot be used for all users of the train carriage as the train passes in front of or close to the RRH (or TRP or gNB or base station). A single UE group DCI for beam indication can be used to indicate the different beams of the users in a group. However, this increases the size of the L1 control message for beam indication (e.g., TCI DCI or DL TCI DCI or UL TCI DCI).

An alternative solution is to establish a mapping between the indicated UE group TCI index and the TCI state of a UE in a UE group. The signaling details and mechanisms of this mapping scheme are described in this disclosure.

A further example is that the TCI states indicated by a UE group TCI index indicate more than one TCI state ID for different entities of a UE. An entity of a UE can be a TRP; a panel of a TRP; a panel of a UE; an antenna port; a component carrier (CC); a bandwidth part; a set of PRBs; a slot or a set of slots; a symbol or a set of symbols; and/or any combination of the previous mentioned examples of entities.

In release 15/16 a common framework is shared for CSI and beam management, while the complexity of such framework is justified for CSI in FR1, it makes beam management procedures rather cumbersome, and less efficient in frequency range 2 (FR2). Efficiency here refers to overhead associated with beam management operations and latency for reporting and indicating new beams.

Furthermore, in release 15 and release 16, the beam management framework is different for different channels. This increases the overhead of beam management and could lead to less robust beam-based operation. For example, for PDCCH the TCI state (used for beam indication), is updated through medium access control channel element (MAC CE) signaling. While the TCI state of PDSCH can updated through a DL DCI carrying the DL assignment with codepoints configured by MAC CE, or the PDSCH TCI state can follow that of the corresponding PDCCH or use a default beam indication.

In the uplink direction, the spatialRelationInfo framework is used for beam indication for PUCCH and SRS, which is updated through RRC and MAC CE signaling. For PUSCH the SRS resource indicator (SRI), in an UL DCI with UL grants, can be used for beam indication. Having different beam indications and beam indication update mechanisms increases the complexity, overhead and latency of beam management, and could lead to less robust beam-based operation.

One of the promising deployment scenarios for NR is support of high-speed trains, and users travelling on highways. Given the scarcity of spectrum available in FR1 (below 7 GHz), and the abundance of spectrum available in FR2 (24.5 GHz to 52.6 GHz), it may provide that FR2 and frequencies beyond 52.6 GHz are a natural spectrum choice for such deployment scenarios. However, the complex and less efficient beam management procedures of release 15 and release 16 could lead to a higher rate of beam failure, and consequently a higher rate of link failures. To address this, methods and apparatus to enhance the efficiency of beam management for such deployment scenarios are provided in the present disclosures.

This present disclosure considers design aspects related to beam management for a high speed train and highway scenarios. Wherein, users in a train carriage, or part of a train carriage, are part of a UE group. A UE group TCI DCI includes a common UE group TCI index (common to all users of a UE group) and possibly a UE specific beam indicator. A UE determines a TCI state ID based on a UE group TCI index and a UE specific beam indicator signaled in a UE group TCI DCI, and a configured/updated association between UE group TCI indices and TCI state IDs. The association between UE group TCI indices and TCI state IDs can be configured/updated for each UE by UE specific signaling (e.g., unicast to a UE) or UE group-common signaling (e.g., groupcast or broadcast to a group of UEs).

In the following, both FDD and TDD are considered as a duplex method for DL and UL signaling. Although exemplary descriptions and embodiments to follow assume OFDM or OFDMA, this disclosure can be extended to other OFDM-based transmission waveforms or multiple access schemes such as filtered OFDM (F-OFDM).

In the present disclosure, the term "activation" describes an operation wherein a UE receives and decodes a signal from the network (or gNB) that signifies a starting point in time. The starting point can be a present or a future slot/subframe or symbol and the exact location is either implicitly or explicitly indicated or is otherwise specified in the system operation or is configured by higher layers. Upon successfully decoding the signal, the UE responds according to an indication provided by the signal. The term "deactivation" describes an operation wherein a UE receives and decodes a signal from the network (or gNB) that signifies a stopping point in time. The stopping point can be a present or a future slot/subframe or symbol and the exact location is either implicitly or explicitly indicated or is otherwise specified in the system operation or is configured by higher layers. Upon successfully decoding the signal, the UE responds according to an indication provided by the signal.

Terminology such as TCI, TCI states, TCI state IDs, SpatialRelationInfo, target RS, reference RS, and other terms is used for illustrative purposes and is therefore not normative. Other terms that refer to same functions can also be used.

A "reference RS" corresponds to a set of characteristics of a DL beam or an UL TX beam, such as a direction, a precoding/beamforming, a number of ports, and so on. For instance, for DL, as the UE receives a reference RS index/ID, for example through a field in a DCI format, that is represented by a TCI state, the UE applies the known characteristics of the reference RS to associated DL reception. The reference RS can be received and measured by the UE (for example, the reference RS is a downlink signal such as NZP CSI-RS and/or SSB) and the UE can use the result of the measurement for calculating a beam report (in Rel-15 NR, a beam report includes at least one L1-RSRP accompanied by at least one CRI). Using the received beam report, the NW/gNB can assign a particular DL TX beam to the UE. A reference RS can also be transmitted by the UE (for example, the reference RS is an uplink signal such as SRS). As the NW/gNB receives the reference RS from the UE, the NW/gNB can measure and calculate information used to assign a particular DL TX beam to the UE. This option is applicable at least when there is DL-UL beam pair correspondence.

In another instance, for UL transmissions, a UE can receive a reference RS index/ID in a DCI format scheduling an UL transmission such as a PUSCH transmission and the UE then applies the known characteristics of the reference RS to the UL transmission. The reference RS can be received and measured by the UE (for example, the reference RS is a downlink signal such as NZP CSI-RS and/or SSB) and the UE can use the result of the measurement to calculate a beam report. The NW/gNB can use the beam report to assign a particular UL TX beam to the UE. This option is applicable at least when DL-UL beam pair correspondence holds. A reference RS can also be transmitted by the UE (for example, the reference RS is an uplink signal such as SRS or DMRS). The NW/gNB can use the received reference RS to measure and calculate information that the NW/gNB can use to assign a particular UL TX beam to the UE.

The reference RS can be triggered by the NW/gNB, for example via DCI in case of aperiodic (AP) RS or can be configured with a certain time-domain behavior, such as a periodicity and offset in case of periodic RS or can be a combination of such configuration and activation/deactivation in case of semi-persistent RS.

For mmWave bands (or FR2) or for higher frequency bands (such as >52.6 GHz) where multi-beam operation is especially relevant, a transmission-reception process includes a receiver selecting a receive (RX) beam for a given TX beam. For DL multi-beam operation, a UE selects a DL RX beam for every DL TX beam (that corresponds to a reference RS). Therefore, when DL RS, such as CSI-RS and/or SSB, is used as reference RS, the NW/gNB transmits the DL RS to the UE for the UE to be able to select a DL RX beam. In response, the UE measures the DL RS, and in the process selects a DL RX beam, and reports the beam metric associated with the quality of the DL RS. In this case, the UE determines the TX-RX beam pair for every configured (DL) reference RS.

Therefore, although this knowledge is unavailable to the NW/gNB, the UE, upon receiving a DL RS associated with a DL TX beam indication from the NW/gNB, can select the DL RX beam from the information the UE obtains on all the TX-RX beam pairs. Conversely, when an UL RS, such as an SRS and/or a DMRS, is used as reference RS, at least when DL-UL beam correspondence or reciprocity holds, the NW/gNB triggers or configures the UE to transmit the UL RS (for DL and by reciprocity, this corresponds to a DL RX beam). The gNB, upon receiving and measuring the UL RS, can select a DL TX beam. As a result, a TX-RX beam pair is derived. The NW/gNB can perform this operation for all the configured UL RS s, either per reference RS or by "beam sweeping," and determine all TX-RX beam pairs associated with all the UL RSs configured to the UE to transmit.

The following two embodiments (A-1 and A-2) are examples of DL multi-beam operations that utilize DL-TCI-state based DL beam indication. In the first example embodiment (A-1), an aperiodic CSI-RS is transmitted by the NW/gNB and received/measured by the UE. This embodiment can be used regardless of whether or not there is UL-DL beam correspondence. In the second example embodiment (A-2), an aperiodic SRS is triggered by the NW and transmitted by the UE so that the NW (or a gNB) can measure the UL channel quality for the purpose of assigning a DL RX beam. This embodiment can be used at least when there is UL-DL beam correspondence. Although aperiodic RS is considered in the two examples, a periodic or a semi-persistent RS can also be used.

FIG. 11 illustrates a flowchart of method 1100 for a DL multi-beam operation according to embodiments of the present disclosure. An embodiment of the method 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

In one example as illustrated in FIG. 11 (embodiment A-1), a DL multi-beam operation 1100 starts with the gNB/NW signaling to a UE an aperiodic CSI-RS (AP-CSI-RS) trigger or indication (step 1101). This trigger or indication can be included in a DCI and indicate transmission of AP-CSI-RS in a same (zero time offset) or in a later slot/sub-frame (>0 time offset). For example, the DCI can be related to scheduling of a DL reception or an UL transmission and the CSI-RS trigger can be either jointly or separately coded with a CSI report trigger. Upon receiving the AP-CSI-RS transmitted by the gNB/NW (step 1102), the UE measures the AP-CSI-RS and calculates and reports a "beam metric" that indicates a quality of a particular TX beam hypothesis (step 1103). Examples of such beam reporting are a CSI-RS resource indicator (CRI), or a SSB resource indicator (SSB-RI), coupled with an associated L1-RSRP/L1-RSRQ/L1-SINR/CQI.

Upon receiving the beam report from the UE, the gNB/NW can use the beam report to select a DL RX beam for the UE and indicate the DL RX beam selection (step 1104) using a TCI-state field in a DCI format such as a DCI format scheduling a PDSCH reception by the UE. In this case, a value of the TCI-state field indicates a reference RS, such as an AP-CSI-RS, representing the selected DL TX beam (by the gNB/NW). In addition, the TCI-state can also indicate a "target" RS, such as a. CSI-RS, that is linked to the reference RS, such as an AP-CSI-RS. Upon successfully decoding the DCI format providing the TCI-state, the UE selects an DL RX beam and performs DL reception, such as a PDSCH reception, using the DL RX beam associated with the reference CSI-RS (step 1105).

Alternatively, the gNB/NW can use the beam report to select a DL RX beam for the UE and indicate to the UE the selected DL RX beam (step 1104) using a value of a TCI-state field in a purpose-designed DL channel for beam indication. A purpose-designed DL channel for beam indication can be UE-specific or for a group of UEs. For example, a UE-specific DL channel can be a PDCCH that a UE receives according to a UE-specific search space (USS) while a UE-group common DL channel can be a PDCCH that a UE receives according to a common search space (CSS). In this case, the TCI-state indicates a reference RS, such as an AP-CSI-RS, representing the selected DL TX beam (by the gNB/NW). In addition, the TCI-state can also indicate a "target" RS, such as a CSI-RS, that is linked to the reference RS, such as an AP-CSI-RS. Upon successfully decoding the purpose-designed DL channel for beam indication with the TCI state, the UE selects a DL RX beam and performs DL reception, such as a PDSCH reception, using the DL RX beam associated with the reference CSI-RS (step 1105).

For this embodiment (A-1), as described above, the UE selects a DL RX beam using an index of a reference RS, such as an AP-CSI-RS, that is provided via the TCI state field, for example in a DCI format. In this case, the CSI-RS resources or, in general, the DL RS resources including CSI-RS, SSB, or a combination of the two, that are configured to the UE as the reference RS resources can be linked to (associated with) a "beam metric" reporting such as CRI/L1-RSRP or L1-SINR.

FIG. 12 illustrates another flowchart of method 1200 for a DL multi-beam operation according to embodiments of the present disclosure. An embodiment of the method 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions.

In another example as illustrated in FIG. 12 (embodiment A-2), an DL multi-beam operation 1200 starts with the gNB/NW signaling to a UE an aperiodic SRS (AP-SRS) trigger or request (step 1201). This trigger can be included in a DCI format such as for example a DCI format scheduling a PDSCH reception or a PUSCH transmission. Upon receiving and decoding the DCI format with the AP-SRS trigger (step 1202), the UE transmits an SRS (AP-SRS) to the gNB/NW (step 1203) so that the NW (or gNB) can measure the UL propagation channel and select a DL RX beam for the UE for DL (at least when there is beam correspondence).

The gNB/NW can then indicate the DL RX beam selection (step 1204) through a value of a TCI-state field in a DCI format, such as a DCI format scheduling a PDSCH reception. In this case, the TCI state indicates a reference RS, such as an AP-SRS, representing the selected DL RX beam. In addition, the TCI state can also indicate a "target" RS, such as a CSI-RS, that is linked to the reference RS, such as an AP-SRS. Upon successfully decoding the DCI format providing the TCI state, the UE performs DL receptions, such as a PDSCH reception, using the DL RX beam indicated by the TCI-state (step 1205).

Alternatively, the gNB/NW can indicate the DL RX beam selection (step 1204) to the UE using a TCI-state field in a purpose-designed DL channel for beam indication. A purpose-designed DL channel for beam indication can be UE-specific or for a group of UEs. For example, a UE-specific DL channel can be a PDCCH that a UE receives according to a USS while a UE-group common DL channel can be a PDCCH that a UE receives according to a CSS. In this case, the TCI-state indicates a reference RS, such as an AP-SRS, representing the selected DL RX beam. In addition, the TCI-state can also indicate a "target" RS, such as a CSI-RS, that is linked to the reference RS, such as an AP-SRS. Upon successfully decoding a purpose-designed DL channel for beam indication with the TCI-state, the UE performs DL reception, such as a PDSCH reception, with the DL RX beam indicated by the TCI-state (step 1205).

For this embodiment (A-2), as described above, the UE selects the DL RX beam based on the UL TX beam associated with the reference RS (AP-SRS) index signaled via the TCI-state field.

Similarly, for UL multi-beam operation, the gNB selects an UL RX beam for every UL TX beam that corresponds to a reference RS. Therefore, when an UL RS, such as an SRS and/or a DMRS, is used as a reference RS, the NW/gNB triggers or configures the UE to transmit the UL RS that is associated with a selection of an UL TX beam. The gNB, upon receiving and measuring the UL RS, selects an UL RX beam. As a result, a TX-RX beam pair is derived. The NW/gNB can perform this operation for all the configured reference RSs, either per reference RS or by "beam sweeping," and determine all the TX-RX beam pairs associated with all the reference RSs configured to the UE.

Conversely, when a DL RS, such as a CSI-RS and/or an SSB, is used as reference RS (at least when there is DL-UL beam correspondence or reciprocity), the NW/gNB transmits the RS to the UE (for UL and by reciprocity, this RS also corresponds to an UL RX beam). In response, the UE measures the reference RS (and in the process selects an UL TX beam) and reports the beam metric associated with the quality of the reference RS. In this case, the UE determines the TX-RX beam pair for every configured (DL) reference RS. Therefore, although this information is unavailable to the NW/gNB, upon receiving a reference RS (hence an UL RX beam) indication from the NW/gNB, the UE can select the UL TX beam from the information on all the TX-RX beam pairs.

The following two embodiments (B-1 and B-2) are examples of UL multi-beam operations that utilize TCI-based UL beam indication after the network (NW) receives a transmission from the UE. In the first example embodiment (B-1), a NW transmits an aperiodic CSI-RS and a UE receives and measures the CSI-RS. This embodiment can be used, for instance, at least when there is reciprocity between the UL and DL beam-pair-link (BPL). This condition is termed "UL-DL beam correspondence."

In the second example embodiment (B-2), the NW triggers an aperiodic SRS transmission from a UE and the UE transmits the SRS so that the NW (or a gNB) can measure the UL channel quality for the purpose of assigning an UL TX beam. This embodiment can be used regardless of whether or not there is UL-DL beam correspondence. Although aperiodic RS is considered in these two examples, periodic or semi-persistent RS can also be used.

Figure 13:
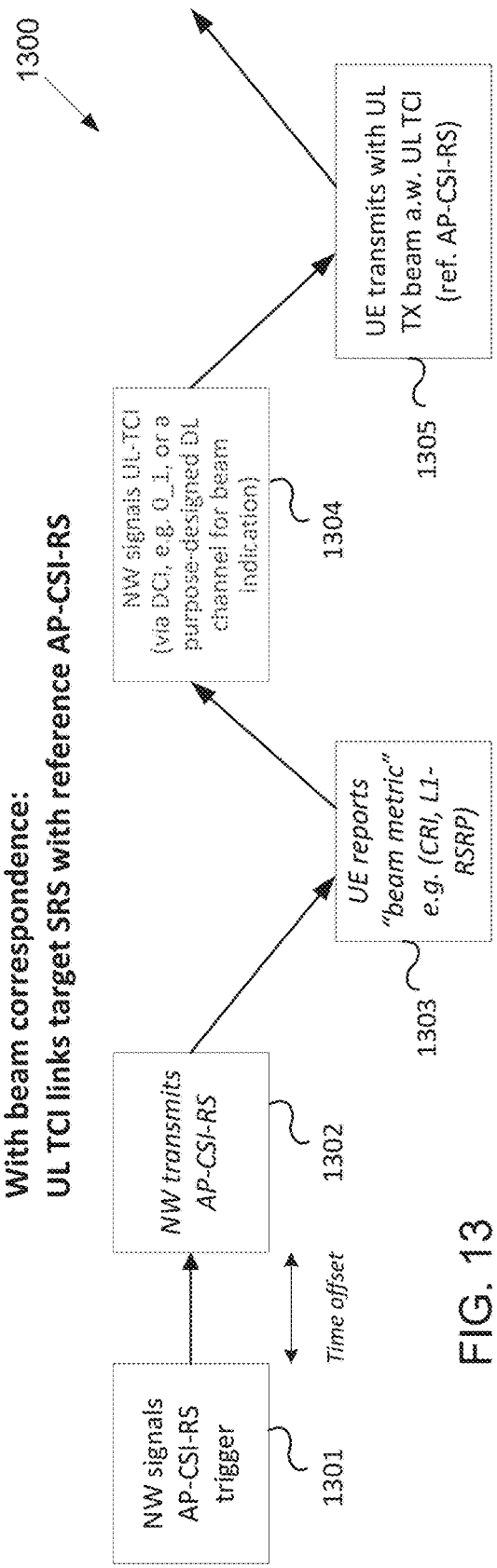
FIG. 13 illustrates a flowchart of method for a UL multi-beam operation according to embodiments of the present disclosure.

FIG. 13 illustrates a flowchart of method 1300 for a UL multi-beam operation according to embodiments of the present disclosure. An embodiment of the method 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions.

In one example as illustrated in FIG. 13 (embodiment B-1), an UL multi-beam operation 1300 starts with the gNB/NW signaling to a UE an aperiodic CSI-RS (AP-CSI-RS) trigger or indication (step 1301). This trigger or indication can be included in a DCI format, such as a DCI format scheduling a PDSCH reception to the UE or a PUSCH transmission from the UE and can be either separately or jointly signaled with an aperiodic CSI request/trigger and indicate transmission of AP-CSI-RS in a same slot (zero time offset) or in a later slot/sub-frame (>0 time offset). Upon receiving the AP-CSI-RS transmitted by the gNB/NW (step 1302), the UE measures the AP-CSI-RS and, in turn, calculates and reports a "beam metric" (indicating quality of a particular TX beam hypothesis) (step 1303). Examples of such beam reporting are CRI or SSB-RI together with an associated L1-RSRP/L1-RSRQ/L1-SINR/CQI.

Upon receiving the beam report from the UE, the gNB/NW can use the beam report to select an UL TX beam for the UE and indicate the UL TX beam selection (step 1304) using a TCI-state field in a DCI format, such as a DCI format scheduling a PUSCH transmission from the UE. The TCI-state indicates a reference RS, such as an AP-CSI-RS, representing the selected UL RX beam (by the gNB/NW). In addition, the TCI-state can also indicate a "target" RS, such as a SRS, that is linked to the reference RS, such as an AP-CSI-RS. Upon successfully decoding the DCI format indicating the TCI-state, the UE selects an UL TX beam and performs UL transmission, such as a PUSCH transmission, using the UL TX beam associated with the reference CSI-RS (step 1305).

Alternatively, the gNB/NW can use the beam report to select an UL TX beam for the UE and indicate the UL TX beam selection (step 1304) to the UE using a value of a TCI-state field in a purpose-designed DL channel for beam indication. A purpose-designed DL channel for beam indication can be UE-specific or for a group of UEs. For example, a UE-specific DL channel can be a PDCCH that a UE receives according to a USS while a UE-group common DL channel can be a PDCCH that a UE receives according to a CSS. In this case, the TCI-state indicates a reference RS, such as an AP-CSI-RS, representing the selected UL RX beam (by the gNB/NW). In addition, the TCI-state can also indicate a "target" RS, such as a SRS, that is linked to the reference RS, such as an AP-CSI-RS. Upon successfully decoding a purpose-designed DL channel providing a beam indication by the TCI-state, the UE selects an UL TX beam and performs UL transmission, such as a PUSCH transmission, using the UL TX beam associated with the reference CSI-RS (step 1305).

For this embodiment (B-1), as described above, the UE selects the UL TX beam based on the derived DL RX beam associated with the reference RS index signaled via the value of the TCI-state field. In this case, the CSI-RS resources or, in general, the DL RS resources including CSI-RS, SSB, or a combination of the two, that are configured for the UE as the reference RS resources can be linked to (associated with) "beam metric" reporting such as CRI/L1-RSRP or L1-SINR.

Figure 14:
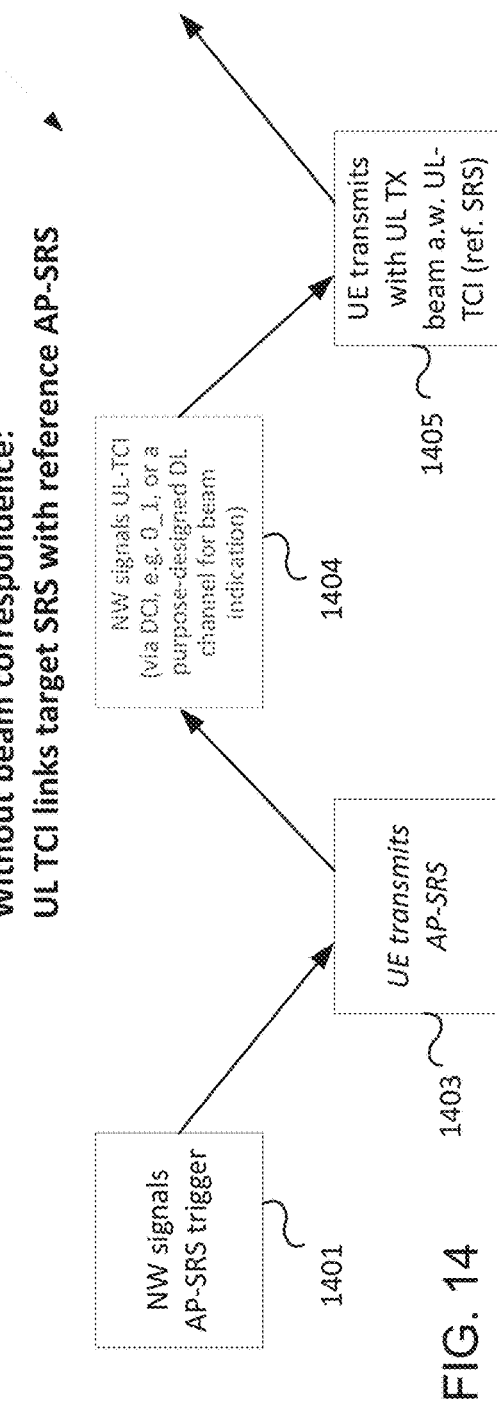
FIG. 14 illustrates another flowchart of method for a UL multi-beam operation according to embodiments of the present disclosure.

FIG. 14 illustrates another flowchart of method 1400 for a UL multi-beam operation according to embodiments of the present disclosure. An embodiment of the method 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions.

In another example illustrated in FIG. 14 (embodiment B-2), an UL multi-beam operation 1400 starts with the gNB/NW signaling to a UE an aperiodic SRS (AP-SRS) trigger or request (step 1401). This trigger can be included in a DCI format, such as a DCI format scheduling a PDSCH reception or a PUSCH transmission. Upon receiving and decoding the DCI format with the AP-SRS trigger (step 1402), the UE transmits AP-SRS to the gNB/NW (step 1403) so that the NW (or gNB) can measure the UL propagation channel and select an UL TX beam for the UE.

The gNB/NW can then indicate the UL TX beam selection (step 1404) using a value of the TCI-state field in the DCI format. In this case, the UL-TCI indicates a reference RS, such as an AP-SRS, representing the selected UL TX beam. In addition, the TCI-state can also indicate a "target" RS, such as a SRS, that is linked to the reference RS, such as an AP-SRS. Upon successfully decoding the DCI format providing a value for the TCI-state, the UE transmits, for example a PUSCH or a PUCCH, using the UL TX beam indicated by the TCI-state (step 1405).

Alternatively, a gNB/NW can indicate the UL TX beam selection (step 1404) to the UE using a value of a TCI-state field in a purpose-designed DL channel for beam indication. A purpose-designed DL channel for beam indication can be UE-specific or for a group of UEs. For example, a UE-specific DL channel can be a PDCCH that a UE receives according to a USS while a UE-group common DL channel can be a PDCCH that a UE receives according to a CSS. In this case, the UL-TCI indicates a reference RS, such as an AP-SRS, representing the selected UL TX beam. In addition, the TCI-state can also indicate a "target" RS, such as a SRS, that is linked to the reference RS, such as an AP-SRS. Upon successfully decoding a purpose-designed DL channel for beam indication through a value of the TCI-state field, the UE transmits, such as a PUSCH or a PUCCH, using the UL TX beam indicated by the value of the TCI-state (step 1405).

For this embodiment (B-2), as described above, the UE selects the UL TX beam from the reference RS (in this case SRS) index signaled via the value of the TCI-state field.

In one embodiment (component 1), a UE specific mapping of a UE group TCI index to a TCI state is provided.

Figure 15:
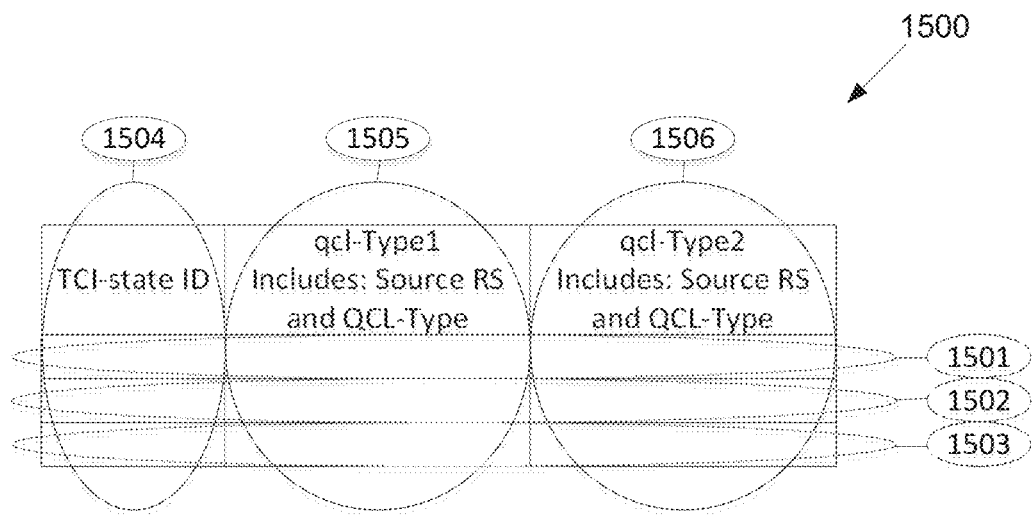
FIG. 15 illustrates an example TCI-state configuration according to embodiments of the present disclosure.

FIG. 15 illustrates an example TCI-state configuration 1500 according to embodiments of the present disclosure. An embodiment of the TCI-state configuration 1500 shown in FIG. 15 is for illustration only.

A TCI state establishes a mapping between an index (ID) of a TCI state and one or two source RS with a QCL type, according to release 15 of 3GPP. FIG. 15 is an example of such TCI-state configuration. A TCI-state configuration table contains a row for each TCI-state ID (1501, 1502, 1503). Each row contains a TCI-state ID (1504), QCL-Type1 (1505), and optionally QCL-Type2 (1506). Each QCL-Type includes a source reference signal and a QCL-Type, where the QCL-Type can be Type-A, Type-B, Type-C or Type-D. Each TCI-state can have at most 1 QCL-Type-D (for spatial Rx parameter). A reference signal can be associated with another reference signal through a TCI-state ID.

A UE can be configured through RRC signaling with a set of N TCI states according to FIG. 15.

Figure 16:
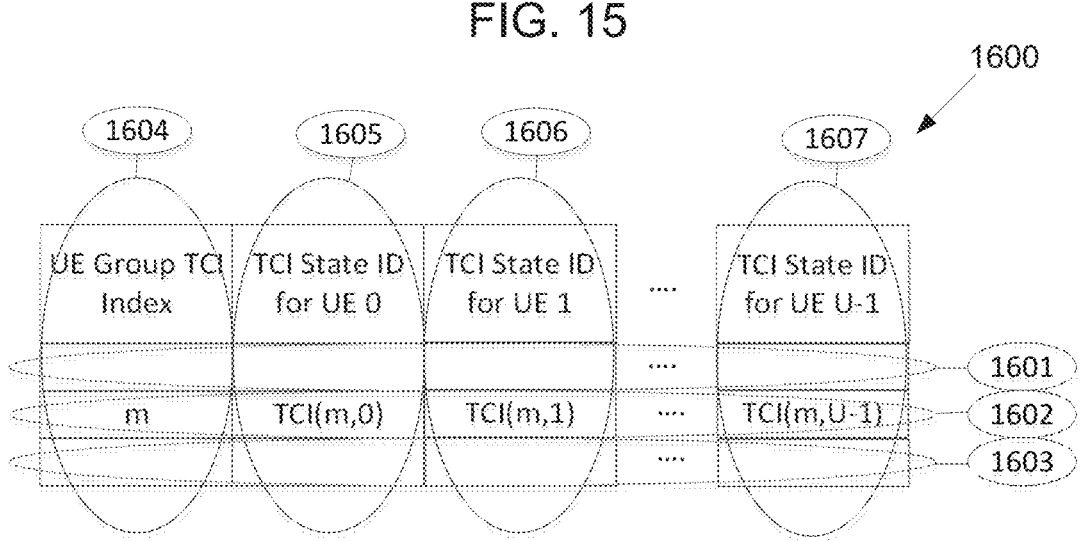
FIG. 16 illustrates another example TCI-state configuration according to embodiments of the present disclosure.

FIG. 16 illustrates another example TCI-state configuration 1600 according to embodiments of the present disclosure. An embodiment of the TCI-state configuration 1600 shown in FIG. 16 is for illustration only.

Figure 17:
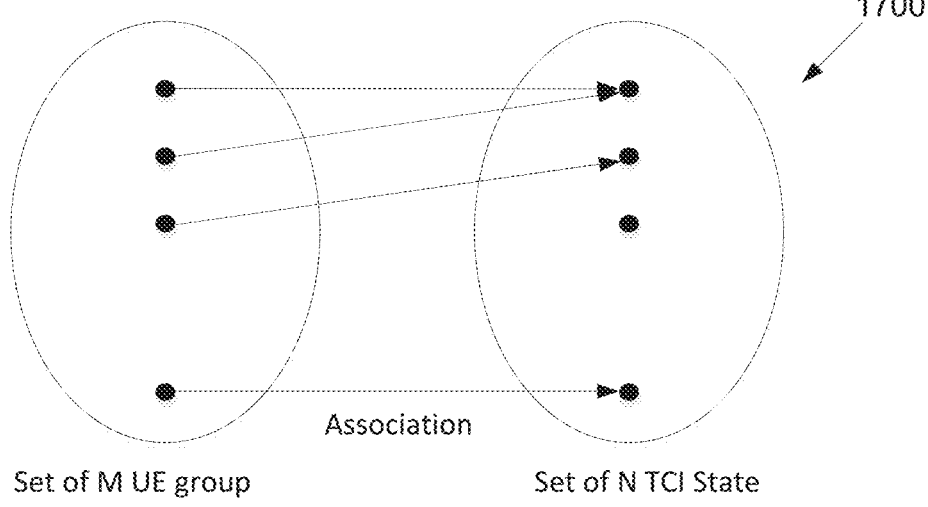
FIG. 17 illustrates an example UE group TCI indices and TCI state IDs according to embodiments of the present disclosure.

FIG. 17 illustrates an example UE group TCI indices and TCI state IDs 1700 according to embodiments of the present disclosure. An embodiment of the UE group TCI indices and TCI state IDs 1700 shown in FIG. 17 is for illustration only.

A UE can be further configured with a mapping between a UE group TCI index and a TCI-state ID as illustrated in FIG. 16 and in FIG. 17. In FIG. 16, a UE group TCI index configuration table contains a row for each UE group TCI index (1601, 1602, 1603). Each row contains: (i) a UE group TCI index (1604), this is the index that is indicated in a UE group TCI DCI; (ii) TCI state ID for UE 0 (1605), this is the TCI state ID of UE 0, when receiving a corresponding UE group TCI index; (iii) TCI state ID for UE 1 (1606), this is the TCI state ID of UE 1, when receiving a corresponding UE group TCI index . . . ; and (iv) TCI state ID for UE U−1 (1607), this is the TCI state ID of UE U−1, when receiving a corresponding UE group TCI index.

When there are U UEs in a UE group, a UE group TCI index(m) corresponds to TCI state ID(m, 0) for UE 0, TCI state ID (m, 1) for UE 1, . . . , TCI state ID(m, U−1) for UE U−1. The number of UEs in a group U, can change and be updated dynamically as users enter and leave a group, for example users embarking or disembarking from a train, or users becoming active (e.g., in RRC CONNECTED state) or inactive (e.g., in RRC IDLE state or RRC INACTIVE state). Hence, the number of columns in the Table of FIG. 16 can change dynamically as U changes.

In one example, a UE is allocated, for example by higher layer configuration, more than one of the U TCI state IDs associated with a UE group TCI index, for example the more than one TCI state IDs can correspond to DL/UL of different entities of the UE. Wherein, an entity of the UE can be a TRP; a panel of a TRP; a panel of a UE; an antenna port; a CC; a bandwidth part; a set of PRBs; a slot or a set of slots; a symbol or a set of symbols; and/or any combination of the previous mentioned examples of entities, as described in component 3.

In a special example, the signaling framework and examples of this component can be used for individual UEs, i.e., a UE group can be considered to have single UE, i.e., U=1. The mapping of UE group TCI index to TCI state ID or the association between UE group TCI index and TCI state ID, for a UE according to its corresponding column, can be done according to the following examples.

In one example 1.1, the mapping can be a set of M order pairs: {(UE group TCI index(0), TCI state ID($\alpha$)), (UE group TCI index(1), TCI state ID($\beta$)), . . . , (UE group TCI index(M−1), TCI state ID($\omega$))}. This set establishes an association between: (i) a UE group TCI index(0) and TCI state ID($\alpha$); (ii) a UE group TCI index(1) and TCI state ID($\beta$); . . . (iii) a UE group TCI index(M−1), TCI state ID($\omega$).

In example 1.1.1, this mapping is determined (fixed) based on the TCI states IDs. For example, UE group TCI index (m) is mapped to TCI state ID ($n_m$). One special case is $n_m$=m.

In another example 1.2, a UE is a configured a set of M TCI-state IDs: {TCI state ID($\alpha$), TCI state ID($\beta$), . . . , TCI state ID($\omega$)}, wherein, the order of the TCI state ID within the set determines the association with UE group TCI index. For example: (i) TCI state ID($\alpha$) (first element in the set) is associated with UE group TCI index(0); (ii) TCI state ID($\beta$) (second element in the set) is associated with UE group TCI index(1) . . . (iii) TCI state ID($\omega$) (Mth element in the set) is associated with UE group TCI index(M−1).

FIG. 17 shows an example of association of UE group TCI indices and TCI state IDs. In examples 1.1 and 1.2 the TCI state IDs can be unique (i.e., a TCI state ID is associated to only one UE group TCI index), or can be repeated (i.e., a TCI state ID is associate to more than one UE group TCI index). M is the number of UE group TCI indices. N is the number of TCI state IDs. M and N can have the same value, i.e., M=N, alternatively the M and N can have different values, i.e., M>N or M<N. Hence, at least one of the following configurations is supported (used): (i) each TCI state ID index is associated with one and only one UE group TCI index; (ii) each TCI state ID index is associated with at most one UE group TCI index; (iii) each TCI state ID index is associated with at least one UE group TCI index; (iv) some TCI state IDs have no association with any UE group TCI index, some TCI state IDs have association with one UE group TCI index, and some TCI state IDs have association with more than one UE group TCI index.

In one example, M is fixed, e.g., to 1 or 2. In another example, M depends on N. For example, if N<=t, M is fixed to a value m1, and if N>t, M is fixed to another value m2, where t is a fixed threshold, and m1=1 and m2=2 as an example. In another example, M is configured via higher layer (RRC) signaling.

In one example 1.3, the mapping of UE group TCI indices to TCI state IDs or the association between UE group TCI indices and TCI state IDs is UE specific, i.e., each UE has its own mapping rule, and is configured and/or updated through UE specific signaling.

In another example 1.4, the mapping of UE group TCI indices to TCI state IDs or the association between UE group TCI indices and TCI state IDs is common (the same) for UEs of a group and is configured and/or updated through UE group specific signaling or through common signaling (i.e., signaling common to a group of UEs in a cell or common to all UEs in a cell). In this example, there is a single column for all UEs of FIG. 16 as shown in FIG. 18.

Figure 18:
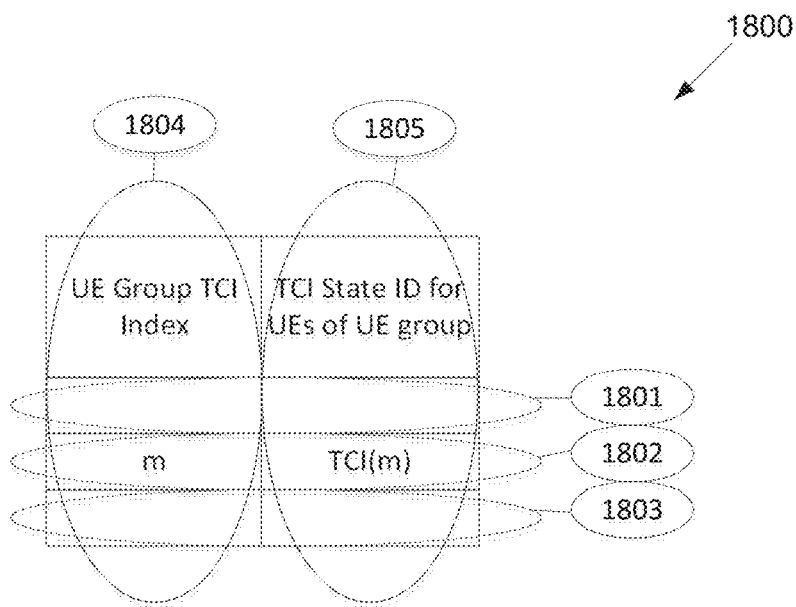
FIG. 18 illustrates yet another example TCI-state configuration according to embodiments of the present disclosure.

FIG. 18 illustrates yet another example TCI-state configuration 1800 according to embodiments of the present disclosure. An embodiment of the TCI-state configuration 1800 shown in FIG. 18 is for illustration only.

As a special example of example 1.4, the mapping of UE group TCI indices to TCI state IDs or the association between UE group TCI indices and TCI state IDs can be UE group TCI index (m)=TCI state ID(f(m)), for m=0, 1, . . . , M−1. Where f(m) is a mapping function that can be specified by system specifications and/or configured by RRC signaling and/or MAC CE signaling and/or L1 signaling. One example of such function can be, f(m)=(a·m+b) % N=(a·m+b) mod N. where N is the number of configured TCI state IDs or a configured value that is smaller than the number of configured TCI state IDs. %=mod is a module operator, with output in the range of 0 . . . N−1. In one special example, a=1 and b=0 and M=N, which trivially maps UE group TCI index (m) to TCI state ID (m).

In another example 1.4.1, the mapping of UE group TCI indices to TCI state IDs or the association between UE group TCI indices and TCI state IDs is: (i) for some UEs: UE specific, i.e., each UE has its own mapping rule, and is configured and/or updated through UE specific signaling; and (ii) for the remaining UEs: common (the same) for the remaining UEs of a UE group, and is configured and/or updated through UE group specific signaling or through common signaling (i.e., signaling common to a group of UEs in a cell or common to all UEs in a cell).

Figure 19:
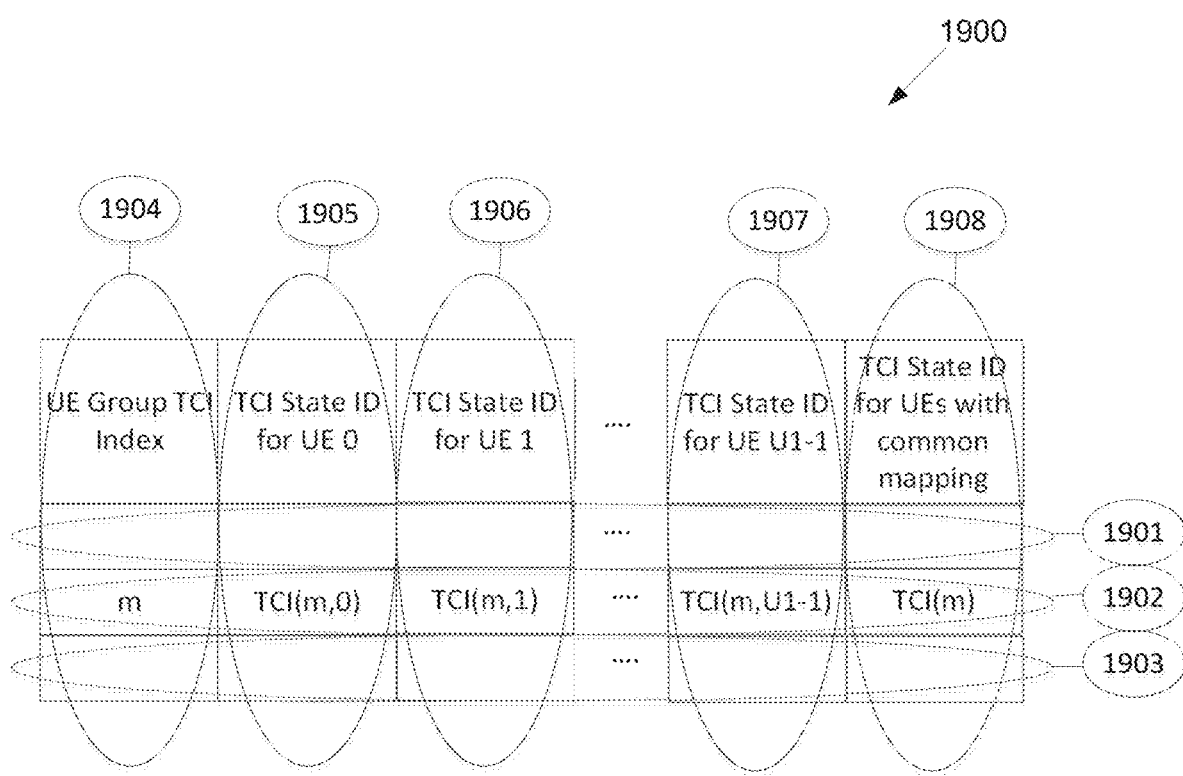
FIG. 19 illustrates yet another example TCI-state configuration according to embodiments of the present disclosure.

In this example, referring to FIG. 16, there is a column for each UE with its own mapping and one column for all UEs with UE group common mapping as shown in FIG. 19. Where, U1 is the number UEs with UE specific mapping.

FIG. 19 illustrates yet another example TCI-state configuration 1900 according to embodiments of the present disclosure. An embodiment of the TCI-state configuration 1900 shown in FIG. 19 is for illustration only.

The mapping of UE group TCI indices to TCI state IDs or the association between UE group TCI indices and TCI state IDs, described in examples 1.3 and 1.4, can be configured and/or updated through at least one of: (i) RRC signaling; MAC CE signaling, or L1 control signaling.

According to the examples of this component: (i) a UE is configured or updated a mapping of UE group TCI indices to TCI state IDs or an association between UE group TCI indices and TCI state IDs. This association, for example, is according to the corresponding UE column of FIG. 16; (ii) a gNodeB transmits and a UE receives a UE group TCI DCI, which includes UE group TCI index (m). Where, UE group TCI index (m) is the UE group TCI index determined by the gNB for beam indication to a group of UEs; and (iii) a UE determines a TCI state ID based on the configured association between the UE group TCI indices and TCI state IDs, and a UE group TCI index (m) received in UE group TCI DCI.

Note that a UE group TCI index can be mapped to different TCI state IDs for different UEs (i.e., a UE group TCI index corresponding to the TCI states of FIG. 9), alternatively a UE group TCI index can be mapped to the same TCI state ID for different UEs (i.e., a UE group TCI index corresponding to the TCI state of FIG. 10).

In one example 1.5, the UE group TCI index (m) is the TCI state ID of the lead UE of a group of UEs. Where, a lead UE can be a UE configured by the network or a special UE (e.g., customer premise equipment (CPE)).

In another example 1.6, there is no lead UE for a UE group, or the UE group TCI index is not equal to the TCI state ID of the lead UE. In this example, the UE group TCI index (m) can be determined based on network implementation.

In another example 1.A, a UE is configured (e.g., through RRC signaling and/or MAC CE signaling and/or L1 signaling) a first association $A_1$ between UE group TCI indices and UE group TCI state IDs, or a mapping of UE group TCI indices to TCI state IDs. A UE is configured (e.g., through RRC signaling and/or MAC CE signaling and/or L1 signaling) a second association $A_2$ between UE group TCI indices and UE group TCI state IDs, or a mapping of UE group TCI indices to TCI state IDs. A UE uses a first association for determining a TCI state ID based on a received UE group TCI index. A user can be configured through RRC signaling and/or through MAC CE and/or through L1 signaling to transition or switch from a first association to a second association.

The time of the switching can be determined based on:
- specific system frame number and/or subframe number and/or slot and/or symbol number, or
- after a time period (in slots or subframes or frames or milli-seconds) from the time of a successfully received activation/transition/switching command or the HARQ-ACK acknowledgement of the activation/transition/switching command. This time period can depend on a UE capability, or
- as soon as possible and not to exceed a time period (in slots or subframe or frames or milli-seconds) from the time of a successfully received activation/transition/ switching command or the HARQ-ACK acknowledgement of the activation/transition/switching command.

The association to use (e.g., $A_1$ or $A_2$) can be indicated in the UE group TCI DCI, or the association to use depends on the RRH (or TRP or gNB or base station) transmitting the UE group TCI DCI, i.e., first RRH (or TRP or gNB or base station) for first association $A_1$, second RRH (or TRP or gNB or base station) for second association $A_2$. For example, during handover a UE switches from a first association $A_1$ to a second association $A_2$. After switching, a UE uses a second association for determining a TCI state ID based on a received UE group TCI index.

A first association $A_1$ can correspond to a first RRH (or TRP or gNB or base station) and a second association $A_2$ can correspond to a second RRH (or TRP or gNB or base station).

In one example 1.7, the mapping of UE group TCI indices to TCI state IDs or the association between UE group TCI indices and TCI state IDs can be determined based on a UE location or position within a group of UEs or a UE location or position relative to a lead UE of a group of UEs. The association can be determined based on data (e.g., beam reports, RSRP/RSRQ, positioning information) collected from prior UEs passing through the same location and with a same or similar position within a group of UEs or relative to the lead UE. For example, the network uses artificial intelligence techniques on data collected from prior UEs passing through a location to determine a mapping of UE group TCI indices to TCI state IDs or association between UE group TCI indices and TCI state IDs.

This association can be RRH (or TRP or gNB or base station) dependent, as each RRH (or TRP or gNB or base station) has its own topology in terms of its position with respect to the track or road and any curves or bends on that track or road. Therefore, the association of TCI state IDs and UE group TCI indices can be updated as the train moves from one RRH (or TRP or gNB or base station) to the next one through MAC CE signaling and/or through L1 signaling.

In another example 1.8, the TCI state ID in the above examples can be replaced by source RS ID, wherein the association or mapping is between a UE group TCI index and source RS ID with QCL Type D. The rest of the description in the examples follows with just replacing TCI state ID by source RS ID.

In another example 1.9, the TCI state ID in the above examples for an uplink channel can be replaced by a spatial relation information (SpatialRelationInfo) or a reference signal with a spatial relation, wherein the association or mapping is between a UE group TCI index and a SpatialRelationInfo or a reference signal with a spatial relation. The rest of the description in the examples follows with just replacing TCI state ID by SpatialRelationInfo or a reference signal with a spatial relation.

In one example 1.10 and following the previous examples (1.1 to 1.9), the UE group TCI conveys a UE group TCI index for: (i) one UE group TCI index for DL channels; (ii) one UE group TCI index for UL channels; (iii) one UE group TCI index common (joint) for DL and UL channels; or (iv) Two UE group TCI indices, one for DL channels and another for UL channels.

In one example 1.10.1, a first stage/part beam indication can indicate the number of UE group TCI indices (i.e., one or two based on the above examples).

In another example 1.10.2, the number of UE group TCI indices is configured and/or updated by RRC signaling and/or MAC CE signaling and/or L1 signaling.

In another example 1.10.3, the content of the UE group TCI (e.g., DL or UL or common for DL and UL) is determined by field in the UE group TCI DCI.

In another example 1.10.4, the content of the UE group TCI (e.g., DL or UL or common for DL and UL) is determined by configuration, for example: (i) based on UE group radio network temporary identifier (RNTI) value: i.e., different RNTI configured for DL only, UL only and common UL/DL; (ii) based on physical resources (time/frequency/code): i.e., different resources configured for DL only, UL only and common UL/DL; (iii) based on control resource set (CORESET): i.e., different CORESETs configured for DL only, UL only and common UL/DL; (iv) Based on Search Space: i.e., different search spaces configured for DL only, UL only and common UL/DL; and/or based CCE index: i.e., different CCE indices configured for DL only, UL only and common UL/DL.

In one example 1.11, the encoding of a payload of a beam indication channel follows the Polar encoding of NR control channels as described in 3GPP specification 38.212.

In one example 1.11.1, polar encoding is used when the payload is greater than 11 bits.

In another example 1.11.2, a cyclic redundancy check (CRC) is appended or prepended to the payload.

In another example 1.11.3, a CRC or part of a CRC is scrambled with an RNTI. For UE group specific signaling, a UE group specific RNTI can be used.

In another example 1.12, the encoding of payload of beam indication follows the encoding of small block length as described in section 5.3.3.3 of TS 38.212 v16.5.0, using basis sequences as provided in Table 5.3.3.3-1 of TS 38.212 v16.5.0.

In one example 1.12.1, small block length encoding is used when the payload is between 3 bits and 11 bits.

In another example 1.12.2, no CRC is added to the payload prior to encoding.

In one example 1.13, a user can be part of a first UE group $G_1$. The user is configured a UE group specific RNTI to receive and decode the UE group TCI DCI, the user is configured an association between UE group TCI index and TCI state ID. A user is configured a second UE group $G_2$. For a second UE group, a user is configured a UE group specific RNTI to receive and decode the UE group TCI DCI, the user is configured an association between UE group TCI index and TCI state ID. A user can be configured through RRC signaling and/or through MAC CE and/or through L1 signaling to transition or switch from a first UE group $G_1$ to a second UE group $G_2$. The time of the switching can be determined based on:

Specific system frame number and/or subframe number and/or slot and/or symbol number, or after a time period (in slots or subframes or frames or milli-seconds) from the time of a successfully received activation/transition/switching command or the HARQ-ACK acknowledgement of the activation/transition/switching command. This time period can depend on a UE capability, or as soon as possible and not to exceed a time period (in slots or subframe or frames or milli-seconds) from the time of a successfully received activation/transition/switching command or the HARQ-ACK acknowledgement of the activation/transition/switching command.

In one example 1.13.1, a first UE group can be a group with one UE, and a second UE group can be a group with more than one UE, i.e., a user is switching from being an individual user for beam indication and beam updates, to being part of a group of users.

In another example 1.13.2, a first UE group can be a group with more than one UE, and a second UE group can be a group with one UE, i.e., a user is switching from being part of a group of users for beam indication and beam updates, to being an individual user.

In another example 1.13.3, a first UE group can be a group with more than one UE, and a second UE group can be a group with one than one UE, i.e., a user is switching from being part of a first group of users for beam indication and beam updates to being part of a second group of users.

In another example 1.14, the TCI state ID in the above examples can be replaced by another physical characteristic for example QCL related parameters (e.g., Doppler shift, Doppler spread), timing advance, a UE panel ID, a power control command, etc., wherein the association or mapping is between a UE group TCI index and a physical characteristic ID. For example, when there are U UEs in a UE group, a UE group TCI index (m) corresponds to physical characteristic (m, 0) for UE 0, physical characteristic (m, 1) for UE 1, . . . , physical characteristic(m, U−1) for UE U−1. Where each UE u, where $u \in \{0, 1, \ldots, U-1\}$ is configured a mapping between $\{0, 1, \ldots, M-1\}$ and the set {physical characteristic (0, u), physical characteristic (1, u), . . . , physical characteristic (M−1, u)}.

Figure 20:
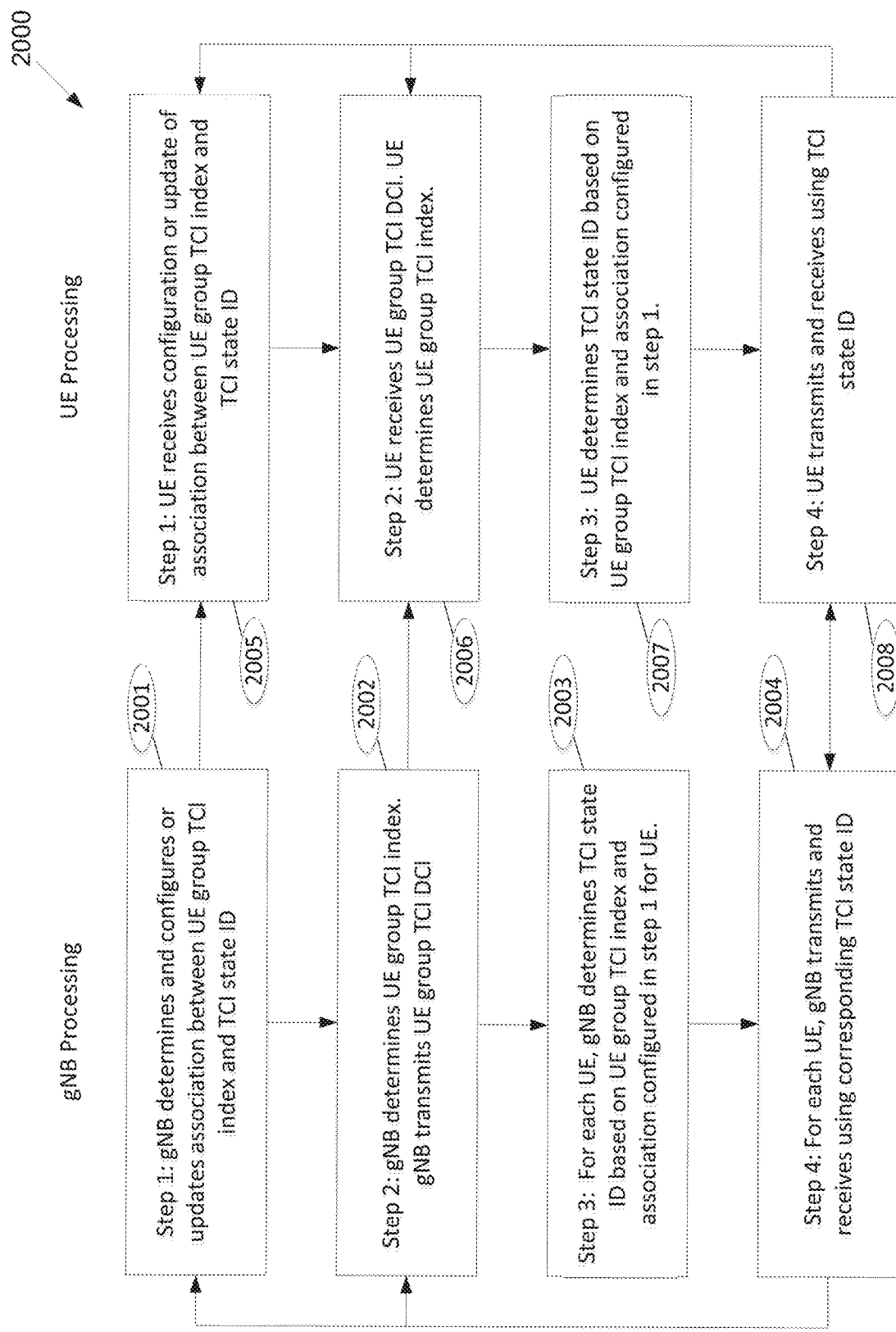
FIG. 20 illustrates a flowchart of method for gNB and UE processing according to embodiments of the present disclosure.

FIG. 20 illustrates a flowchart of method 2000 for gNB and UE processing according to embodiments of the present disclosure. An embodiment of the method 2000 shown in FIG. 20 is for illustration only. One or more of the components illustrated in FIG. 20 can be implemented in specialized circuitry configured to perform the noted functions or one or more of the components can be implemented by one or more processors executing instructions to perform the noted functions.

As illustrated in FIG. 20, in step 1 at the gNB (2001), the gNB determines the association between the UE group TCI index and the TCI state ID for each UE. This association for example can be determined (e.g., based on Example 1.7), knowing the UE location within a group of UEs or relative to a lead UE of a UE group and prior collected information when a UE is passing through a same location with similar positioning within the UE group. This information is configured or updated to the UE.

In step 1 at the UE (2005), the UE receives configuration information or update about the association between the UE group TCI index and the TCI state ID.

In step 2 at the gNB (2002), the gNB determines the UE group TCI index, this for example can be based on beam reporting information from a lead UE or from all UEs or some UEs within a UE group. The gNB transmits the UE group TCI index in the UE group TCI DCI to all UEs within the UE group.

In step 2 at the UE (2006), the UE receives and decodes the UE group TCI DCI and determines the UE group TCI index.

In step 3 at the gNB (2003), for each UE, the gNB determines the TCI state ID based on the UE group TCI index determined in step 2 and the association between the UE group TCI index and TCI state ID determined in step 1.

In step 3 at the UE (2007), the UE determines the TCI state ID based on the UE group TCI index received in step 2 and the association between the UE group TCI index and TCI state ID received in step 1.

In step 4 at the gNB (2004) and at the UE (2008), the gNB and UE communicate with each other using the TCI state ID determined in step 3.

Go back to step 2, if a new UE group TCI index is determined by the gNB or received by the UE.

Go back to step 1, if a new association between a UE group TCI index and a TCI state ID is determined at the gNB, e.g., a UE has moved to a new RRH (or TRP or gNB or base station) with a new association or based on updated calculation at the gNB. Go back to step 1 if a UE receives a new association between UE group TCI index and TCI state ID (e.g., by RRC signaling and/or MAC CE signaling and/or L1 signaling).

In one embodiment (component 2), a UE specific mapping of a UE group TCI index to one or more TCI states with a UE specific beam indicator i provided.

A UE can be configured through RRC signaling with a set of N TCI states according to FIG. 15.

Figure 21:
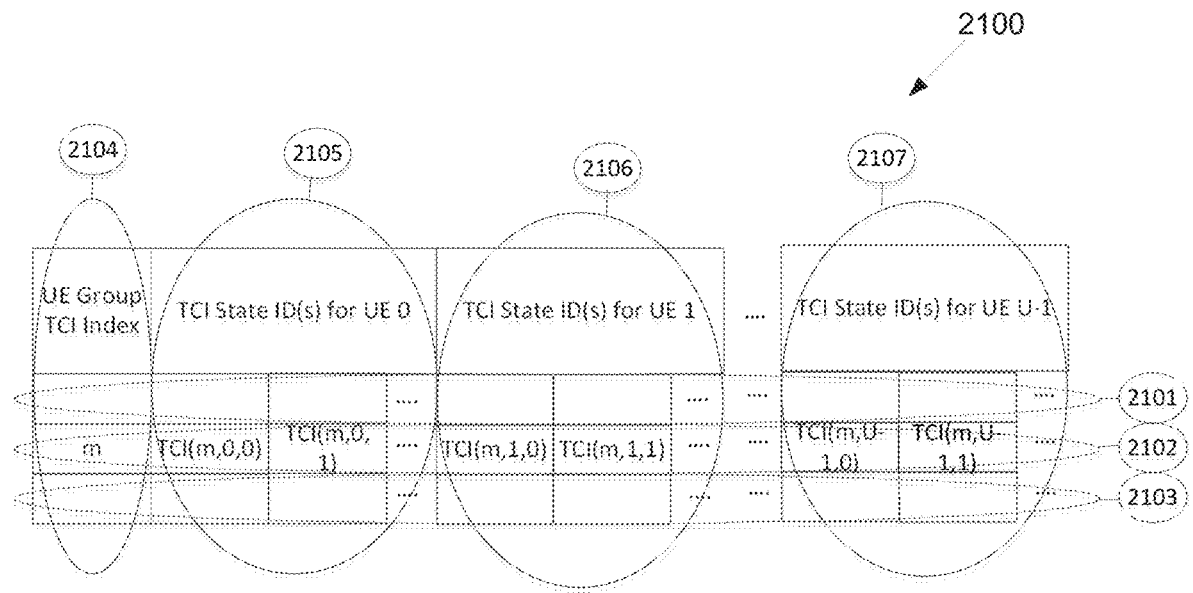
FIG. 21 illustrates yet another example TCI-state configuration according to embodiments of the present disclosure.

FIG. 21 illustrates yet another example TCI-state configuration 2100 according to embodiments of the present disclosure. An embodiment of the TCI-state configuration 2100 shown in FIG. 21 is for illustration only.

Figure 22:
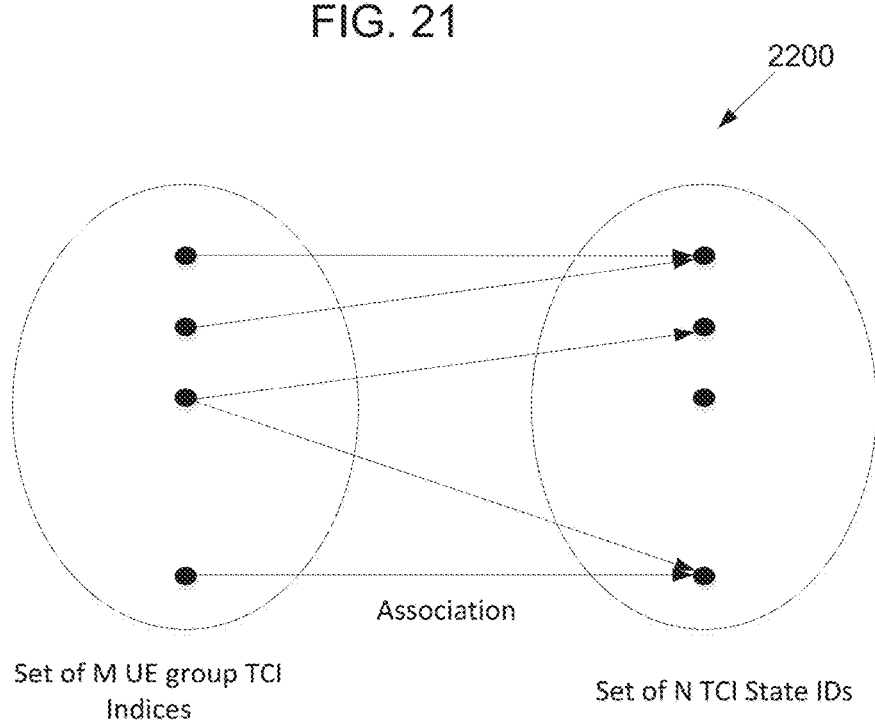
FIG. 22 illustrates another example UE group TCI indices and TCI state IDs according to embodiments of the present disclosure.

A UE can be further configured with a mapping between a UE group TCI index and one or more TCI-state ID(s) as illustrated in FIG. 21 and FIG. 22. In FIG. 21, a UE group TCI index configuration table contains a row for each UE group TCI index (2101, 2102, 2103).

Each row contains: (i) a UE group TCI index (2104), this is the index that is indicated in a UE group TCI DCI; (ii) TCI state ID(s) for UE 0 (2105), this is the TCI state ID(s) of UE 0, when receiving a corresponding UE group TCI index; and (iii) TCI state ID for UE 1 (2106), this is the TCI state ID(s) of UE 1, when receiving a corresponding UE group TCI index . . . (iv) TCI state ID for UE U−1 (2107), this is the TCI state ID(s) of UE U−1, when receiving a corresponding UE group TCI index.

When there are U UEs in a UE group, a UE group TCI index(m) corresponds to {TCI state ID(m, 0,0), TCI state ID(m, 0,1), . . . } for UE 0, {TCI state ID (m, 1,0), TCI state ID (m, 1,1), . . . } for UE 1, . . . , {TCI state ID(m, U−1,0), TCI state ID(m, U−1,1), . . . } for UE U−1. For a UE, a UE group TCI index corresponds to one or more TCI state IDs, hence a UE specific indicator (e.g., UE specific beam indicator) in a UE group TCI DCI can indicate one of the TCI state IDs for a UE associated with a UE group TCI index.

The number of UEs in a group U, can change and be updated dynamically as users enter and leave a group, for example users embarking or disembarking from a train, or users becoming active (e.g., in RRC CONNECTED state) or inactive (e.g., in RRC IDLE state or RRC INACTIVE state). Hence, the number of columns in the Table of FIG. 19 can change dynamically as U changes.

In one example, a UE is allocated, for example by higher layer configuration, more than one of the U TCI state ID sets associated with a UE group TCI index, for example the more than one TCI state ID sets can correspond to DL/UL channels of different entities of the UE. Wherein, an entity of the UE can be a TRP; a panel of a TRP; a panel of a UE; an antenna port; a CC; a bandwidth part; a set of PRBs; a slot or a set of slots; a symbol or a set of symbols; and/or any combination of the previous mentioned examples of entities, as described in component 4.

In a special example, the signaling framework and examples of this component can be used for individual UEs, i.e., a UE group can be considered to have single UE, i.e., U=1. The mapping of UE group TCI index to TCI state ID(s) or the association between UE group TCI index and TCI state ID(s) can be done according to the following examples.

In one example 1, the mapping can be a set of M elements, where each element includes an UE group TCI index(m), number of TCI state IDs $L_m$ associated with UE group TCI index(m) and a list of $L_m$ TCI state IDs: {(UE group TCI index(0), $L_0$, TCI state ID($\alpha$), TCI state ID($\beta$) . . . ), (UE group TCI index(1), $L_1$, TCI state ID($\gamma$), TCI state ID($\delta$) . . . ), . . . , (UE group TCI index(M−1), $L_{M-1}$, TCI state ID($\psi$), TCI state ID($\omega$) . . . ).

This set establishes an association between: (i) a UE group TCI index(0) and $L_0$ TCI state IDs: TCI state ID($\alpha$), TCI state ID($\beta$), . . . (ii) a UE group TCI index(1) and $L_1$ TCI state IDs: TCI state ID($\gamma$), TCI state ID($\delta$), . . . and (iii) a UE group TCI index(M−1) and $L_{M-1}$ TCI state IDs: TCI state ID($\psi$), TCI state ID($\omega$), wherein, each of $L_0$, $L_1$, . . . , $L_{M-1} \geq 1$.

In example 2.1.2, this mapping is determined (fixed) based on the TCI state IDs. For example, UE group TCI index (m) is mapped to $L_m$ consecutive TCI state IDs {$n_m$, $n_m+1$, . . . , $n_m+L_m-1$}. Where, $L_m \geq 1$ is fixed for each m. One special case is $n_m=m$.

In another example 2.2, the mapping can be a set of P order pairs: {(UE group TCI index(0), TCI state ID($\alpha$)), (UE group TCI index(0), TCI state ID($\beta$), . . . , (UE group TCI index(1), TCI state ID($\gamma$)), . . . , (UE group TCI index(M−1), TCI state ID($\omega$)). This set establishes an association between: (i) a UE group TCI index(0) and TCI state ID($\alpha$) and TCI state ID($\beta$), . . . (ii) a UE group TCI index(1) and TCI state ID($\gamma$), . . . (iii) a UE group TCI index(M−1), TCI state ID($\omega$), where $P=\Sigma_{m=0}^{M-1} L_m$ and $L_m$ is the number of TCI state IDs associated with UE group TCI index (m).

In another example 2.3, a UE is a configured a set of P TCI-state IDs: {TCI state ID($\alpha$), TCI state ID($\beta$), . . . , TCI state ID($\omega$)}, and a set of M elements {$L_0$, $L_1$, . . . , $L_{M-1}$} wherein, the order of the TCI state ID within the set and the number of TCI state IDs associated with a UE group TCI index determines the association between UE group TCI indices and TCI state IDs. For example: (i) the first $L_0$ TCI state IDs are/is associated with UE group TCI index (0); (ii) the next $L_1$ TCI state IDs are/is associated with UE group TCI index(1). The last $L_{M-1}$ TCI state IDs are/is associated with UE group TCI index(M−1). Where, $P=\Sigma_{m=0}^{M-1} L_m$ and $L_m$ are the number of TCI state IDs associated with UE group TCI index(m).

In examples, 2.1, 2.2 and 2.3, the number of TCI state IDs associated with each UE group TCI index can be different or can be the same. When the same, a single value L is configured, with $L_0=L_1=\ldots=L_{M-1}=L$.

FIG. 22 illustrates another example UE group TCI indices and TCI state IDs 2200 according to embodiments of the present disclosure. An embodiment of the UE group TCI indices and TCI state IDs 2200 shown in FIG. 22 is for illustration only.

FIG. 22 shows an example of association of UE group TCI indices and TCI state IDs. In examples 2.1, 2.2 and 2.3 the TCI state IDs can be unique (i.e., a TCI state ID is associated to only one UE group TCI index), or can be repeated (i.e., a TCI state ID is associate to more than one UE group TCI index). M is the number of UE group TCI indices. N is the number of TCI state IDs. M and N can have the same value, i.e., M=N, alternatively the M and N can have different values, i.e., M>N or M<N. In general, the mapping between the N TCI state IDs and M UE group TCI indices can be a many-to-many mapping, with one-to-many, many-to-one and one-to-one mappings being special cases. In some cases, some TCI state IDs might not be mapped to UE group TCI indices.

In one example, M is fixed, e.g., to 1 or 2. In another example, M depends on N. For example, if N<=t, M is fixed to a value m1, and if N>t, M is fixed to another value m2, where t is a fixed threshold, and m1=1 and m2=2 as an example. In another example, M is configured via higher layer (RRC) signaling.

In one example 2.4, the mapping of UE group TCI indices to TCI state IDs or the association between UE group TCI indices and TCI state IDs, as well as the number of TCI state IDs associated with a UE group TCI index ($L_0$, $L_1$, . . . $L_{M-1}$ or L) is UE specific, i.e., each UE has its own mapping rule, and is configured and/or updated through UE specific signaling.

In another example 2.5, the mapping of UE group TCI indices to TCI state IDs or the association between UE group TCI indices and TCI state IDs, as well as the number of TCI state IDs associated with a UE group TCI index ($L_0$, $L_1, \ldots L_{M-1}$ or L) is common (the same) for UEs of a group, and is configured and/or updated through UE group specific signaling or through common signaling (i.e., signaling common to a group of UEs in a cell or common to all UEs in a cell). In this example, there is a single column for all UEs of FIG. 21 as shown in FIG. 23.

Figure 23:
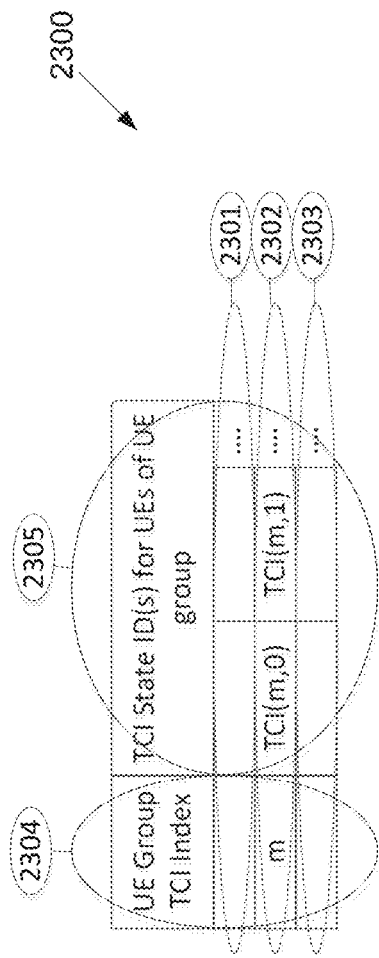
FIG. 23 illustrates yet another example TCI-state configuration according to embodiments of the present disclosure.

FIG. 23 illustrates yet another example TCI-state configuration 2300 according to embodiments of the present disclosure. An embodiment of the TCI-state configuration 2300 shown in FIG. 23 is for illustration only.

In another example 2.5.1, the mapping of UE group TCI indices to TCI state IDs or the association between UE group TCI indices and TCI state IDs, as well as the number of TCI state IDs associated with a UE group TCI index ($L_0$, $L_1, \ldots L_{M-1}$ or L) is: (i) for some UEs, UE specific, i.e., each UE has its own mapping rule, and is configured and/or updated through UE specific signaling; and (ii) for the remaining UEs, common (the same) for the remaining UEs of a UE group, and is configured and/or updated through UE group specific signaling or through common signaling (i.e., signaling common to a group of UEs in a cell or common to all UEs in a cell).

Figure 24:
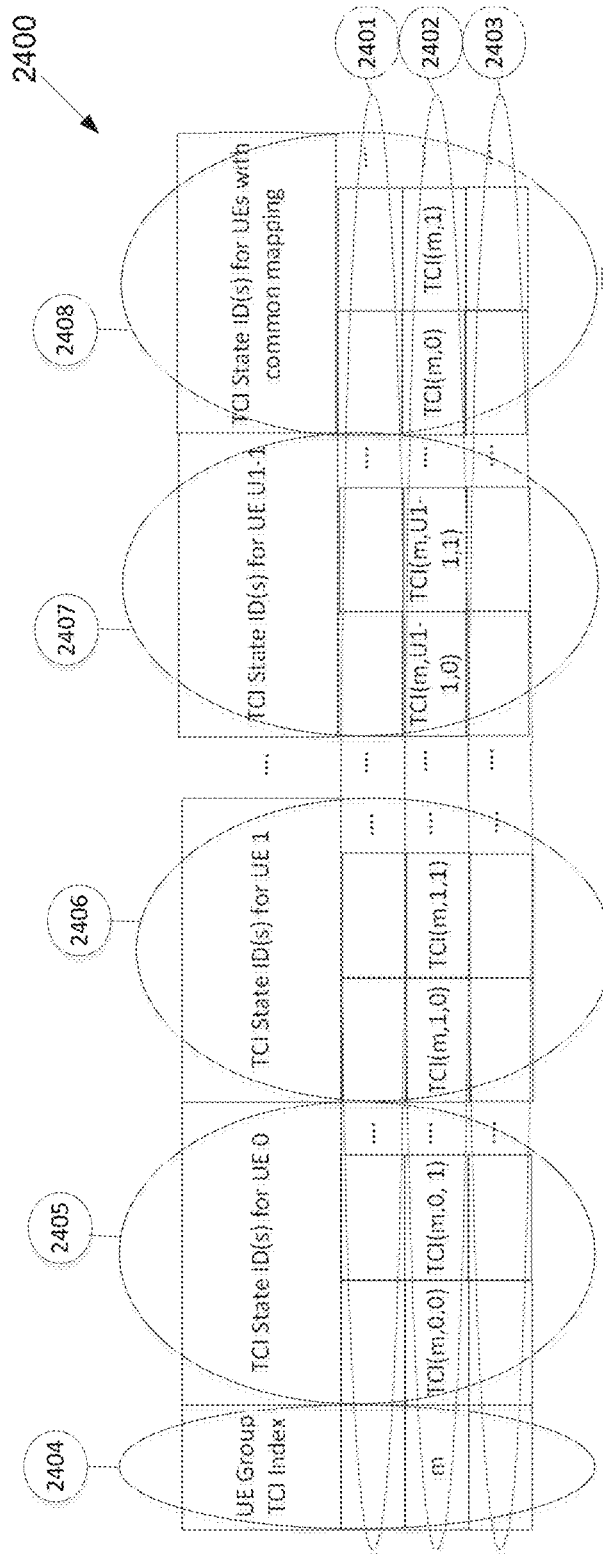
FIG. 24 illustrates yet another example TCI-state configuration according to embodiments of the present disclosure.

In this example, referring to FIG. 21, there is a column for each UE with its own mapping and one column for all UEs with UE group common mapping as shown in FIG. 24. Where, U1 is the number UEs with UE specific mapping.

FIG. 24 illustrates yet another example TCI-state configuration 2400 according to embodiments of the present disclosure. An embodiment of the TCI-state configuration 2400 shown in FIG. 24 is for illustration only.

The mapping of UE group TCI indices to TCI state IDs or the association between UE group TCI indices and TCI state IDs, as well as the number of TCI state IDs associated with a UE group TCI index ($L_0, L_1, \ldots L_{M-1}$ or L), described in examples 2.4 and 2.5 and 2.5.1, can be configured and/or updated through at least one of: (i) RRC signaling; (ii) MAC CE signaling; or (iii) L1 control signaling.

In one embodiment, a UE is configured or updated a mapping of UE group TCI indices to TCI state IDs or an association between UE group TCI indices and TCI state IDs, as well as the number of TCI state IDs associated with a UE group TCI index ($L_0, L_1, \ldots L_{M-1}$ or L). This association, for example, is according to the corresponding UE column of FIG. 21.

In one embodiment, a gNodeB transmits and a UE receives a UE group TCI DCI, which includes a UE group TCI index(m). Where, UE group TCI index(m) is the UE group TCI index determined by the gNB for beam indication to a group of UEs.

In one embodiment, included in a group TCI DCI is a UE specific beam indication index $k_u$ that determines one of the $L_{m,u}$, where $L_{m,u}$ is the number of TCI state IDs associated with UE group TCI index(m) for UE u. $L_{m,u}$ can be UE specific (e.g., example 2.4), or common (the same) to all UEs (e.g., example 2.5).

FIG. 25 illustrates an example structure of the UE group TCI 2500 according to embodiments of the present disclosure. An embodiment of the structure of the UE group TCI 2500 shown in FIG. 25 is for illustration only. FIG. 25, is an example of the structure of the UE group TCI, which includes: (i) a UE Group TCI index (m) this is common to all UEs; (ii) a UE specific index $k_u$, with one index from each UE. Wherein: (1) each UE is configured/updated (e.g., by RRC signaling and/or MAC CE signaling and/or L1 signaling) at least one unique index from 0 to U−1; and (2) U is the number of UEs in a group, or the sum of number of indices allocated to the UEs, when UEs are allocated more than one index. U can be configured/updated by RRC signaling and/or MAC CE signaling and/or L1 signaling or implicitly determined as UEs are added or removed from a UE group; (iii) the size of the bit field for UE group TCI index can be determined based on M, the number of UE group TCI indices. For example the bit field size can be $\lceil \log_2 M \rceil$ and (iv) the size of each bit field of the UE specific index or indices $k_u$ can be determined based on: (i) the maximum value of $L_m$, i.e., each bit field size can be $$\left\lceil \log_2\left(\max_m (L_m)\right) \right\rceil;$$

(ii) alternatively, if there is a single value L across all UE group TCI indices, the size of each bit field can be $\lceil \log_2 L \rceil$; (iii) alternatively, the size of each bit field can be signaled by RRC signaling and/or MAC CE signaling and/or L1 signaling; or (iv) alternatively, the size of each bit can be signaled in the UE group TCI as shown in FIG. 26. Where, the value of field K determines the bit field size based on codepoint values configured/updated by RRC signaling and/or MAC CE signaling.

FIG. 26 illustrates another example structure of the UE group TCI 2600 according to embodiments of the present disclosure. An embodiment of the structure of the UE group TCI 2600 shown in FIG. 26 is for illustration only.

A UE determines a TCI state ID based on the configured association between the UE group TCI indices and TCI state IDs, a UE group TCI index(m) received in a UE group TCI DCI, and the UE specific beam indicator $k_u$ or beam indicators if UE is allocated more than one index between 0 and U−1.

In one example 2.6, the UE group TCI index(m) is the TCI state ID of the lead UE of a group of UEs. Where, a lead UE (for example, as described in U.S. patent application Ser. No. 17/151,051, which is incorporated by reference herein) can be a UE configured by the network, a special UE (e.g., customer premise equipment (CPE)). In another example 2.7, there is no lead UE for a UE group, or the UE group TCI index is not equal to the TCI state ID of the lead UE. In this example, the UE group TCI index(m) can be determined based on network implementation.

In another example 2.A, a UE is configured (e.g., through RRC signaling and/or MAC CE signaling and/or L1 signaling) a first association $A_1$ between UE group TCI indices and UE group TCI state IDs, or a mapping of UE group TCI indices to TCI state IDs, as well as the number of TCI state IDs associated with a UE group TCI index ($L_0, L_1, \ldots L_{M-1}$ or L). A UE is configured (e.g., through RRC signaling and/or MAC CE signaling and/or L1 signaling) a second association $A_2$ between UE group TCI indices and UE group TCI state IDs, or a mapping of UE group TCI indices to TCI state IDs, as well as the number of TCI state IDs associated with a UE group TCI index ($L_0, L_1, \ldots L_{M-1}$ or L). A UE uses a first association for determining a TCI state ID based on a received UE group TCI index, and UE specific beam indicator $k_u$. A user can be configured through RRC signaling and/or through MAC CE and/or through L1 signaling to transition or switch from a first association to a second association.

The time of the switching can be determined based on:
specific system frame number and/or subframe number and/or slot and/or symbol number, or after a time period (in slots or subframes or frames or milli-seconds) from the time of a successfully received activation/transition/switching command or the HARQ-ACK acknowledgement of the activation/transition/switching command. This time period can depend on a UE capability, or as soon as possible and not to exceed a time period (in slots or subframes or frames or milli-seconds) from the time of a successfully received activation/transition/switching command or the HARQ-ACK acknowledgement of the activation/transition/switching command.

The association to use (e.g., $A_1$ or $A_2$) can be indicated in the UE group TCI DCI, or the association to use depends on the RRH (or TRP or gNB or base station) transmitting the UE group TCI DCI, i.e., first RRH (or TRP or gNB or base station) for first association $A_1$, second RRH (or TRP or gNB or base station) for second association $A_2$. For example, during handover a UE switches from a first association $A_1$ to a second association $A_2$. After switching, a UE uses a second association for determining a TCI state ID based on a received UE group TCI index, and UE specific beam indicator $k_u$.

A first association $A_1$ can correspond to a first RRH (or TRP or gNB or base station) and a second association $A_2$ can correspond to a second RRH (or TRP or gNB or base station).

In one example 2.8, the mapping of UE group TCI indices to TCI state IDs or the association between UE group TCI indices and TCI state IDs, as well as the number of TCI state IDs associated with a UE group TCI index ($L_0, L_1, \ldots L_{M-1}$ or L) can be determined based on a UE location or position within a group of UEs or a UE location or position relative to a lead UE of a group of UEs. The association can be determined based on data (e.g., beam reports, RSRP/RSRQ, positioning information) collected from prior UEs passing through the same location and with a same or similar position within a group of UEs or relative to the lead UE. For example, the network uses artificial intelligence techniques on data collected from prior UEs passing through a location to determine a mapping of UE group TCI indices to TCI state IDs or association between UE group TCI indices and TCI state IDs, as well as the number of TCI state IDs associated with a UE group TCI index ($L_0, L_1, \ldots L_{M-1}$ or L).

This association can be RRH (or TRP or gNB or base station) dependent, as each RRH (or TRP or gNB or base station) has its own topology in terms of its position with respect to the track or road and any curves or bends on that track or road. Therefore, the association of TCI state IDs and UE group TCI indices can be updated as the train moves from one RRH (or TRP or gNB or base station) to the next one through MAC CE signaling and/or through L1 signaling.

In another example 2.9, the TCI state ID in the above examples can be replaced by source RS ID, wherein the association or mapping is between a UE group TCI index and source RS ID with QCL Type D. The rest of the description in the examples follows with just replacing TCI state ID by source RS ID.

In another example 2.10, the TCI state ID in the above examples for an uplink channel can be replaced by a spatial relation information (SpatialRelationInfo) or a reference signal with a spatial relation, wherein the association or mapping is between a UE group TCI index and a Spatial-RelationInfo or a reference signal with a spatial relation. The rest of the description in the examples follows with just replacing TCI state ID by SpatialRelationInfo or a reference signal with a spatial relation.

In one example 2.11, and following the previous examples (2.1 to 2.10), the UE group TCI conveys a UE group TCI index and a set of UE specific beam indications $k_u$ and possibly K (e.g., the size of each field of the UE specific beam indicator $k_u$, for example, as illustrated in FIG. 26) for: (i) one UE group TCI index, a set of UE specific beam indications $k_u$ and possibly K for DL channels; (ii) one UE group TCI index, a set of UE specific beam indications $k_u$ and possibly K for UL channels; (iii) one UE group TCI index, a set of UE specific beam indications $k_u$ and possibly K common (joint) for DL and UL channels; (iv) two UE group TCI indices, and two sets of UE specific beam indications $k_u$, one for DL channels and another for UL channels, respectively, and if K is present: (1) K can be separately indicated for UL and DL; and (2) alternatively, K can be common for UL and DL; (v) one UE group TCI index common for DL and UL channels, and two sets of UE specific beam indications $k_u$, one for DL channels and another for UL channels, and if K is present: (1) K can be separately indicated for UL and DL; and (2) alternatively, K can be common for UL and DL; or (vi) two UE group TCI indices, one for DL channels and another for UL channels, and a set of UE specific beam indications $k_u$ and possibly K common for DL and UL channels.

In one example 2.11.1, a first stage/part beam indication can indicate the number of UE group TCI indices and/or sets of UE specific beam indications $k_u$ (i.e., one or two based on the above examples).

In another example 2.11.2, the number of UE group TCI indices and/or sets of UE specific beam indications $k_u$ is configured and/or updated by RRC signaling and/or MAC CE signaling and/or L1 signaling.

In another example 2.11.3, the content of the UE group TCI (e.g., DL or UL or common for DL and UL) is determined by field in the UE group TCI.

In another example 2.11.4, the content of the UE group TCI (e.g., DL or UL or common for DL and UL) is determined by configuration, for example: (i) based on UE group RNTI value: i.e., different RNTI configured for DL only, UL only and common UL/DL; (ii) based on physical resources (time/frequency/code): i.e., different resources configured for DL only, UL only and common UL/DL; (iii) based on CORESET: i.e., different CORESETs configured for DL only, UL only and common UL/DL; (iv) based on Search Space: i.e., different search spaces configured for DL only, UL only and common UL/DL; and/or (v) based CCE index: i.e., different CCE indices configured for DL only, UL only and common UL/DL In one example 2.12, the encoding of a payload of a beam indication channel follows the polar encoding of NR control channels as described in 38.212 v16.5.0.

In one example 2.12.1, polar encoding is used when the payload is greater than 11 bits.

In another example 2.12.2, a CRC is appended or prepended to the payload.

In yet another example 2.12.3, a CRC or part of a CRC is scrambled with an RNTI. For UE group specific signaling, a UE group specific RNTI can be used.

In another example 2.13, the encoding of payload of beam indication follows the encoding of small block length as described in section 5.3.3.3 of TS 38.212 v16.5.0, using basis sequences as provided in Table 5.3.3.3-1 of TS 38.212 v16.5.0

In one example 2.13.1, small block length encoding is used when the payload is between 3 bits and 11 bits.

In another example 2.13.2, no CRC is added to the payload prior to encoding.

In one example 2.14, a user can be part of a first UE group $G_1$. The user is configured a UE group specific RNTI to receive and decode the UE group TCI DCI, the user is configured an association between UE group TCI index and TCI state ID, as well as the number of TCI state IDs associated with a UE group TCI index ($L_0, L_1, \ldots L_{M-1}$ or L). A user is configured a second UE group $G_2$. For a second UE group, a user is configured a UE group specific RNTI to receive and decode the UE group TCI DCI, the user is configured an association between UE group TCI index and TCI state ID, as well as the number of TCI state IDs associated with a UE group TCI index ($L_0, L_1, \ldots L_{M-1}$ or L). A user can be configured through RRC signaling and/or through MAC CE and/or through L1 signaling to transition or switch from a first UE group $G_1$ to a second UE group $G_2$. The time of the switching can be determined based on:

Specific system frame number and/or subframe number and/or slot and/or symbol number, or after a time period (in slots or subframes or frames or milli-seconds) from the time of a successfully received activation/transition/switching command or the HARQ-ACK acknowledgement of the activation/transition/switching command. This time period can depend on a UE capability, or as soon as possible and not to exceed a time period (in slots or subframes or frames or milli-seconds) from the time of a successfully received activation/transition/switching command or the HARQ-ACK acknowledgement of the activation/transition/switching command.

In one example 2.14.1, a first UE group can be a group with one UE, and a second UE group can be a group with more than one UE, i.e., a user is switching from being an individual user for beam indication and beam updates, to being part of a group of users.

In another example 2.14.2, a first UE group can be a group with more than one UE, and a second UE group can be a group with one UE, i.e., a user is switching from being part of a group of users for beam indication and beam updates, to being an individual user.

In another example 2.14.3, a first UE group can be a group with more than one UE, and a second UE group can be a group with more than one UE, i.e., a user is switching from being part of a group of users for beam indication and beam updates to being part of a second group of users.

In another example 2.15, the TCI state ID in the above examples can be replaced by another physical characteristic for example QCL related parameters (e.g., Doppler shift, Doppler spread), timing advance, a UE panel ID, a power control command, etc., wherein the association or mapping is between a UE group TCI index and a set of one or more physical characteristic IDs.

For example, when there are U UEs in a UE group, a UE group TCI index(m) corresponds to {physical characteristic (m, 0,0), physical characteristic(m, 0,1), . . . } for UE 0, {physical characteristic(m, 1,0), physical characteristic(m, 1,1), . . . } for UE 1, . . . , {physical characteristic(m, U−1, 0), physical Characteristic(m, U−1, 1), . . . } for UE U−1. Where each UE u, where $u \in \{0, 1, \ldots, U-1\}$ is configured a mapping between $\{0, 1, \ldots, M-1\}$ and the set {{physical characteristic(0, u, 0), physical characteristic(0, u, 1), . . . }, {physical characteristic(1, u, 0), physical characteristic(1, u, 1), . . . } . . . , {physical characteristic(M−1, u, 0), physical characteristic(M−1, u, 1), . . . }}. A UE specific indicator $k_u$ in a UE group TCI DCI (see FIG. 25 and FIG. 26) indicates a physical characteristic within a set of physical characteristics associated with an indicated UE group TCI index for a UE.

Figure 27:
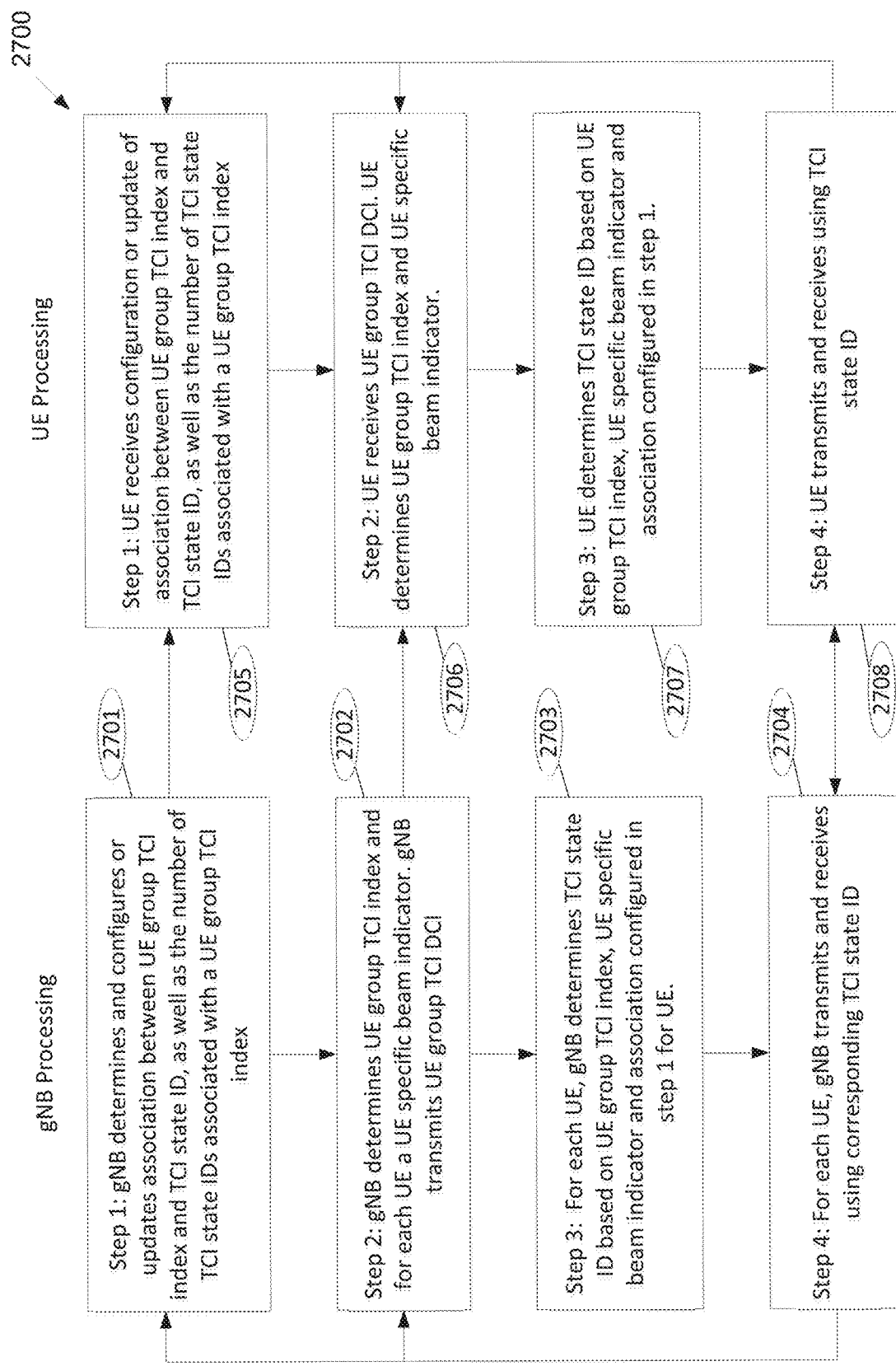
FIG. 27 illustrates a flowchart of method for gNB and UE processing according to embodiments of the present disclosure.

FIG. 27 illustrates a flowchart of method 2700 for gNB and UE processing according to embodiments of the present disclosure. An embodiment of the method 2700 shown in FIG. 27 is for illustration only. One or more of the components illustrated in FIG. 27 can be implemented in specialized circuitry configured to perform the noted functions or one or more of the components can be implemented by one or more processors executing instructions to perform the noted functions.

In step 1 at the gNB (2701), the gNB determines the association between the UE group TCI index and the TCI state ID for each UE, as well as the number of TCI state IDs associated with a UE group TCI index ($L_0, L_1, \ldots L_{M-1}$ or L). This association for example can be determined (e.g., based on example 2.8), knowing the UE location within a group of UEs or relative to a lead UE of a UE group and prior collected information when a UE is passing through a same location with similar positioning within the UE group. This information is configured or updated to the UE.

In step 1 at the UE (2705), the UE receives configuration information or update about the association between the UE group TCI index and the TCI state ID, as well as the number of TCI state IDs associated with a UE group TCI index ($L_0, L_1, \ldots L_{M-1}$ or L).

In step 2 at the gNB (2702), the gNB determines the UE group TCI index, this for example can be based on beam reporting information from a lead UE or from all UEs or some UEs within a UE group. In addition, for each UE, u, the gNB determines a UE specific beam indicator $k_u$. The gNB transmits the UE group TCI index, common to all UEs, and the UE specific beam indicator $k_u$, for each UE, in the UE group TCI DCI (see for example FIG. 25 and FIG. 26) to all UEs within the UE group.

In step 2 at the UE (2706), the UE receives and decodes the UE group TCI DCI and determines the UE group TCI index, and the UE specific beam indicator $k_u$.

In step 3 at the gNB (2703), for each UE, the gNB determines the TCI state ID based on the UE group TCI index, and the UE specific beam indicator $k_u$ determined in step 2 and the association between the UE group TCI index and TCI state ID determined in step 1.

In step 3 at the UE (2707), the UE determines the TCI state ID based on the UE group TCI index and the UE specific beam indicator $k_u$ received in step 2 and the association between the UE group TCI index and TCI state ID received in step 1.

In step 4 at the gNB (2704) and at the UE (2708), the gNB and UE communicate with each other using the TCI state ID determined in step 3.

Go back to step 2, if a new UE group TCI index or a new UE specific beam indicator $k_u$ is determined by the gNB or received by the UE.

Go back to step 1, if a new association between UE group TCI index and TCI state ID is determined at the gNB, e.g., a UE has moved to a new RRH (or TRP or gNB or base station) with a new association or based on updated calculation at the gNB. Go back to step 1 if a UE receives a new association between UE group TCI index and TCI state ID e.g., by RRC signaling and/or MAC CE signaling and/or L1 signaling).

In one embodiment (component 3), entity specific mapping of an entity group index to a physical characteristic ID is provided.

An entity can be a UE (as described in component 1); a TRP; a panel of a TRP; a panel of a UE; an antenna port; a component carrier (CC); A bandwidth part; a set of PRBs; a slot or a set of slots; a symbol or a set of symbols; and/or any combination of the previous mentioned examples of entities.

A physical characteristic can be a TCI state; an RS source ID with a QCL-Type (e.g., QCL Type D); SpatialRationInfo; a reference signal for spatial relation; a transmit spatial relation filter; a receive spatial relation filter; Doppler spread; Doppler shift; signal delay; signal multi-path spread; timing advance; pathloss; a power control command; a UE panel ID; and/or any combination of the previous mentioned examples of physical characteristics.

An entity group DCI is a DCI channel for a group of entities or a combination of multiple entities. For example, a DCI channel for a group of TRPs or for a group of CCs, or for a group of slots, or a group of slots and TRPs, etc. An entity group DCI includes an entity group index. Through configuration, an association or mapping is established between an entity group index and a physical characteristic ID for an entity or a combination of multiple entities, similar to the illustration of FIG. 16. An RRH (or TRP or gNB or base station) and a UE can determine the physical characteristic ID based on an entity group index signaled in an entity group DCI and an association between an entity group index and a physical characteristic ID.

The examples of this component follow the examples of component 1, with the following changes: (i) an entity group DCI replaces a UE group TCI DCI; (ii) an entity group index replaces a UE group TCI index; (iii) a physical characteristic ID replaces a TCI state ID; and/or (iv) An entity group specific RNTI replaces a UE group specific RNTI.

A UE group TCI index or entity group index can be referred to as a group TCI index.

In one embodiment (component 4), entity specific mapping of an entity group index to a one or more physical characteristic IDs with an entity specific physical characteristic indicator is provided.

An entity can be a UE (as described in component 2); a TRP; a panel of a TRP; a panel of a UE; an antenna port; a component carrier (CC); a bandwidth part; a set of PRBs; a slot or a set of slots; a symbol or a set of symbols; and/or any combination of the previous mentioned examples of entities.

A Physical Characteristic can be a TCI state; an RS source ID with a QCL-Type (e.g., QCL Type D); SpatialRationInfo; reference signal for spatial relation; a transmit spatial relation filter; a receive spatial relation filter; Doppler spread; Doppler shift; signal delay; signal multi-path spread; timing advance; pathloss; a power control command; a UE panel ID; and/or any combination of the previous mentioned examples of physical characteristics.

An entity group DCI is a DCI channel for a group of entities or a combination of multiple entities. For example, a DCI channel for a group of TRPs or for a group of CCs, or for a group of slots, or a group of slots and TRPs, etc. An entity group DCI includes a common entity group index, and an entity specific physical characteristic indicator for each entity or combination of entities (similar to FIG. 25 and FIG. 26). Through configuration, an association or mapping is established between an entity group index and one or multiple physical characteristic IDs for an entity or a combination of multiple entities, similar to the illustration of FIG. 21. An RRH (or TRP or gNB or base station) and a UE can determine the physical characteristic ID based on an entity group index, signaled in an entity group DCI, an entity specific physical characteristic indicator, also signaled in an entity group DCI, and an association between an entity group index and one or more physical characteristic IDs.

The examples of this component follow the examples of component 2, with the following changes: (i) an entity group DCI replaces a UE group TCI DCI; (ii) an entity group index replaces a UE group TCI index; (iii) an entity specific physical characteristic indicator replaces a UE specific beam indicator; (iv) a physical characteristic ID replaces a TCI state ID; and/or (v) an entity group specific RNTI replaces a UE group specific RNTI.

A UE group TCI index or entity group index can be referred to as a group TCI index.

A UE specific beam indicator or an entity specific physical characteristic indicator can be referred to as a TCI state indicator.

The present disclosure provides signaling aspects for a UE group TCI. Mapping between UE group TCI index and TCI state ID that is UE dependent allows the same UE group TCI index to map to a different TCI state ID for each UE, this depends on the location of the UE within a group and is configured to the UE. A UE specific beam indicator in UE group TCI DCI to determine the UE beam incase multiple TCI state IDs map to the same UE group TCI index.

These signaling aspects can potentially be used for AI based beam management, wherein a network learns the best mapping between UE group TCI indices and TCI state IDs for a UE and signals this mapping/association to the UE.

The present disclosure further provides signaling aspects for entity group TCI. Mapping between entity group TCI index and TCI state ID that is entity dependent allows the same entity group TCI index to map to a different TCI state ID for each entity. An entity specific beam indicator in entity group TCI DCI to determine the UE beam incase multiple TCI state IDs map to the same entity group TCI index. An entity can be a UE; a TRP; a panel of a TRP; a panel of a UE; an antenna port; a component carrier (CC); A bandwidth part; a set of PRBs; a slot or a set of slots; a symbol or a set of symbols; and/or any combination of the previous mentioned examples of entities.

Figure 28:
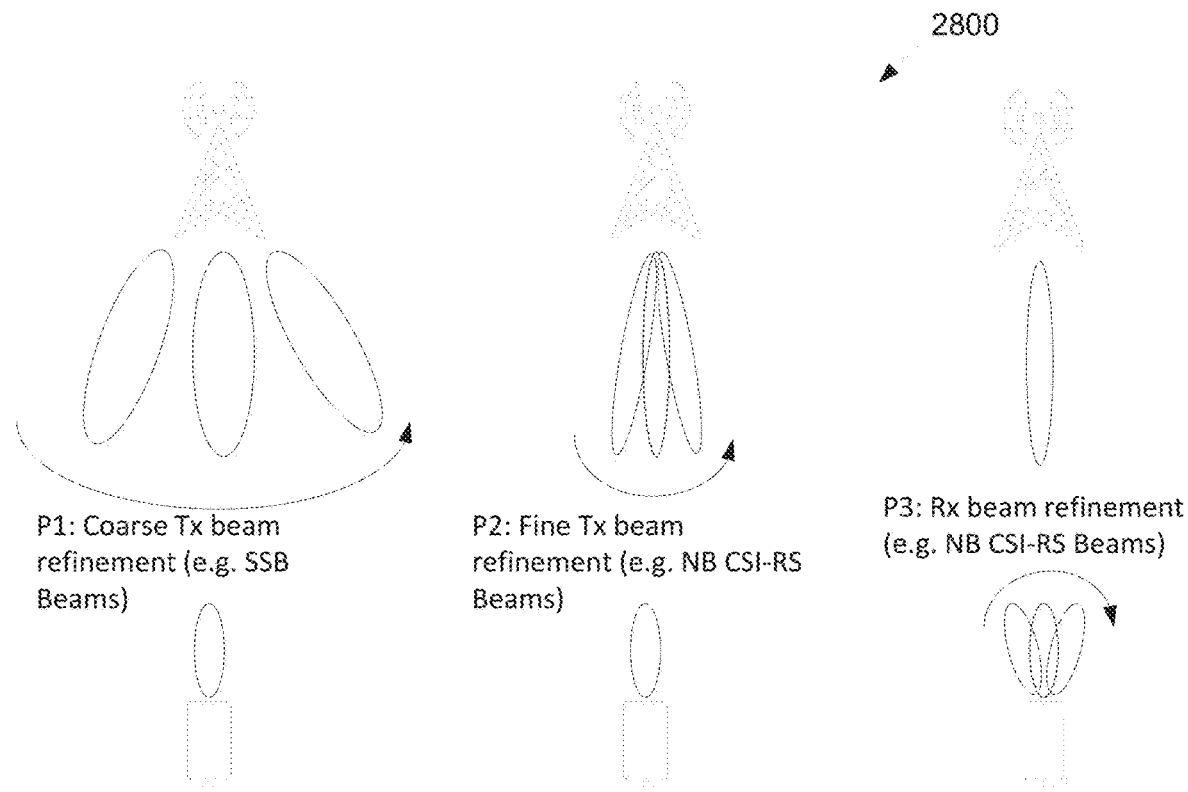
FIG. 28 illustrates an example beam management according to embodiments of the present disclosure.

FIG. 28 illustrates an example beam management 2800 according to embodiments of the present disclosure. An embodiment of the beam management 2800 shown in FIG. 28 is for illustration only. For example, the antenna beam management 2800 may be present in a wireless communication device, such as, for example, the UE 116 or the gNB 102 in FIG. 1.

Beam sweeping and training is part of beam management, during which the gNB and the UE identify a transmit/receive beam pair for subsequent communication. Beam sweeping and training can be applicable to downlink transmissions, as well as uplink transmissions. For downlink transmissions, as described in TR 38.802, beam management is a three step procedure as depicted in FIG. 28.

Step P-1 is coarse DL TRP/gNB Tx beam refinement, wherein a UE measures different DL Tx beams to support selection of DL TRP/gNB Tx beams/DL UE Rx beams. The reference signal for DL beams can be synchronization signal/PBCH blocks (SSBs) or channel state information-reference signal (CSI-RS).

Step P-2 is fine DL TRP/gNB Tx beam refinement, wherein a UE measures different DL Tx beams to support refinement of the DL TRP/gNB Tx beams. The reference signal for DL beams can be CSI-RS possibly with a narrower spatial transmit filter than the spatial transmit filter of the reference signal of step P-1.

Step P-3 is fine DL UE Rx beam refinement, wherein, a UE measures a same DL Tx beam with different Rx beams. A UE identifies the optimum DL Rx beam, i.e., optimum DL Rx spatial domain filter.

In step P-2, as described in 3GPP 38.214, a UE can use a NZP CSI-RS resource set with "repetition" set to "off," wherein the UE may not assume that the CSI-RS resources of the CSI-RS resource set are transmitted with the same downlink spatial domain transmission filter.

In step P-3, as described in 38.214, a UE can use a NZP CSI-RS resource set with "repetition" set to "on", wherein the UE may assume that the CSI-RS resources of the CSI-RS resource sets are transmitted with the same downlink spatial domain transmission filter. By having the three steps of beam sweeping (i.e., P-1, P-2, and P-3) done sequentially as described previously can lead to: (i) longer latency, i.e., step P-3 does not start until step P-2 is complete; and (ii) possibly finding a less optimal transmit-receive beam pair. In step P-2, a UE uses an Rx beam that has been identified in step P-1 for fine tuning the DL TRP/gNB Tx beam. As the Rx beam has not been fine-tuned yet, there is no guarantee that this is the optimum Rx beam, and accordingly when the fine-tuned Tx beam is optimized for this Rx beam there is no guarantee that it is the most optimal DL TRP/gNB Tx beam across all DL UE Rx beams.

To address these issues, in this disclosure, combining steps P-2 and P-3 into in single step for beam sweeping and training is provided. In the present disclosure, reference signal design and configuration for beam measurement, beam reporting from the UE to the gNB, and UE capability aspects related to joint beam downlink transmit-receive sweeping and training are provided.

In release 15/16 a common framework is shared for CSI and beam management, while the complexity of such framework is justified for CSI in FR1, it makes beam management procedures rather cumbersome, and less efficient in FR2. Efficiency here refers to overhead associated with beam management operations and latency for reporting and indicating new beams.

Furthermore, in release 15 and release 16, the beam management framework is different for different channels. This increases the overhead of beam management and could lead to less robust beam-based operation. For example, for PDCCH the TCI state (used for beam indication), is updated through MAC CE signaling. While the TCI state of PDSCH can updated through a DL DCI carrying the DL assignment with codepoints configured by MAC CE, or the PDSCH TCI state can follow that of the corresponding PDCCH or use a default beam indication.

In the uplink direction, the spatialRelationInfo framework is used for a beam indication for PUCCH and SRS, which is updated through RRC and MAC CE signaling. For PUSCH the SRI, in an UL DCI with UL grants, can be used for beam indication. Having different beam indications and beam indication update mechanisms increases the complexity, overhead and latency of beam management, and could lead to less robust beam-based operation.

In release 15/16 beam sweeping is a 3 step procedure. In step P-1, a UE measures different DL Tx beams to support selection of DL TRP/gNB Tx beams/DL UE Rx beams. In step P-2, a UE measures different DL Tx beams to support refinement of the DL TRP/gNB Tx beams. In step P-3, a UE measures a same DL Tx beam with different Rx beams. By having the three steps of beam sweeping (i.e., P-1, P-2, and P-3) done sequentially leads to longer latency and finding a less optimal Transmit-Receive beam pair. To address these issues, in this disclosure, combining steps P-2 and P-3 into in single step for beam sweeping and training is provided. Various embodiments of the present disclosure provide solutions for aspects related to; reference signal design and configuration for beam measurement, beam reporting from the UE to the gNB and UE capability aspects related to joint beam sweeping and training.

In one embodiment (component 5), CSI-RS resources for joint DL transmit-receive beam sweeping and training is provided.

In one example 5.1, a UE is configured with a non-zero power CSI-RS resource set with repetition "partially on," such that the NZP CSI-RS resource set includes N*M NZP CSI-RS resources, wherein, within the NZP CSI-RS resource set, there are N groups (or subsets) of mutually exclusive NZP CSI-RS resources, where each group (subset) contains M NZP CSI-RS resources.

A UE may assume that a group of M CSI-RS resources within the NZP CSI-RS resource set are transmitted with a same downlink (or transmit) spatial domain transmission filter.

A UE may not assume that CSI-RS resources in different groups (or subsets) of M NZP CSI-RS resources have a same downlink spatial domain transmission filter (i.e., spatial domain transmission filters can change across two groups (or subsets)).

A UE may perform DL receive beam sweeping (by using potentially different Rx spatial domain filter) across NZP CSI-RS resources within a group of NZP CSI-RS resources that include M NZP CSI-RS resources and have a same Tx spatial domain transmission filter.

A gNB/TRP may perform DL transmit beam sweeping across groups of NZP CSI-RS resources within a NZP CSI-RS resource set that includes N*M NZP CSI-RS resources, wherein a UE may assume that the NZP CSI-RS resources of each group of M NZP CSI-RS resources have a same downlink spatial domain transmission filter. A UE may not assume CSI-RS resources in different groups of M NZP CSI-RS resources have a same downlink spatial domain transmission filter.

The NZP CSI-RS resources are multiplexed in a time domain and in a frequency domain and possibly in a code domain.

As an example, NZP CSI-RS resources within a group of M NZP CSI-RS resources that a UE assumes to have a same downlink spatial domain transmission filter, are transmitted in non-overlapping time intervals. A time interval, for example, can be a symbol or a group of symbols used by a NZP CSI-RS resource, i.e., these resources are time division multiplexed.

As a further example, NZP CSI-RS resources NOT within the group of M NZP CSI-RS resources that a UE assumes to have a same downlink spatial domain transmission filter, can be transmitted in overlapping or non-overlapping time intervals. A time interval, for example, can be a symbol or a group of symbols used by a NZP CSI-RS resource. i.e., these resources can be time division multiplexed and/or frequency division multiplexed and/or code (or sequence) division multiplexed. In one example, the NZP CSI-RS resources of the respective different groups may be transmitted in interleaved, non-overlapping time periods such that transmission of NZP CSI-RS resources of the respective different groups alternate between or among the different groups, where each of these transmissions do not overlap in time, e.g., transmission of a first resource of a first group, then transmission of a first resource of a second group, then transmission of a second resource of the first group, then transmission of a second resource of the second group, etc. In another example, the NZP CSI-RS resources of the respective different groups may be transmitted in overlapping time periods such that sequential transmission of the NZP CSI-RS resources of each of the respective different groups overlap in time, respectively, e.g., transmission of a first resource of a first group overlaps with transmission of a first resource of a second group, then transmission of second resource of the first group overlaps with transmission of a second resource of the second group, etc.

Figure 29:
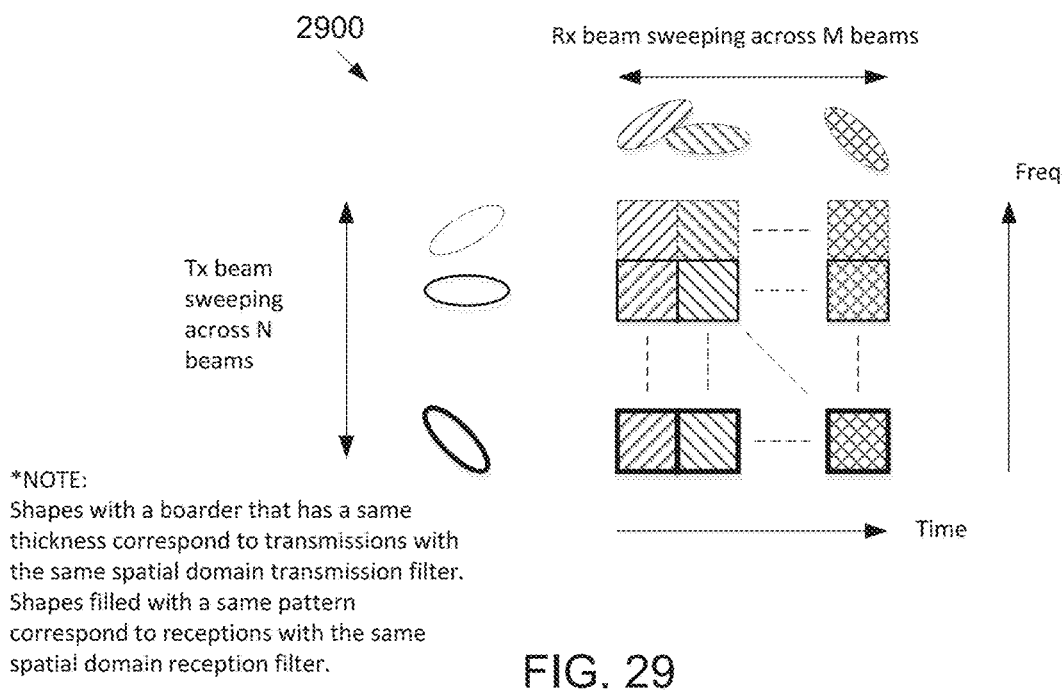
FIG. 29 illustrates an example CSI-RS resource for joint DL transmit-receive beam sweeping and training according to embodiments of the present disclosure.

FIG. 29 illustrates an example CSI-RS resource for joint DL transmit-receive beam sweeping and training 2900 according to embodiments of the present disclosure. An embodiment of the CSI-RS resource for joint DL transmit-receive beam sweeping and training 2900 shown in FIG. 29 is for illustration only. In FIG. 29, shapes with a boarder that has a same thickness correspond to transmissions with the same spatial domain transmission filter. Shapes filled with a same pattern correspond to receptions with the same spatial domain reception filter.

In example 5.1.1, as shown in FIG. 29, NZP CSI-RS resources within a group of M NZP CSI-RS resources, that a UE may assume to have a same downlink spatial domain transmission filter, are time division multiplexed. A UE can perform DL receive beam sweeping across these resources having a same downlink spatial domain transmission filter.

NZP CSI-RS resources across N groups of M NZP CSI-RS are frequency division multiplexed, wherein a UE may assume that downlink spatial domain transmission filters for NZP CSI-RS resources in different groups are not the same. In this example, one NZP CSI-RS resource from each group is frequency (and/or code) division multiplexed with a NZP CSI-RS resource from each other group. A gNB/TRP can perform DL transmit beam sweeping across these resources.

Figure 30:
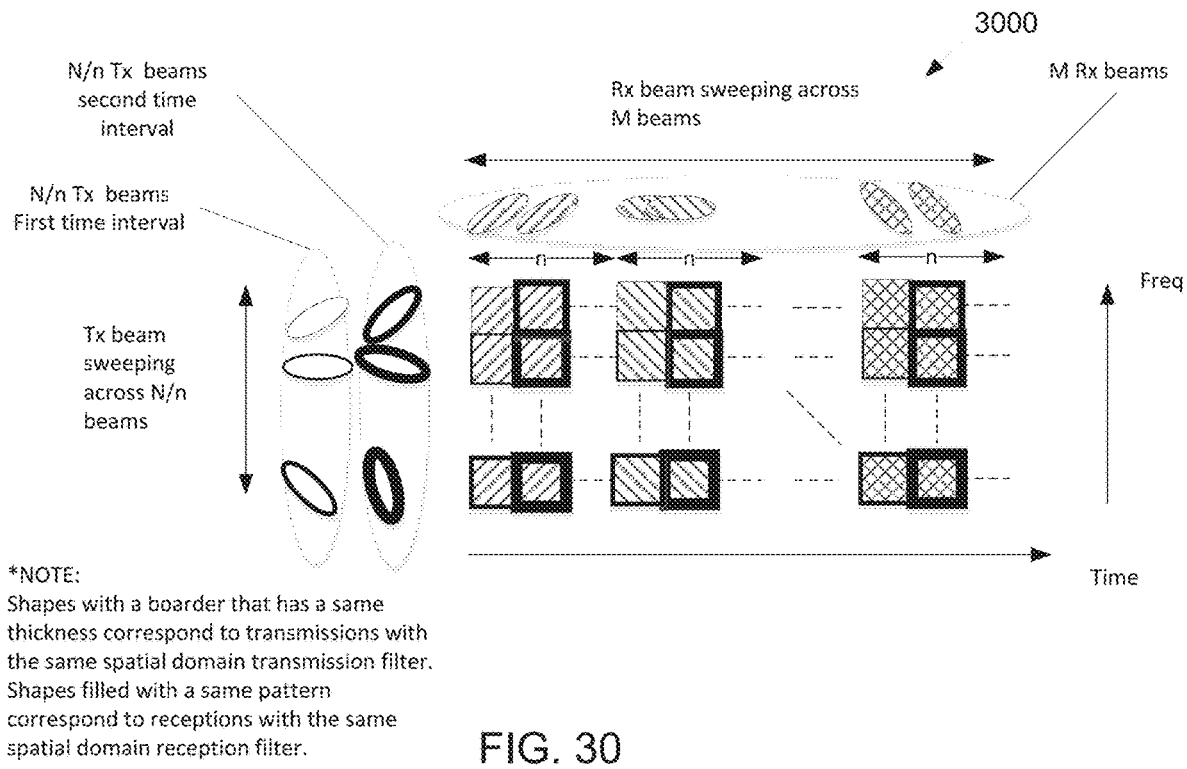
FIG. 30 illustrates another example CSI-RS resource for joint DL transmit-receive beam sweeping and training according to embodiments of the present disclosure.

FIG. 30 illustrates another example CSI-RS resource for joint DL transmit-receive beam sweeping and training 3000 according to embodiments of the present disclosure. An embodiment of the CSI-RS resource for joint DL transmit-receive beam sweeping and training 3000 shown in FIG. 30 is for illustration only. In FIG. 30, shapes with a boarder that has a same thickness correspond to transmissions with the same spatial domain transmission filter. Shapes filled with a same pattern correspond to receptions with the same spatial domain reception filter.

In another example 5.1.2, as shown in FIG. 30, NZP CSI-RS resources within a group of M NZP CSI-RS resources, that a UE may assume to have a same downlink spatial domain transmission filter, are time division multiplexed. A UE can perform DL receive beam sweeping across these resources having a same downlink spatial domain transmission filter.

NZP CSI-RS resources across N groups of M NZP CSI-RS resources are frequency division multiplexed and time division multiplexed, wherein a UE may assume that downlink spatial domain transmission filters for NZP CSI-RS resources in different groups are not the same.

In this example, one NZP CSI-RS resource from each group is frequency (and/or code) division multiplexed and time division multiplexed with a NZP CSI-RS resource from each other group. A gNB/TRP can perform DL transmit beam sweeping across these resources In one example of FIG. 30, a gNB/TRP can perform DL gNB/TRP Tx beam sweeping across N/n NZP CSI-RS resources in the frequency domain and across n NZP CSI-RS resources in the time domain. A UE can perform DL receive beam sweeping across M receive beams, wherein a UE dwells for an interval of n NZP CSI-RS resources for each receive beam during a sweep.

It should be noted that FIG. 30 is an example for demonstrating the concept. Variations of FIG. 30 are also included, for example, the time domain intervals for DL transmit beam sweeping can be non-consecutive in time rather than consecutive in time.

An example in FIG. 29 can be considered as a special case of the example of FIG. 30 with n=1.

Figure 31:
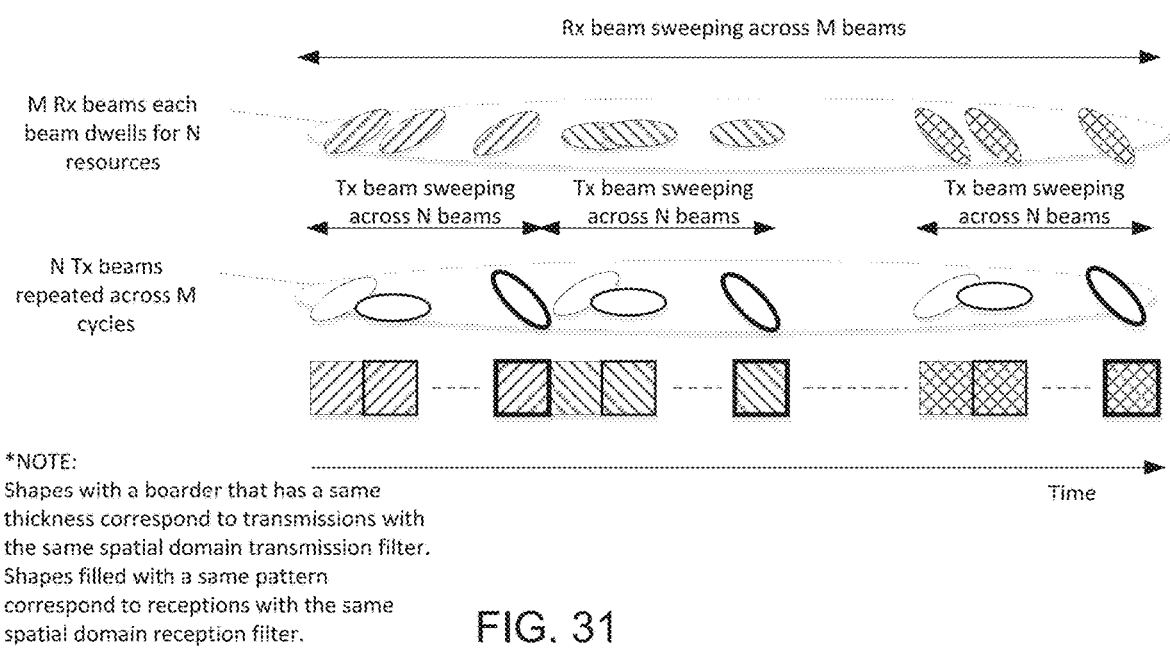
FIG. 31 illustrates yet another example CSI-RS resource for joint DL transmit-receive beam sweeping and training according to embodiments of the present disclosure.

FIG. 31 illustrates yet another example CSI-RS resource for joint DL transmit-receive beam sweeping and training 3100 according to embodiments of the present disclosure. An embodiment of the CSI-RS resource for joint DL transmit-receive beam sweeping and training 3100 shown in FIG. 31 is for illustration only. In FIG. 31, shapes with a boarder that has a same thickness correspond to transmissions with the same spatial domain transmission filter. Shapes filled with a same pattern correspond to receptions with the same spatial domain reception filter.

In another example 5.1.3, as shown in FIG. 31, NZP CSI-RS resources within a group of M NZP CSI-RS resources, that a UE may assume to have a same downlink spatial domain transmission filter, are time division multiplexed. A UE can perform DL receive beam sweeping across these resources having a same downlink spatial domain transmission filter.

NZP CSI-RS resources across N groups of M NZP CSI-RS are time division multiplexed, wherein a UE may assume that downlink spatial domain transmission filters for NZP CSI-RS resources in different groups are not the same. In this example, one NZP CSI-RS resource from each group is time division multiplexed with a NZP CSI-RS resource from each other group. A gNB can perform DL transmit beam sweeping across these resources.

In one example of FIG. 31, a gNB/TRP can perform DL gNB/TRP Tx beam sweeping across N NZP CSI-RS resources in the time domain. A UE can perform DL receive beam sweeping across M receive beams, wherein a UE dwells for an interval of N NZP CSI-RS resources for each receive beam during a sweep.

It should be noted that FIG. 31 is an example for demonstrating the concept. Variations of FIG. 31 are also included, for example, the time domain intervals for DL transmit beam sweeping can be non-consecutive in time rather than consecutive in time. To illustrate this point, and as another example, the time division multiplexing NZP CSI-RS resources within a group of M NZP CSI-RS resources that the UE assumes to have the same downlink spatial domain transmission filter is first performed, followed by a time division multiplexing of the NZP CSI-RS resources of the different groups. This is illustrated in FIG. 32.

Figure 32:
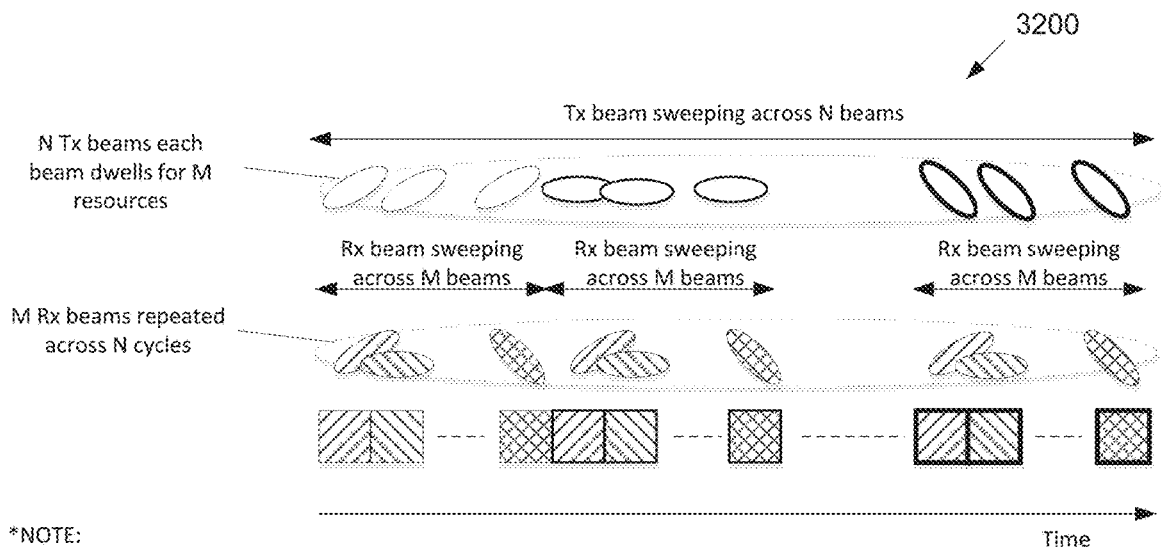
FIG. 32 illustrates yet another example CSI-RS resource for joint DL transmit-receive beam sweeping and training according to embodiments of the present disclosure.

FIG. 32 illustrates yet another example CSI-RS resource for joint DL transmit-receive beam sweeping and training 3200 according to embodiments of the present disclosure. An embodiment of the CSI-RS resource for joint DL transmit-receive beam sweeping and training 3200 shown in FIG. 32 is for illustration only. In FIG. 32, shapes with a boarder that has a same thickness correspond to transmissions with the same spatial domain transmission filter. Shapes filled with a same pattern correspond to receptions with the same spatial domain reception filter.

The example of FIG. 31 can be considered as a special case of the example of FIG. 30 with n=N.

In another example 5.1.4, NZP CSI-RS resources within a group of M NZP CSI-RS resources, that a UE may assume to have a same downlink spatial domain transmission filter, are frequency (and/or code) division multiplexed. A UE can perform DL receive beam sweeping across these resources having a same downlink spatial domain transmission filter.

NZP CSI-RS resources across N groups of M NZP CSI-RS are time division multiplexed, wherein a UE may assume that downlink spatial domain transmission filters for NZP CSI-RS resources in different groups are not the same. A gNB/TRP can perform DL transmit beam sweeping across these resources.

In another example 5.1.5, NZP CSI-RS resources within a group of M NZP CSI-RS resources, that a UE may assume to have a same downlink spatial domain transmission filter, are frequency (and/or code) division multiplexed and time division multiplexed. A UE can perform DL receive beam sweeping across these resources having a same downlink spatial domain transmission filter.

NZP CSI-RS resources across N groups of M NZP CSI-RS are time division multiplexed, wherein a UE may assume that downlink spatial domain transmission filters for NZP CSI-RS resources in different groups are not the same. A gNB/TRP can perform DL transmit beam sweeping across these resources.

In another example 5.1.6, NZP CSI-RS resources within a group of M NZP CSI-RS resources, that a UE may assume to have a same downlink spatial domain transmission filter, are frequency (and/or code) division multiplexed. A UE can perform DL receive beam sweeping across these resources having a same downlink spatial domain transmission filter.

NZP CSI-RS resources across N groups of M NZP CSI-RS are frequency (and/or code) division multiplexed, wherein a UE may assume that downlink spatial domain transmission filters for NZP CSI-RS resources in different groups are not the same. A gNB/TRP can perform DL transmit beam sweeping across these resources.

In another example 5.1.7, NZP CSI-RS resources within a group of M NZP CSI-RS resources, that a UE may assume to have a same downlink spatial domain transmission filter, are frequency (and/or code) division multiplexed and time division multiplexed. A UE can perform DL receive beam sweeping across these resources having a same downlink spatial domain transmission filter.

NZP CSI-RS resources across N groups of M NZP CSI-RS are frequency (and/or code) division multiplexed and time division multiplexed, wherein a UE may assume that downlink spatial domain transmission filters for NZP CSI-RS resources in different groups are not the same. A gNB/TRP can perform DL transmit beam sweeping across these resources.

In another example 5.1.8, a UE is configured with a non-zero power CSI-RS resource set with repetition "partially on," such that the NZP CSI-RS resource set includes $X=\sum_{i=0}^{N-1} M_i$ NZP CSI-RS resources, wherein, within the NZP CSI-RS resource set, there are N groups (or subsets) of mutually exclusive NZP CSI-RS resources, where, an i-th group (subset) contains $M_i$ NZP CSI-RS resources i∈{0, 1, . . . , N−1} and any ($M_{i_1}$, $M_{i_2}$) for $i_1 \neq i_2$ can be the same or different.

A UE may assume that a group of $M_i$ CSI-RS resources within the NZP CSI-RS resource set are transmitted with a same downlink (or transmit) spatial domain transmission filter.

A UE may not assume that CSI-RS resources in different groups (or subsets) of $M_i$ NZP CSI-RS resources have a same downlink spatial domain transmission filter (i.e., spatial domain transmission filters can change across two groups (or subsets)).

A UE may perform DL receive beam sweeping (by using potentially different Rx spatial domain filters) across NZP CSI-RS resources within a group of NZP CSI-RS resources that include $M_i$ NZP CSI-RS resources and have a same Tx spatial domain transmission filter.

A gNB/TRP may perform DL transmit beam sweeping across groups of NZP CSI-RS resources within a NZP CSI-RS resource set that includes X NZP CSI-RS resources, wherein a UE may assume that the NZP CSI-RS resources of each group of $M_i$ NZP CSI-RS resources have a same downlink spatial domain transmission filter. A UE may not assume CSI-RS resources in different groups of $M_i$ NZP CSI-RS resources have a same downlink spatial domain transmission filter.

The NZP CSI-RS resources are multiplexed in time domain and in frequency domain and possibly in code domain.

As an example, NZP CSI-RS resources within a group of $M_i$ NZP CSI-RS resources that a UE assumes to have a same downlink spatial domain transmission filter, are transmitted in non-overlapping time intervals. A time interval, for example, can be a symbol or a group of symbols used by a NZP CSI-RS resource, i.e., these resources are time division multiplexed.

As a further example, NZP CSI-RS resources NOT within the group of $M_i$ NZP CSI-RS resources that a UE assumes to have a same downlink spatial domain transmission filter, can be transmitted in overlapping or non-overlapping time intervals. A time interval, for example, can be a symbol or a group of symbols used by a NZP CSI-RS resource. i.e., these resources can be time division multiplexed and/or frequency division multiplexed and/or code (or sequence) division multiplexed.

It is straightforward for a skilled-in-the-art to extend examples 5.1.1 through 5.1.7 for a NZP CSI-RS resource set that includes X NZP CSI-RS resources descried above.

In another example 5.1.9, a UE is configured with a non-zero power CSI-RS resource set with repetition "partially on," such that the NZP CSI-RS resource set includes N*M NZP CSI-RS resources or X CSI-RS resources, a UE is further signaled/updated through MAC CE signaling and/or L1 control signaling to use a subset of resources for measurement and/or reporting wherein, The NZP CSI resources for measurement and/or reporting $N_m \times M_m \leq N \times M$ (following example 5.1), or $X_m \leq X$ (following example 5.1.7).

The subset of resources to be used can be the first resources of the set of N*M NZP CSI-RS resources or X NZP CSI-RS resources, i.e., resources with the lowest resource index/indicator. Alternatively, the subset of resources to be used can be the last resources of the set of N*M NZP CSI-RS resources or X NZP CSI-RS resources, i.e., resources with the highest resource index/indicator. Alternatively, the subset of resources to be used can be any subset of resources within the set of N*M NZP CSI-RS resources or X NZP CSI-RS resources, wherein, the subset is specified in system specification and/or configured by RRC signaling and/or updated by MAC CE signaling and/or L1 control signaling.

It is straightforward for a skilled-in-the-art to extend examples 5.1.1 through 5.1.8 for a NZP CSI-RS resource set that includes $N_m \times M_m$ NZP CSI-RS resources or $X_m$ NZP CSI-RS resources descried above.

In another example 5.2, a UE is configured with N non-zero power CSI-RS resource sets with repetition "on," such that each NZP CSI-RS resource set includes M NZP CSI-RS resources, wherein, the NZP CSI-RS resources of the N CSI-RS resource sets are mutually exclusive, where each NZP CSI-RS resource set contains M NZP CSI-RS resources.

A UE may assume that a set (group) of M NZP CSI-RS resources within a NZP CSI-RS resource set are transmitted with a same downlink spatial domain transmission filter.

A UE may not assume NZP CSI-RS resources in different NZP CSI-RS resource sets have a same downlink spatial domain transmission filter.

A UE may perform DL receive beam sweeping across NZP CSI-RS resources within a NZP CSI-RS resource set that includes M NZP CSI-RS resources and a UE may assume to have a same downlink spatial domain transmission filter.

A gNB/TRP may perform DL transmit beam sweeping across NZP CSI-RS resource sets within a super set of N NZP CSI-RS resource sets that includes N*M NZP CSI-RS resources, wherein a UE may assume that the NZP CSI-RS resources of each NZP CSI-RS resource set with M NZP CSI-RS resources have a same downlink spatial domain transmission filter.

The NZP CSI-RS resources of the N NZP CSI-RS resource sets may overlap in time or in frequency but may not overlap in both time and frequency simultaneously.

The rest of example 5.1, and the sub-examples of example 5.1 follow with following changes as shown in TABLE 3.

TABLE 3

| Example 5.1 | Example 5.2 |
|---|---|
| NZP CSI-RS resource set with N * M or (X = $\Sigma^{N-1}_{i=0} M_i$) NZP CSI-RS resources | NZP CSI-RS super set consisting of N NZP CSI-RS resource sets. Each NZP CSI-RS resource set contains M (or $M_i$) CSI-RS resources. |
| Group of M (or $M_i$) NZP CSI-RS resources that a UE may assume to have a same downlink spatial domain transmission filter. | NZP CSI-RS resource set of M (or $M_i$) NZP CSI-RS resources that a UE may assume to have a same downlink spatial domain transmission filter. |

In another example 5.2.1, a UE is configured with N non-zero power CSI-RS resource sets with repetition "on," such that each CSI-RS resource set includes $M_i$ CSI-RS resources, wherein, a NZP CSI-RS resource set with index i contains $M_i$ NZP CSI-RS resources.

The NZP CSI-RS resources of the N CSI-RS resource sets are mutually exclusive.

A UE may assume that a set (group) of $M_i$ CSI-RS resources within a NZP CSI-RS resource set are transmitted with a same downlink spatial domain transmission filter.

A UE may not assume CSI-RS resources in different NZP CSI-RS resource sets have a same downlink spatial domain transmission filter.

A UE may perform DL receive beam sweeping across NZP CSI-RS resources within a NZP CSI-RS resource set that includes $M_i$ NZP CSI-RS resources and a UE may assume to have a same downlink spatial domain transmission filter.

A gNB/TRP may perform DL transmit beam sweeping across NZP CSI-RS resource sets within a super set of N NZP CSI-RS resource sets that includes X=$\Sigma_{i=0}^{N-1} M_i$ NZP CSI-RS resources, wherein a UE may assume that the NZP CSI-RS resources of each NZP CSI-RS resource set with $M_i$ NZP CSI-RS resources have a same downlink spatial domain transmission filter.

The NZP CSI-RS resources of the N NZP CSI-RS resource sets may overlap in time or in frequency but may not overlap in both time and frequency simultaneously.

The rest of example 5.1.8, and extension to sub-examples (5.1.1 to 5.1.7) of example 5.1 follow with the changes as shown in TABLE 3.

The NZP CSI-RS resources/NZP CSI-RS resource sets of examples 1.1 and 1.2 can support different time domain configurations. i.e., the NZP CSI-RS resources/NZP CSI-RS resource sets can be configured as: periodic resources or resource sets; semi-persistent resources or resource sets; or aperiodic resources or resource sets.

The NZP CSI-RS resource set (or Y>1 such sets), according to example 1.1, and its sub-examples can be configured by RRC signaling. This includes the configuration of M (or $M_i$), the number of NZP CSI-RS resources in NZP CSI-RS resource group, and N, the number of NZP CSI-RS groups within a NZP CSI-RS resource set.

In one example 5.3, a gNB/TRP may signal/update N and M (or $M_i$) though RRC signaling and/or through MAC CE signaling and/or through L1 control signaling. The updated values of N and M (or $M_i$) is such that the product N*M (or X) remains unchanged. Alternatively, the updated values of N and M (or $M_i$) is such the product N*M (or X) is less than or equal to the number of resources in the NZP CSI-RS resource set.

In one example 5.3.1, a gNB may determine the updated values of N and M (or $M_i$). In another example 5.3.2, a UE may signal a network a recommended/preferred value of M (or $M_i$) and/or N. A network may consider the UE signaled values of M (or $M_i$) and/or N in determining the values of M (or $M_i$) and N.

The NZP CSI-RS resource sets (or Y>1 such sets), according to example 5.2, and its sub-examples can be configured by RRC signaling. This includes the configuration of M (or $M_i$), the number of NZP CSI-RS resources in a NZP CSI-RS resource set, and N, the number of NZP CSI-RS resource sets.

Figure 33:
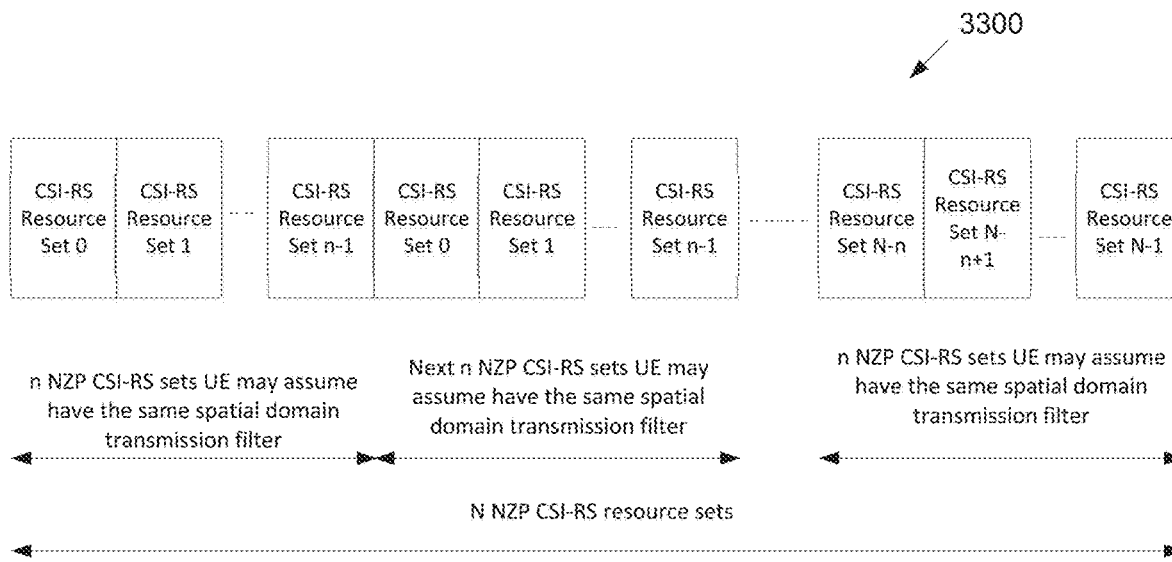
FIG. 33 illustrates an example groups of NZP CSI-RS according to embodiments of the present disclosure.

FIG. 33 illustrates an example groups of NZP CSI-RS 3300 according to embodiments of the present disclosure. An embodiment of the groups of NZP CSI-RS 3300 shown in FIG. 33 is for illustration only.

In yet another example 5.4, further to example 5.2, a gNB/TRP may signal to a UE that the UE may assume that the NZP CSI-RS resources in each n CSI-RS resource sets have a same downlink spatial domain transmission filter. This is illustrated in FIG. 33. The number of groups of NZP CSI-RS resource sets across which a UE may assume that NZP CSI-RS resources do not have a same downlink spatial domain transmission filter is N/n. In some examples, N is not an integer multiple of N. In this case, the number of groups of NZP CSI-RS resource sets across which a UE may assume that NZP CSI-RS resources do not have a same downlink spatial domain transmission filter is floor(N/n) and the number of groups NZP CSI-RS resource sets across which a UE may assume that NZP CSI-RS resources do not have a same downlink spatial domain transmission filter is ceiling(N/n).

The value of n can be further signaled/updated through RRC signaling and/or MAC CE signaling and/or L1 control signaling. Alternatively, or additionally, the number of NZP CSI-RS resource set groups can be signaled.

In yet another example 5.5, further to example 5.2, a NZP CSI-RS resource set is configured with repetition set to "partially on," a gNB/TRP may signal to a UE that the UE may assume that the M NZP CSI-RS resources in a CSI-RS resource set are divided into n groups of NZP CSI-RS resources, wherein a UE may assume that the DL spatial domain transmission filter is the same across the $m_g$ NZP CSI-RS resource of a group of NZP CSI-RS resources, wherein $m_g = m = M/n$ or, if M is not a multiple of n, $m_g$=floor(M/n) for some or all groups of NZP CSI-RS resources or $m_g$=ceiling(M/n) for some other groups of NZP CSI-RS resources. Alternatively, a gNB/TRP may signal to a UE that the UE may assume that the M NZP CSI-RS resources in a CSI-RS resource set are divided into groups of NZP CSI-RS resources of size m NZP CSI-RS resources, wherein a UE may assume that the DL spatial domain transmission filter is the same across the m NZP CSI-RS resources of a group of NZP CSI-RS resources, wherein n, the number of NZP CSI-RS resource groups in a NZP CSI-RS resource set, can be given by; $n=M/m$ or, if M is not a multiple of m, n=floor(M/m) or n=ceiling(M/m).

According to example 5.5, a gNB/TRP may sweep a DL spatial domain transmission filter across n*N beams, a UE may sweep a DL spatial domain reception filter across m beams or $m_g$ beams for each group.

The value of n and/or m can be further signaled/updated through RRC signaling and/or MAC CE signaling and/or L1 control signaling.

In one embodiment (component 6), configuration and beam reporting for joint DL transmit-receive beam sweeping and training is provided.

Figure 34:
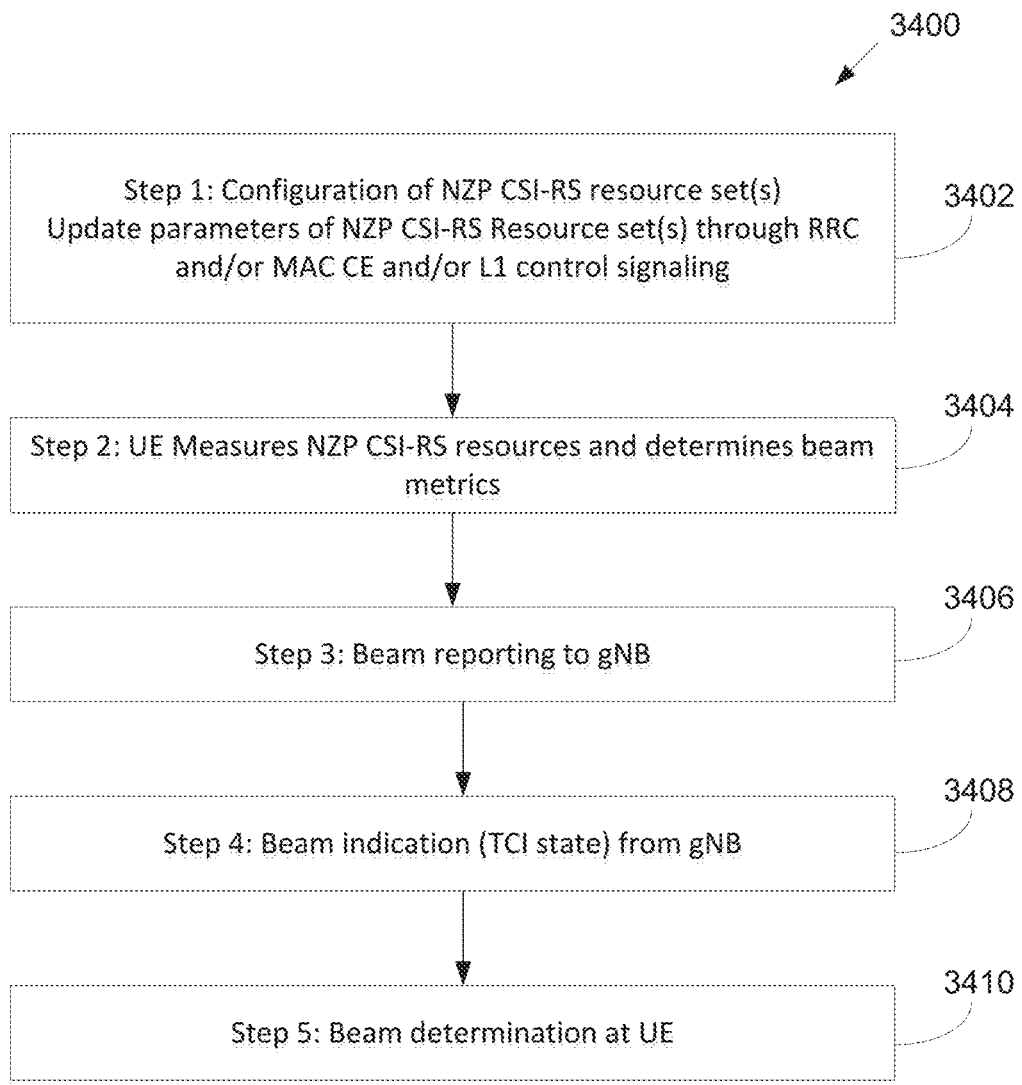
FIG. 34 illustrates a flowchart of method for joint DL transmit-receive beam sweeping and training according to embodiments of the present disclosure.

FIG. 34 illustrates a flowchart of method 3400 for joint DL transmit-receive beam sweeping and training according to embodiments of the present disclosure. An embodiment of the method 3400 shown in FIG. 34 is for illustration only. One or more of the components illustrated in FIG. 34 can be implemented in specialized circuitry configured to perform the noted functions or one or more of the components can be implemented by one or more processors executing instructions to perform the noted functions.

As illustrated in FIG. 34, in step 1, configuration and update of NZP CSI-RS resource set(s) for joint DL transmit-receive beam sweeping and training is provided. A UE is configured with a NZP CSI-RS resource set with repetition set to "partially on" according to example 5.1 of component 5. The number of NZP CSI-RS resources within a group of NZP CSI-RS resources, M (or $M_i$), for which a UE may assume a same downlink spatial domain transmission filter, and the number of NZP CSI-RS resource groups, N, within a NZP CSI-RS resource set maybe be further signaled or updated through RRC signaling and/or through MAC CE signaling and/or through L1 control signaling according to example 5.3 of component 5.

Alternatively, a UE is a configured with N NZP CSI-RS resource sets with repetition set to "on" according to the example 5.2 of component 5. The number of CSI-RS resource sets across which a UE may assume a same spatial domain transmission filter, n, maybe be signaled and updated through RRC signaling and/or through MAC CE signaling and/or through L1 control signaling according to example 5.4 of component 5. Alternatively, the NZP CSI-RS resource sets are configured with repetition set to "partially on" and the number of NZP CSI-RS resources, m, within a group of NZP CSI-RS resources, for which a UE may assume a same downlink spatial domain transmission filter, and/or the number NZP CSI-RS resource groups within a NZP CSI-RS resource set may be signaled or updated through RRC signaling and/or through MAC CE signaling and/or through L1 control signaling according to example 5.5 of component 5.

In step 2, NZP CSI-RS resource measurement is provided. A UE measures NZP CSI-RS resources. During a same transmission iteration (for example in case of periodic or semi-persistent CSI-RS resources), a UE can measure, using different downlink spatial domain receive filters (i.e., Rx beam sweeping), NZP CSI-RS resources for which the UE may assume that the DL spatial domain transmission filter is the same, i.e., the gNB/TRP transmits these NZP CSI-RS resources on a same beam. For the NZP CSI-RS resources for which the UE may assume that the DL spatial domain transmission filter is the same, the UE can determine a best beam report, this for example can be the beam report corresponding to the best (i.e., most optimum) metric on a beam.

In one example 6.1.1, a beam report can include L1-RSRP, L1-SINR, CQI or hypothetical BLER corresponding to the received NZP CSI-RS resource with a spatial domain receive filter.

In another example 6.1.2, a beam report can additionally include maximum permissible exposure (MPE) reduction associated with a spatial domain receive filter. For example, if a beam report is based on (or includes) L1-RSRP of a NZP CSI-RS resource, a UE may further reduce the L1-RSRP by an amount corresponding to the MPE reduction. A UE determines a beam report taking into account the NZP CSI-RS resource measurement and the MPE reduction of the corresponding spatial domain receive filter.

In step 3, beam report to a gNB is provided. A UE reports a beam report to a gNB/TRP according to the measurement in step 2. A beam report can include K individual beam reports, wherein an individual beam report includes:

A beam metric which can include L1-RSRP, L1-SINR, CQI, or hypothetical BLER, possibly reflecting the impact of MPE reduction and/or with the MPE reduction separately reported.

NZP CSI-RS resource index/indicator corresponding to the beam report.

In one example 6.2.1, the number of K individual beam reports is configured and/or updated by higher layer RRC signaling and/or MAC CE signaling and/or L1 control signaling. A UE reports the best (highest) K individual beam reports based on a beam metric.

In another example 6.2.2, the number of K individual beam reports is configured and/or updated by higher layer RRC signaling and/or MAC CE signaling and/or L1 control signaling. A UE reports the best (highest) K individual beam reports that exceed a threshold. If less than K metrics exceed the threshold, only the individual beam reports with a metric that exceeds the threshold are reported. The threshold can be configured and/or updated by higher layer RRC signaling and/or MAC CE signaling and/or L1 control signaling.

In one example 6.3.1, a UE reports at most one individual beam report across a group or set of NZP CSI-RS resources for which a UE may assume to have a same downlink spatial transmission domain transmission filter, wherein a beam report can reflect the best beam metric across the downlink spatial domain receive filters.

In another example 6.3.2, a UE reports at most one individual beam report across a group or set of NZP CSI-RS resources for which a UE may assume to have a same downlink spatial transmission domain transmission filter, wherein a beam report can reflect the best beam metric across the downlink spatial domain receive filters taking into account MPE reduction.

In another example 6.3.3, a UE reports at most two individual beam reports across a group or set of NZP CSI-RS resources for which a UE may assume to have a same downlink spatial domain transmission filter, wherein, a first beam report can reflect the best beam metric across the downlink spatial domain receive filters.

A second beam report can reflect the best beam metric across the downlink spatial domain receive filters taking into account MPE reduction.

In another example 6.3.4, a UE reports at most one individual beam report for each NZP CSI-RS resource, wherein a beam report can reflect a measurement (such as L1-RSRP, L1-SINR, CQI, or hypothetical BLER) of the NZP CSI-RS resource.

In another example 6.3.5, a UE reports at most one individual beam report for each NZP CSI-RS, wherein a beam report can reflect a measurement (such as L1-RSRP, L1-SINR, CQI, or hypothetical BLER) of the NZP CSI-RS resource taking into account MPE reduction.

In another example 6.3.6, a UE reports at most two individual beam reports for each NZP CSI-RS resource, wherein, a first beam report can reflect a measurement (such as L1-RSRP, L1-SINR, CQI, or hypothetical BLER) of the NZP CSI-RS resource. A second beam report can reflect a measurement (such as L1-RSRP, L1-SINR, CQI, or hypothetical BLER) of the NZP CSI-RS resource taking into account MPE reduction.

In one example 6.4.1, an individual beam report corresponds to a set or group of NZP CSI-RS resources for which a UE may assume that the downlink spatial domain transmission filter is the same. The resource index/indicator of such set or group of NZP CSI-RS resources is included in the individual beam report.

This resource index can be determined as: the resource index/indicator of a group of NZP CSI-RS resource for which a UE may assume that the downlink spatial domain transmission filter is the same. If N is the number of groups of NZP CSI-RS resources in a NZP CSI-RS resource set, the size of the resource index/indicator field (e.g., CRI) can be $\lceil \log_2 N \rceil$ bits Alternatively, the resource index/indicator may be the resource ID of a NZP CSI-RS resource within the group. If N is the number of groups of NZP CSI-RS resources in a NZP CSI-RS resource set, and M is the number NZP CSI-RS resources in a group of NZP CSI-RS resources; the size of the resource index/indicator field (e.g., CRI) can be $\lceil \log_2 N \times M \rceil$ bits.

The resource index/indicator of a NZP CSI-RS resource set for which repetition is configured "on," i.e., for which a UE may assume that the downlink spatial domain transmission filter is the same. If N is the number of NZP CSI-RS resource sets, the size of the resource index/indicator field (e.g., CRI) can be $\lceil \log_2 N \rceil$ bits.

A combination of (i) the resource index/indicator of a NZP CSI-RS resource set. If N is the number of NZP CSI-RS resource sets, the size of this resource index/indicator subfield can be $\lceil \log_2 N \rceil$ bits and (ii) the resource index/indicator of a group of NZP CSI-RS resource for which a UE may assume that the downlink spatial domain transmission filter is the same. If n is the number of groups of NZP CSI-RS resources in a NZP CSI-RS resource set, the size of this resource index/indicator subfield can be $\lceil \log_2 n \rceil$ bits.

Alternatively, the resource index/indicator may be the resource ID of a NZP CSI-RS resource within the group. If M is the number NZP CSI-RS resources in a NZP CSI-RS resources set; the size of the resource index/indicator subfield can be $\lceil \log_2 M \rceil$ bits.

If each sub-field is reported separately, the total size of this resource index/indicator field (e.g., CRI) can be $\lceil \log_2 N \rceil + \lceil \log_2 n \rceil$ bits. Alternatively, the total size of this resource index/indicator field (e.g., CRI) can be $\lceil \log_2 N \rceil + \lceil \log_2 M \rceil$ bits.

Alternatively, the sub-fields can be reported jointly, the total size of the resource index/indicator field (e.g., CRI) can be $\lceil \log_2 N \times n \rceil$ bits Alternatively, the total size of the resource index/indicator field (e.g., CRI) can be $\lceil \log_2 N \times M \rceil$ bits.

In another example 6.4.2, an individual beam report corresponds to a NZP CSI-RS resource. The resource index/indicator of such the NZP CSI-RS resource is included in the individual beam report. This resource index can be determined as the resource index/indicator of the NZP CSI-RS resource. If M is the number NZP CSI-RS resources in a NZP CSI-RS resources set; the size of the resource index/indicator field can be $\lceil \log_2 M \rceil$ bits.

A combination of: (a) the resource index/indicator of a NZP CSI-RS resource set. If N is the number of NZP CSI-RS resource sets, the size of this resource index/indicator subfield can be $\lceil \log_2 N \rceil$ bits; (b) the resource index/indicator of the NZP CSI-RS resource. If M is the number NZP CSI-RS resources in a NZP CSI-RS resources set, the size of the resource index/indicator field can be $\lceil \log_2 M \rceil$ bits. If each sub-field is reported separately, the total size of this resource index/indicator field (e.g., CRI) can be $\lceil \log_2 N \rceil + \lceil \log_2 M \rceil$ bits. Alternatively, the sub-fields can be reported jointly, the total size of the resource index/indicator field (e.g., CRI) can be $\lceil \log_2 N \times M \rceil$ bits.

In step 4, a beam indication from a gNB is provided. A gNB/TRP determines the TCI state of a downlink and/or uplink transmission and signals the TCI state to the UE in a DCI, where the TCI state can be a common (joint) TCI state (for DL and UL) or a DL TCI state, or an UL TCI state; alternatively, the TCI state can be signaled through MAC CE signaling.

The TCI-state includes a beam indication, wherein the beam indication can be determined according to example 6.4.1 or 6.4.2. A TCI-state can be mapped to: (i) a resource index/indicator of a NZP CSI-RS resource, regardless of whether a UE may assume a same downlink spatial domain transmission filter with another NZP CSI-RS resource; (ii) a resource index/indicator of a group of NZP CSI-RS resources for which a UE may assume a same downlink spatial domain transmission filter for the NZP CSI-RS resources of the group; and/or (iii) a resource indicator of a NZP CSI Resource set for which a UE may assume a same downlink spatial domain transmission filter for the NZP CSI-RS resources of the CSI-RS resource set.

The size of the TCI state field can correspond to: $\log_2$ (Total number of TCI states); or $\log_2$(Total number of resource index/indicators of first sub-field)+$\log_2$(Total number of resource index/indicators of second sub-field).

Examples 6.5.1 and 6.5.2 are based on the examples 6.4.1 and 6.4.2 according to the previously mentioned options.

In one example 6.5.1, a TCI state corresponds to a set or group of NZP CSI-RS resources for which a UE may assume that the downlink spatial domain transmission filter is the same. The resource index/indicator of such set or group of NZP CSI-RS resources is included in the TCI state.

This resource index can be determined as: (i) the resource index/indicator of a group of NZP CSI-RS resource for which a UE may assume that the downlink spatial domain transmission filter is the same. If N is the number of groups of NZP CSI-RS resources in a NZP CSI-RS resource set, the size of the resource index/indicator field (e.g., CRI) can be $\lceil \log_2 N \rceil$ bits. The number of TCI states is N. The size of the TCI state field can be $\lceil \log_2 N \rceil$ bits; or (ii) Alternatively, the resource index/indicator may be the resource ID of a NZP CSI-RS resource within the group. If N is the number of groups of NZP CSI-RS resources in a NZP CSI-RS resource set, and M is the number NZP CSI-RS resources in a group of NZP CSI-RS resources; the size of the resource index/indicator field (e.g., CRI) can be $\lceil \log_2 N \times M \rceil$. The number of TCI states is N×M, and the size of the TCI state field can be $\lceil \log_2 N \times M \rceil$ bits, wherein a NZP CSI-RS resource maps to a TCI state. Alternatively, the number of TCI states is N, and the size of the TCI state field can be $\lceil \log_2 N \rceil$ bits, wherein a group of M NZP CSI-RS resources map to a TCI state.

The resource index/indicator of a NZP CSI-RS resource set for which repetition is configured "on," i.e., for which a UE may assume that the downlink spatial domain transmission filter is the same. If N is the number of NZP CSI-RS resource sets, the size of the resource index/indicator field (e.g., CRI) can be $\lceil \log_2 N \rceil$ bits. The number of TCI states is N. The size of the TCI state field can be $\lceil \log_2 N \rceil$ bits.

A combination of: (i) the resource index/indicator of a NZP CSI-RS resource set. If N is the number of NZP CSI-RS resource sets, the size of this resource index/indicator subfield can be $\lceil \log_2 N \rceil$ bits; and (ii) the resource index/indicator of a group of NZP CSI-RS resource for which a UE may assume that the downlink spatial domain transmission filter is the same. If n is the number of groups of NZP CSI-RS resources in a NZP CSI-RS resource set, the size of this resource index/indicator subfield can be $\lceil \log_2 n \rceil$ bits.

Alternatively, the resource index/indicator may be the resource ID of a NZP CSI-RS resource within the group. If M is the number NZP CSI-RS resources in a NZP CSI-RS resources set; the size of the resource index/indicator subfield can be $\lceil \log_2 M \rceil$ bits.

If each sub-field is reported separately, the total size of this resource index/indicator field (e.g., CRI) can be $\lceil \log_2 N \rceil + \lceil \log_2 n \rceil$ bits. The number of TCI states can be N×n, and the TCI state field can be $\lceil \log_2 N \rceil + \lceil \log_2 n \rceil$ bits, with the TCI state field consisting of two subfields of size $\lceil \log_2 N \rceil$ and $\lceil \log_2 n \rceil$. Alternatively, the number of TCI states can be N×n, and the TCI state field can be $\lceil \log_2 N \times n \rceil$ bits.

Alternatively, the total size of this resource index/indicator field (e.g., CRI) can be $\lceil \log_2 N \rceil + \lceil \log_2 M \rceil$, i.e., the resource index/indicator field is a NZP CSI-RS resource. The number of TCI states can be N×M, and the TCI state field can be $\lceil \log_2 N \rceil + \lceil \log_2 M \rceil$ bits, with the TCI state field consisting of two subfields of size $\lceil \log_2 N \rceil$ and $\lceil \log_2 M \rceil$, and wherein a NZP CSI-RS resource within a NZP CSI-RS resource set maps to a TCI state. Alternatively, the number of TCI states is N×n, and the size of the TCI state field can be $\lceil \log_2 N \rceil + \lceil \log_2 n \rceil$ bits, wherein a group of M/n NZP CSI-RS resources map to a TCI state, and wherein the TCI state field consists of two subfields of size $\lceil \log_2 N \rceil$ and $\lceil \log_2 n \rceil$.

Alternatively, the number of TCI states can be N×M, and the TCI state field can be $\lceil \log_2 N \times M \rceil$ bits, and wherein a NZP CSI-RS resource within a NZP CSI-RS resource set maps to a TCI state. Alternatively, the number of TCI states is N×n, and the size of the TCI state field can be $\lceil \log_2 N \times n \rceil$ bits, wherein a group of M/n NZP CSI-RS resources map to a TCI state.

Alternatively, the sub-fields can be reported jointly, the total size of the resource index/indicator field (e.g., CRI) can be $\lceil \log_2 N \times n \rceil$. The number of TCI states can be N×n, and the TCI state field can be $\lceil \log_2 N \times n \rceil$ bits.

Alternatively, the total size of the resource index/indicator field (e.g., CRI) can be $\lceil \log_2 N \times M \rceil$. The number of TCI states is N×M, and the size of the TCI state field can be $\lceil \log_2 N \times M \rceil$ bits, wherein a NZP CSI-RS resource within a NZP CSI-RS resource set maps to a TCI state. Alternatively, the number of TCI states is N×n, and the size of the TCI state field can be $\lceil \log_2 N \times n \rceil$ bits, wherein a group of M/n NZP CSI-RS resources map to a TCI state.

In another example 6.5.2, a TCI state corresponds to a NZP CSI-RS resource. The resource index/indicator of such the NZP CSI-RS resource is included in the individual beam report. This resource index can be determined as: the resource index/indicator of the NZP CSI-RS resource. If M is the number NZP CSI-RS resources in a NZP CSI-RS resources set; the size of the resource index/indicator field can be $\lceil \log_2 M \rceil$ bits. The number of TCI states is M. The size of the TCI state field can be $\lceil \log_2 M \rceil$ bits. A combination of: (i) the resource index/indicator of a NZP CSI-RS resource set. If N is the number of NZP CSI-RS resource sets, the size of this resource index/indicator subfield can be $\lceil \log_2 N \rceil$; (ii) the resource index/indicator of the NZP CSI-RS resource. If M is the number NZP CSI-RS resources in a NZP CSI-RS resources set; the size of the resource index/indicator field can be $\lceil \log_2 M \rceil$; (iii) if each sub-field is reported separately, the total size of this resource index/indicator field (e.g., CRI) can be $\lceil \log_2 N \rceil + \lceil \log_2 M \rceil$. The number of TCI states can be N×M, and the TCI state field can be $\lceil \log_2 N \rceil + \lceil \log_2 M \rceil$ bits, with the TCI state field consisting of two subfields of size $\lceil \log_2 N \rceil$ and $\lceil \log_2 M \rceil$. Alternatively, the number of TCI states can be N×M, and the TCI state field can be $\lceil \log_2 N \times M \rceil$ bits; and/or (v) alternatively, the sub-fields can be reported jointly, the total size of the resource index/indicator field (e.g., CRI) can be $\lceil \log_2 N \times M \rceil$. The number of TCI states can be N×M, and the TCI state field can be $\lceil \log_2 N \times M \rceil$ bits.

In step 5, a determination of the DL Rx beam and UL Tx at the UE is provided. According to the indicated TCI-state and the corresponding resource index/indicator, a UE can determine a downlink spatial domain reception filter for the reception of the corresponding downlink transmission. In case of beam correspondence, a UE can determine a corresponding uplink spatial domain transmission filter for the transmission of the corresponding uplink transmission.

In one embodiment (component 7), a UE capability reporting for joint DL transmit-receive beam sweeping and training is provided.

In one example 7.1, a UE may signal its capability of supporting joint DL transmit-receive beam sweeping. A UE can further signal its capability of supporting or not supporting: NZP CSI-RS resource set (or Y>1 of such sets) with repetition set to "partially on" following the examples of component 1.

Multiple NZP CSI-RS resource sets (or Y>1 of such sets) for a same measurement report with repetition set to "on" or set to "partially on."

If a UE does not support joint DL transmit-receive beam sweeping, the UE follows the release 15 and/or release 16 behavior. The UE can additionally include the value Y or the maximum value of Y in the capability signaling. In one example, Y can be (a maximum) number of TRPs/gNBs that the UE can receive DL reference signals (such as NZP CSI-RS) from or transmit UL reference signal (such as SRS) to. In one example, Y can be (a maximum) number of components carriers (CCs) that the UE is configured with (or gets connected to). When the NW/gNB is equipped with multiple antenna panels, Y can be related to the number of antenna panels (e.g., Y equals number of antenna panels). Likewise, when the UE is equipped with multiple antenna panels, Y can be related to the number of antenna panels (e.g., Y equals number of antenna panels).

In one example, Y can be determined by the product of two or more of: (i) (a maximum) number of TRPs/gNBs that the UE can receive DL reference signals (such as NZP CSI-RS) from or transmit UL reference signal (such as SRS) to; (ii) (a maximum) number of components carriers (CCs) that the UE is configured with (or gets connected to); (iii) the number of antenna panels at the gNB/TRP; or the number of antenna panels at the UE.

In one example 7.2, a UE may signal the number of NZP CSI-RS resources for which a UE may assume a same downlink spatial domain transmission filter (or the UE can receive simultaneously). This for example can correspond to: (i) the number of downlink spatial domain receive filters (receive beams) a UE may sweep for one panel; (ii) the number of downlink spatial domain receive filters (receive beams) a UE may sweep across all panels; and/or (iii) the number of panels.

In one example 7.3, a UE may signal the number of spatial domain receive filters (receive beams) a UE may sweep simultaneously, i.e., corresponding to the number of NZP CSI-RS resources a UE may assume to have a same downlink spatial domain transmission filter that overlap in time. These resources can be frequency division multiplexed or code division multiplexed (cf. Example 5.1.4, 5.1.5, 5.1.6, and 5.1.7). Alternatively, a UE may sweep the same RS resource multiple times simultaneously, e.g., the UE receives the same RS resource using different spatial domain receive filters (beams).

In one example 7.4, a UE may signal the number of NZP CSI-RS resources that a UE may measure in a same time interval for resources overlapping in time for a same downlink spatial domain receive filter (receive beam). e.g., the NZP CSI-RS resources are frequency division multiplexed or code division multiplexed. Alternatively, a UE may measure the same RS resource using different spatial domain receive filters (beams).

In one example 7.5, a UE may signal the number of NZP CSI-RS resources that a UE may measure in a same time interval for resources overlapping in time across all downlink spatial domain receive filters (receive beams). e.g., the NZP CSI-RS resources are frequency division multiplexed or code division multiplexed.

In one example 7.6, a UE may signal the number of NZP CSI-RS resources that a UE may measure across all NZP CSI-RS resource sets for a same measurement report.

In one example 7.7.1, the signaling for the capability parameters of example 7.2 to example 7.6 can be joint signaling, i.e., a signaled value indicates the corresponding parameters for example 7.2 to example 7.6, i.e., through a look-up-table as in TABLE 4.

TABLE 4

Mapping of signaled capability (Example 7.7.1) to capabilities of Example 7.2 to Example 7.6

| Signaled Capability | Derived Capability | | | | |
|---|---|---|---|---|---|
| Joint Capability | Capability of Example 7.2 | Capability of Example 7.3 | Capability of Example 7.4 | Capability of Example 7.5 | Capability of Example 7.6 |

In another example 7.7.2, the signaling for some of the capability parameters of example 7.2 to example 7.6 can be joint signaling, i.e., a signaled value indicates the corresponding parameters for some of the examples of example 7.2 to example 7.6, while the other parameters for the remaining capabilities are individually signaled.

In another example 7.7.3, the signaling for the capability parameters of example 3.2 to example 7.6 is individual signaling for each parameter.

In another example 7.8, a UE may signal an update for the capability parameters of example 7.2 to example 7.6 through RRC signaling and/or through MAC CE signaling and/or through L1 signaling. Such update may be due to: (i) a change in channel conditions; (ii) a change in UE hardware, e.g., due to partial UE failure; and/or (iii) a UE event, e.g., event to change UE power.

In the present disclosure, following embodiments are provided: (i) joint downlink transmit-receive spatial domain beam sweeping; (ii) NZP CSI-RS resource set with repetition set to "partially on," wherein a UE may assume that a group of NZP CSI-RS resources have a same downlink transmit spatial domain transmission filter; (iii) UE beam sweeping across multiple NZP CSI-RS resource sets with repetition set to "on" or "partially on"; (iv) beam reporting and beam indication for such cases; and (v) UE capability for joint downlink transmit-receive spatial domain beam sweeping.

For illustrative purposes the steps of this algorithm are described serially, however, some of these steps may be performed in parallel to each other. The above operation diagrams illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to:
receive configuration information for transmission configuration indicator (TCI) states,
receive configuration information for group TCI indices, wherein a group TCI index, m, of the group TCI indices is associated with a group of TCI states $(T_0(m), T_1(m), \ldots, T_{U-1}(m))$, wherein $U \geq 1$,
receive configuration information on which TCI states within the group of TCI states to apply to at least one of downlink channels and uplink channels, and
receive the group TCI index; and
a processor operably connected to the transceiver, the processor configured to:
decode a channel conveying the group TCI index, and
determine, at least based on the decoded group TCI index, one or more TCI states to apply to the at least one of downlink channels and uplink channels,
wherein the transceiver is further configured to at least one of (i) receive the downlink channels and (ii) transmit the uplink channels using the determined one or more TCI states.

2. The UE of claim 1, wherein the configuration information for the group TCI indices is conveyed by one of:
a channel unicast to the UE, and
a channel transmitted to a group of UEs including the UE.

3. The UE of claim 1, wherein:
the UE is configured with two sets of group TCI indices of which the group TCI indices is a first set,
the processor is configured to determine the one or more TCI states using the first set of group TCI indices for a time period,
the transceiver is configured to receive a configuration message to switch to a second set of group TCI indices of the two sets of group TCI indices at a configured time or after a time period from acknowledgement of the configuration message, and
the processor is configured to determine the one or more TCI states using the second set of group TCI indices after the switch.

4. The UE of claim 1, wherein:
the group TCI index, m, is associated with at a group of U sets of TCI states, $((T_{0,0}(m), T_{0,1}(m), \ldots, T_{0,L_{m,0}-1}(m)), (T_{1,0}(m), T_{1,1}(m), \ldots, T_{1,L_{m,1}-1}(m)), (T_{U-1,0}(m), T_{U-1,1}(m), \ldots, T_{U-1,L_{m,U-1}-1}(m)))$,
the transceiver is further configured to receive a TCI state indicator for each of the U sets of TCI states, $k_0, k_1, \ldots k_{U-1}$, where $0 \leq k_i \leq L_{m,i}-1$, and
the processor is further configured to determine, at least based on the group TCI index, m, and the TCI state indicators, the group of TCI states, $T_{0,k_0}(m), T_{1,k_1}(m), \ldots, T_{U-1,k_{U-1}}(m)$.

5. The UE of claim 1, wherein:
the transceiver is further configured to receive configuration information for a channel state information reference signal (CSI-RS) resource set,
the CSI-RS resource set is partitioned into groups of CSI-RS resources, and
the processor is further configured to assume that the CSI-RS resources of each of the groups are transmitted using a same spatial domain transmission filter.

6. The UE of claim 5, wherein CSI-RS resources in a same group are transmitted in non-overlapping time periods.

7. The UE of claim 1, wherein:
the transceiver is further configured to receive configuration information for channel state information reference signal (CSI-RS) resource sets,
the processor is further configured to assume that the CSI-RS resources of each of the CSI-RS resource sets are transmitted using a same spatial domain transmission filter,
CSI-RS resources in a same one of the CSI-RS resource sets are transmitted in non-overlapping time periods, and
CSI-RS resources of different of the CSI-RS resource sets are transmitted in one of:
interleaved non-overlapping time periods such that (i) first transmissions of the CSI-RS resources, respectively, of a first of the different CSI-RS resource sets are interleaved in time with second transmissions of the CSI-RS resources, respectively, of at least a second of the different CSI-RS resource sets and (ii) the first and second transmissions do not overlap in time, and
overlapping time periods such that one or more transmissions of the CSI-RS resources, respectively, of the first of the different CSI-RS resource sets overlap in time with one or more transmissions of the CSI-RS resources, respectively, of at least the second of the different CSI-RS resource sets.

8. A base station (BS) comprising:
a transceiver configured to:
transmit configuration information for transmission configuration indicator (TCI) states,
transmit configuration information for group TCI indices, wherein a group TCI index, m, of the group TCI indices is associated with a group of TCI states $(T_0(m), T_1(m), \ldots, T_{U-1}(m))$, wherein $U \geq 1$, and
transmit configuration information on which TCI states within the group of TCI states to apply to at least one of downlink channels and uplink channels of a user equipment (UE), and
a processor operably connected to the transceiver, the processor configured to:
determine one or more TCI states to apply to the at least one of downlink channels and uplink channels for the UE,
determine the group TCI index, and
encode and multiplex the group TCI index onto a channel conveying the group TCI index,
wherein the transceiver is further configured to:
transmit the channel conveying the group TCI index; and
at least one of (i) transmit the downlink channels and (ii) receive the uplink channels using the determined one or more TCI states.

9. The BS of claim 8, wherein the configuration information for the group TCI indices is conveyed by one of:
one or more channels transmitted individually to one or more UEs including the UE, and
a channel transmitted to a group of UEs including the UE.

10. The BS of claim 8, wherein
two sets of group TCI indices, of which the group TCI indices is a first set, are configured,
the processor is configured to determine the one or more TCI states using the first set of group TCI indices for a time period,
the transceiver is configured to transmit a configuration message to switch to a second set of group TCI indices of the two sets of group TCI indices at a configured time or after a time-period from acknowledgement of the configuration message, and
the processor is configured to determine the one or more TCI states using the second set of group TCI indices after the switch.

11. The BS of claim 8, wherein:
the group TCI index, m, is associated with at a group of U sets of TCI states, $((T_{0,0}(m), T_{0,1}(m), \ldots, T_{0,L_{m,0}-1}(m)), (T_{1,0}(m), T_{1,1}(m), \ldots, T_{1,L_{m,1}-1}(m)), (T_{U-1,0}(m), T_{U-1,1}(m), \ldots, T_{U-1,L_{m,U-1}-1}(m)))$,
the processor is further configured to determine, at least based on the one or more TCI states of the at least one of downlink channels and uplink channels:
the group TCI index, m, and
TCI state indicators for the U sets of TCI states, $k_0, k_1, \ldots k_{U-1}$, wherein, $0 \leq k_i \leq L_{m,i}-1$, and
the transceiver is further configured to transmit information indicating the determined TCI state indicators.

12. The BS of claim 8, wherein:
the transceiver is further configured to transmit configuration information for a channel state information reference signal (CSI-RS) resource set,
the CSI-RS resource set is partitioned into groups of CSI-RS resources, and the CSI-RS resources of each of the groups are transmitted using a same spatial domain transmission filter.

13. The BS of claim 12, wherein CSI-RS resources in a same group are transmitted in non-overlapping time periods.

14. The BS of claim 8, wherein:
the transceiver is further configured to transmit configuration information for channel state information reference s(CSI-RS) resource sets,
the CSI-RS resources of each of the CSI-RS resources set are transmitted using a same spatial domain transmission filter,
CSI-RS resources in a same one of the CSI-RS resource sets are transmitted in non-overlapping time periods, and
CSI-RS resources of different of the CSI-RS resource sets are transmitted in one of:
interleaved non-overlapping time periods such that (i) first transmissions of the CSI-RS resources, respectively, of a first of the different CSI-RS resource sets are interleaved in time with second transmissions of the CSI-RS resources, respectively, of at least a second of the different CSI-RS resource sets and (ii) the first and second transmissions do not overlap in time, and
overlapping time periods such that one or more transmissions of the CSI-RS resources, respectively, of the first of the different CSI-RS resource sets overlap in time with one or more transmissions of the CSI-RS resources, respectively, of at least the second of the different CSI-RS resource sets.

15. A method of operating a user equipment (UE), the method comprising:
receiving configuration information for transmission configuration indicator (TCI) states;
receiving configuration information for group TCI indices, wherein a group TCI index, m, of the group TCI indices is associated with a group of TCI states ($T_0(m)$, $T_1(m)$, ..., $T_{U-1}(m)$), wherein $U \geq 1$;
receiving configuration information on which TCI states within the group of TCI states to apply to at least one of downlink channels and uplink channels;
receiving the group TCI index;
decoding a channel conveying the group TCI index;
determining, at least based on the decoded group TCI index, one or more TCI states to apply to the at least one of downlink channels and uplink channels; and
at least one of (i) receiving the downlink channels and (ii) transmitting the uplink channels using the determined one or more TCI states.

16. The method of claim 15, wherein the configuration information for the group TCI indices is conveyed by one of:
a channel unicast to the UE; and
a channel transmitted to a group of UEs including the UE.

17. The method of claim 15, further comprising;
identifying that two sets of group TCI indices, of which the group TCI indices is a first set, are configured for the UE, wherein determining the one or more TCI states comprises determining the one or more TCI states using the first set of group TCI indices for a time period;
receiving a configuration message to switch to a second set of group TCI indices of the two sets of group TCI indices at a configured time or after a time-period from acknowledgement of the configuration message; and
determining the one or more TCI states using the second set of group TCI indices after the switch.

18. The method of claim 15, further comprising;
receiving a group TCI index, m, is associated with at a group of U sets of TCI states, (($T_{0,0}(m)$, $T_{0,1}(m)$, ..., $T_{0,L_{m,0}-1}(m)$), ($T_{1,0}(m)$, $T_{1,1}(m)$, ..., $T_{1,L_{m,1}-1}(m)$), ($T_{U-1,0}(m)$, $T_{U-1,1}(m)$, ..., $T_{U-1,L_{m,U-1}-1}(m)$));
receiving a TCI state indicator for each of the U sets of TCI states, $k_0$, $k_1$, ... $k_{U-1}$, where, $0 \leq k_i \leq L_{m,i}-1$; and
determining, at least based on the group TCI index, m, and the TCI state indicators, the group of TCI states, $T_{0,k_0}(m)$, $T_{1,k_1}(m)$, ..., $T_{U-1,k_{U-1}}(m)$.

19. The method of claim 15, further comprising;
receiving configuration information for channel state information reference signal (CSI-RS) resource set, wherein the CSI-RS resource set is partitioned into groups of CSI-RS resources; and
assuming that the CSI-RS resources of each of the groups are transmitted using a same spatial domain transmission filter.

20. The method of claim 15, further comprising:
receiving configuration information for channel state information reference signal (CSI-RS) resource sets; and
assuming that the CSI-RS resources of each of the CSI-RS resource sets are transmitted using a same spatial domain transmission filter, wherein:
CSI-RS resources in a same one of the CSI-RS resource sets are transmitted in non-overlapping time periods, and
CSI-RS resources of different of the CSI-RS resource sets are transmitted in one of:
interleaved non-overlapping time periods such that (i) first transmissions of the CSI-RS resources, respectively, of a first of the different CSI-RS resource sets are interleaved in time with second transmissions of the CSI-RS resources, respectively, of at least a second of the different CSI-RS resource sets and (ii) the first and second transmissions do not overlap in time, and
overlapping time periods such that one or more transmissions of the CSI-RS resources, respectively, of the first of the different CSI-RS resource sets overlap in time with one or more transmissions of the CSI-RS resources, respectively, of at least the second of the different CSI-RS resource sets.

* * * * *